US010116948B2

(12) United States Patent
Deshpande

(10) Patent No.: US 10,116,948 B2
(45) Date of Patent: Oct. 30, 2018

(54) SYSTEM FOR TEMPORAL IDENTIFIER HANDLING FOR HYBRID SCALABILITY

(71) Applicant: Sharp Kabushiki Kaisha, Sakai-shi, Osaka (JP)

(72) Inventor: Sachin G. Deshpande, Camas, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 100 days.

(21) Appl. No.: 15/118,128

(22) PCT Filed: Feb. 23, 2015

(86) PCT No.: PCT/JP2015/000880
§ 371 (c)(1),
(2) Date: Aug. 11, 2016

(87) PCT Pub. No.: WO2015/125494
PCT Pub. Date: Aug. 27, 2015

(65) Prior Publication Data
US 2017/0180744 A1 Jun. 22, 2017

Related U.S. Application Data

(60) Provisional application No. 61/947,910, filed on Mar. 4, 2014, provisional application No. 61/943,202, filed on Feb. 21, 2014.

(51) Int. Cl.
H04N 19/31 (2014.01)
H04N 19/187 (2014.01)
H04N 19/184 (2014.01)

(52) U.S. Cl.
CPC .......... *H04N 19/31* (2014.11); *H04N 19/184* (2014.11); *H04N 19/187* (2014.11)

(58) Field of Classification Search
CPC ..... H04N 19/31; H04N 19/187; H04N 19/184
See application file for complete search history.

(56) References Cited

U.S. PATENT DOCUMENTS

2005/0152448 A1* 7/2005 Crinon ............ H04N 21/23424
375/240.01

OTHER PUBLICATIONS

Official Communication issued in International Patent Application No. PCT/JP2015/000880, dated Mar. 24, 2015.
Chen et al., "High efficiency video coding (HEVC) scalable extensions Draft 5", Joint Collaborative Team on Video Coding (JCT-VC) of ITU-T SG 16 WP 3 and ISO/IEC JTC 1/SC 29/WG 11, JCTVC-P1008_v4, Jan. 9-17, 2014, 127 pages.

* cited by examiner

*Primary Examiner* — Nam Pham
(74) *Attorney, Agent, or Firm* — Keating & Bennett, LLP

(57) ABSTRACT

This invention relates to a method for decoding a video bitstream comprising the steps of: (a) receiving a base bitstream representative of a coded video sequence; (b) receiving at least one enhancement bitstreams representative of said coded video sequence; (c) receiving a video parameter set containing syntax elements that apply to said base bitstream and said at least one enhancement bitstreams where said syntax elements selectively signaling bitrate and picture rate information for said base bitstream based upon whether said base bitstream is externally signaled or internally specified.

9 Claims, 62 Drawing Sheets

| nal_unit_header( ) { | Descriptor |
|---|---|
| forbidden_zero_bit | f(1) |
| nal_unit_type | u(6) |
| nuh_reserved_zero_6bits | u(6) |
| nuh_temporal_id_plus1 | u(3) |
| } | |

NAL UNIT HEADER SYNTAX

FIG. 8A

| nal_unit_header( ) { | Descriptor |
|---|---|
| forbidden_zero_bit | f(1) |
| nal_unit_type | u(6) |
| layer_id_plus1 | u(6) |
| nuh_temporal_id_plus1 | u(3) |
| } | |

NAL UNIT HEADER SYNTAX

FIG. 8B

| nal_unit_header( ) { | Descriptor |
|---|---|
| forbidden_zero_bit | f(1) |
| nal_unit_type | u(6) |
| layer_id | u(6) |
| nuh_temporal_id_plus1 | u(3) |
| } | |

NAL UNIT HEADER SYNTAX

FIG. 8C

| nal_unit( NumBytesInNALunit ) { | Descriptor |
|---|---|
|   nal_unit_header( ) | |
|   NumBytesInRBSP = 0 | |
|   for( i = 2; i < NumBytesInNALunit; i++ ) { | |
|     if( i + 2 < NumBytesInNALunit && next_bits( 24 ) = = 0x000003 ) { | |
|       rbsp_byte[ NumBytesInRBSP++ ] | b(8) |
|       rbsp_byte[ NumBytesInRBSP++ ] | b(8) |
|       i += 2 | |
|       emulation_prevention_three_byte /* equal to 0x03 */ | f(8) |
|     } else | |
|       rbsp_byte[ NumBytesInRBSP++ ] | b(8) |
|   } | |
| } | |

GENERAL NAL UNIT SYNTAX

FIG. 9

| vps_extension( ) { | Descriptor |
|---|---|
|   while( !byte_aligned( ) ) | |
|     vps_extension_byte_alignment_reserved_zero_bit | u(1) |
|   // scalability type and layer_id partitioning method | |
|   scalability_type | u(4) |
|   for( i = 0; i < MaxDim( scalability_type ); i++ ) | |
|     layer_id_dim_len[ i ] | u(3) |
|   // layer specific information | |
|   for( i = 0; i <= max_num_layers_minus1; i++ ) { | |
|     vps_layer_id[ i ] | u(6) |
|     // layer dependency | |
|     num_direct_ref_layers[ i ] | u(6) |
|     for( j = 0; j < num_direct_ref_layers[ i ]; j++ ) | |
|       ref_layer_id[ i ][ j ] | u(6) |
|   } | |
| } | |

EXISTING VIDEO PARAMETER SET EXTENSION SYNTAX

FIG. 10

| scalability_type | MaxDim(scalability_type) | Scalability dimensions |
|---|---|---|
| 0 | 1 | none (base HEVC) |
| 1 | 2 | spatial and quality |
| 2 | 3 | spatial, quality, unspecified |
| 3 | 4 | spatial, quality, unspecified, unspecified |
| 4 | 2 | multiview and depth |
| 5 | 3 | multiview, depth, unspecified |
| 6 | 4 | multiview, depth, unspecified, unspecified |
| 7 | 4 | multiview, spatial, quality and depth |
| 8 | 5 | multiview, spatial, quality, depth, unspecified |
| 9 | 6 | multiview, spatial, quality, depth, unspecified, unspecified |
| 10...15 | reserved | reserved |

EXISTING MEDIA TYPES

FIG. 11

BASE LAYER
    SPS+
    PPS+

ENHANCEMENT LAYER 0
    SPS+
    PPS+

ENHANCMENET LAYER 1
    SPS+
    PPS+

ENHANCEENT LAYER 2
    SPS+
    PPS+

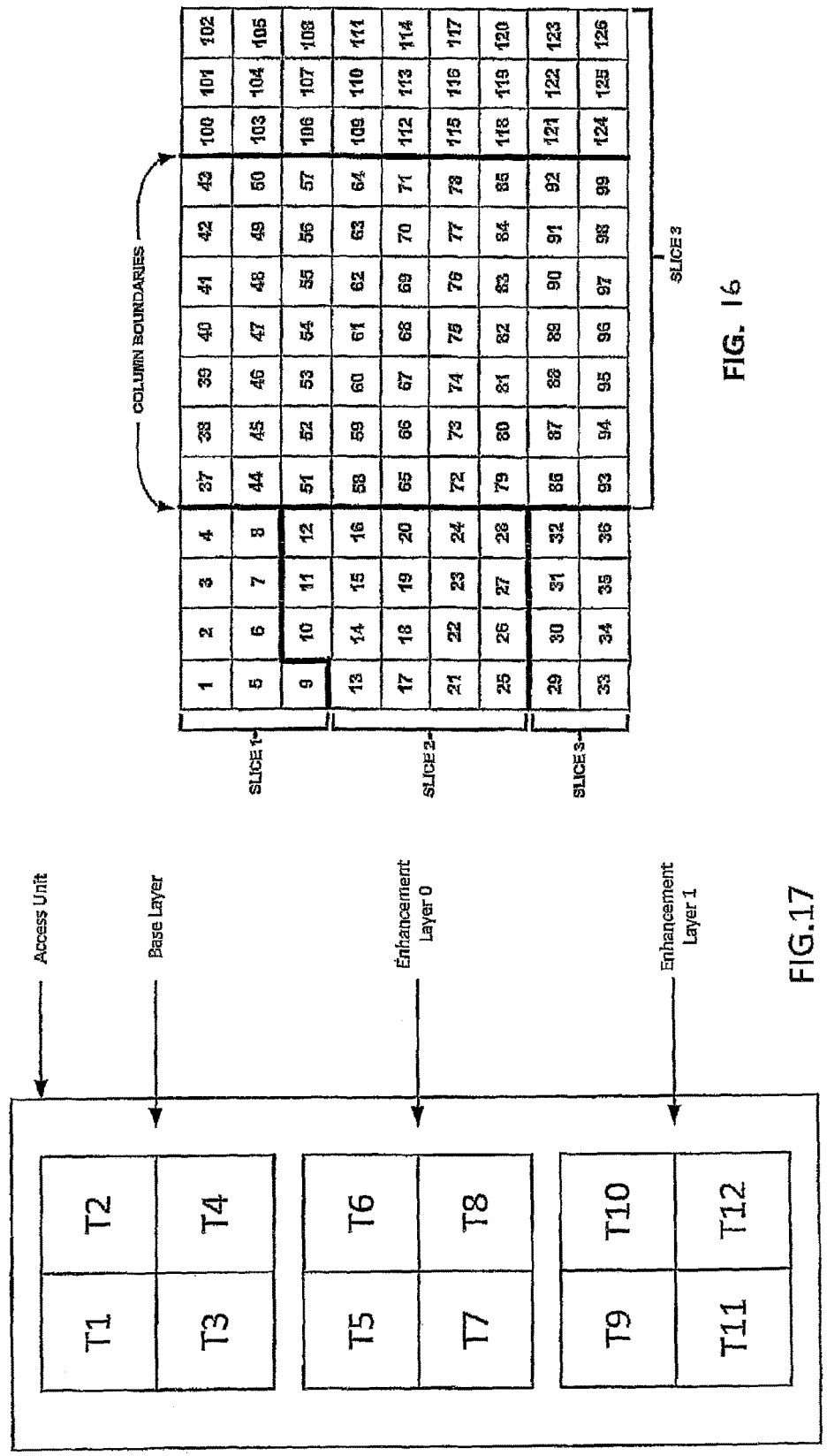

| slice_segment_header( ) { | Descriptor |
|---|---|
| first_slice_segment_in_pic_flag | u(1) |
| if( nal_unit_type >= BLA_W_LP && nal_unit_type <= RSV_IRAP_VCL23 ) | |
| no_output_of_prior_pics_flag | u(1) |
| slice_pic_parameter_set_id | ue(v) |
| if( !first_slice_segment_in_pic_flag ) { | |
| if( dependent_slice_segments_enabled_flag ) | |
| dependent_slice_segment_flag | u(1) |
| slice_segment_address | u(v) |
| } | |
| if( !dependent_slice_segment_flag ) { | |
| if (num_extra_slice_header_bits>0) | |
| discardable_flag | u(1) |
| for( i=1; i < num_extra_slice_header_bits; i++ ) | |
| slice_reserved_flag[ i ] | u(1) |
| slice_type | ue(1) |
| if( output_flag_present_flag ) | |
| pic_output_flag | u(1) |
| if( separate_colour_plane_flag == 1 ) | |
| colour_plane_id | u(2) |
| if( nal_unit_type != IDR_W_RADL && nal_unit_type != IDR_N_LP ) { | |
| slice_pic_order_cnt_lsb | u(v) |
| short_term_ref_pic_set_sps_flag | u(1) |
| if( !short_term_ref_pic_set_sps_flag ) | |
| short_term_ref_pic_set( num_short_term_ref_pic_sets ) | |
| else if( num_short_term_ref_pic_sets > 1 ) | |
| short_term_ref_pic_set_idx | u(v) |
| if( long_term_ref_pics_present_flag ) { | |
| if( num_long_term_ref_pics_sps > 0 ) | |
| num_long_term_sps | ue(v) |
| num_long_term_pics | ue(v) |
| for( i = 0; i < num_long_term_sps + num_long_term_pics; i++ ) { | |
| if( i < num_long_term_sps ) { | |
| if( num_long_term_ref_pics_sps > 1 ) | |
| lt_idx_sps[ i ] | u(v) |
| } else { | |
| poc_lsb_lt[ i ] | u(v) |
| used_by_curr_pic_lt_flag[ i ] | u(1) |
| } | |
| delta_poc_msb_present_flag[ i ] | u(1) |

FIG. 18A

| | |
|---|---|
| if( delta_poc_msb_present_flag[ i ] ) | |
|     delta_poc_msb_cycle_lt[ i ] | ue(v) |
|   } | |
| } | |
| if( sps_temporal_mvp_enabled_flag ) | |
|   slice_temporal_mvp_enabled_flag | u(1) |
| } | |
| if( nuh_layer_id > 0 && NumDirectRefLayers[ nuh_layer_id ] > 0 ) { | |
|   inter_layer_pred_enabled_flag | u(1) |
|   if( inter_layer_pred_enabled_flag && NumDirectRefLayers[ nuh_layer_id ] > 1) { | |
|     if( !max_one_active_ref_layer_flag ) | |
|       num_inter_layer_ref_pics_minus1 | u(v) |
|     for( i = 0; i < NumActiveRefLayerPics; i++ ) | |
|       inter_layer_pred_layer_idc[ i ] | u(v) |
|   } | |
| } | |
| if( NumSamplePredRefLayers[ nuh_layer_id ]>0 && NumActiveRefLayersPics>0 ) | |
|   inter_layer_sample_pred_only_flag | |
| if( sample_adaptive_offset_enabled_flag ) { | |
|   slice_sao_luma_flag | u(1) |
|   slice_sao_chroma_flag | u(1) |
| } | |
| if( slice_type = = P || slice_type = = B ) { | |
|   num_ref_idx_active_override_flag | u(1) |
|   if( num_ref_idx_active_override_flag ) { | |
|     num_ref_idx_l0_active_minus1 | ue(v) |
|     if( slice_type = = B ) | |
|       num_ref_idx_l1_active_minus1 | ue(v) |
|   } | |
|   if( lists_modification_present_flag && NumPicTotalCurr > 1 ) | |
|     ref_pic_lists_modification( ) | |
|   if( slice_type = = B ) | |
|     mvd_l1_zero_flag | u(1) |
|   if( cabac_init_present_flag ) | |
|     cabac_init_flag | u(1) |
|   if( slice_temporal_mvp_enabled_flag ) { | |
|     if(nuh_layer_id>0 && NumActiveMotionPredRefLayers>0) | |
|       alt_collocated_indication_flag | u(1) |
|     if( alt_collocated_indication_flag) | |

FIG. 18B

| | |
|---|---|
| if( NumActiveMotionPredRefLayers>1) ) | |
|    collocated_ref_layer_idx | ue(v) |
| else{ | |
|    if( slice_type == B ) | |
|      collocated_from_l0_flag | u(1) |
|    if( ( collocated_from_l0_flag && num_ref_idx_l0_active_minus1 > 0 ) \|\| <br>      ( !collocated_from_l0_flag && num_ref_idx_l1_active_minus1 > 0 ) ) | |
|      collocated_ref_idx | ue(v) |
|    } | |
| } | |
|    if( ( weighted_pred_flag && slice_type == P ) \|\| <br>      ( weighted_bipred_flag && slice_type == B ) ) | |
|      pred_weight_table( ) | |
|    five_minus_max_num_merge_cand | ue(v) |
| } | |
|    slice_qp_delta | se(v) |
|    if( pps_slice_chroma_qp_offsets_present_flag ) { | |
|      slice_cb_qp_offset | se(v) |
|      slice_cr_qp_offset | se(v) |
|    } | |
|    if( deblocking_filter_override_enabled_flag ) | |
|      deblocking_filter_override_flag | u(1) |
|    if( deblocking_filter_override_flag ) { | |
|      slice_deblocking_filter_disabled_flag | u(1) |
|      if( !slice_deblocking_filter_disabled_flag ) { | |
|         slice_beta_offset_div2 | se(v) |
|         slice_tc_offset_div2 | se(v) |
|      } | |
|    } | |
|    if( pps_loop_filter_across_slices_enabled_flag && <br>      ( slice_sao_luma_flag \|\| slice_sao_chroma_flag \|\| <br>      !slice_deblocking_filter_disabled_flag ) ) | |
|      slice_loop_filter_across_slices_enabled_flag | u(1) |
| } | |
| if( tiles_enabled_flag \|\| entropy_coding_sync_enabled_flag ) { | |
|    num_entry_point_offsets | ue(v) |
|    if( num_entry_point_offsets > 0 ) { | |
|      offset_len_minus1 | ue(v) |
|      for( i = 0; i < num_entry_point_offsets; i++ ) | |
|         entry_point_offset_minus1[ i ] | u(v) |
|    } | |

FIG. 18C

| | |
|---|---|
| } | |
| if( slice_segment_header_extension_present_flag ) { | |
|   slice_segment_header_extension_length | ue(v) |
|   for( i=0;i<slice_segment_header_extension_length; i++ ) | |
|     slice_segment_header_extension_data_byte[ i ] | u(8) |
| } | |
| byte_alignment( ) | |
| } | |

FIG. 18D

| vps_extension( ) { | Descriptor |
|---|---|
|   while( !byte_aligned()) | |
|     vps_extension_byte_alignment_reserved_one_bit | u(1) |
|   avc_base_layer_flag | u(1) |
|   splitting_flag | u(1) |
|   for( i = 0, NumScalabilityTypes = 0; i < 16; i++ ) { | |
|     scalability_mask[ i ] | u(1) |
|     NumScalabilityTypes += scalability_mask[ i ] | |
|   } | |
|   for( j = 0; j < ( NumScalabilityTypes − splitting_flag ); j++ ) | |
|     dimension_id_len_minus1[ j ] | u(3) |
|   vps_nuh_layer_id_present_flag | u(1) |
|   for( i = 0; i <= vps_max_layers_minus1; i++ ) { | |
|     if( vps_nuh_layer_id_present_flag && i>0) | |
|       layer_id_in_nuh[ i ] | u(6) |
|     if( !splitting_flag ) | |
|       for( j = 0; j < NumScalabilityTypes; j++ ) | |
|         dimension_id[ i ][ j ] | u(v) |
|   } | |
|   for( i = 1; i <= vps_max_layers_minus1; i++ ) | |
|     for( j = 0; j < i; j++ ) | |
|       direct_dependency_flag[ i ][ j ] | u(1) |
|   for( i = 0; i < vps_max_layers_minus1; i++ ) | |
|     max_tid_il_ref_pics_plus1[ i ] | u(3) |
|   vps_number_layer_sets_minus1 | u(10) |
|   vps_num_profile_tier_level_minus1 | u(6) |
|   for( i=1; i <= vps_num_profile_tier_level_minus1; i ++ ) { | |
|     vps_profile_present_flag[ i ] | u(1) |
|     if (!vps_profile_present_flag[ i ] | |
|       profile_ref_minus1[ i ] | u(6) |
|     profile_tier_level( vps_profile_present_flag[ i ], vps_max_sub_ayers_minus1 ) | |

FIG. 20A

| | |
|---|---|
| } | |
| numOutputLayerSets = vps_number_layer_sets_minus1 + 1 | |
| more_output_layer_sets_than_default_flag | u(1) |
| if( more_output_layer_sets_than_default_flag ){ | |
|   num_add_output_layer_sets_minus1 | u(10) |
|   numOutputLayerSets + num_add_output_layer_sets_minus1 + 1 | |
| } | |
| if( numOutputLayerSets > 1 ) | |
|   defaut_one_target_output_layer_flag | u(1) |
| for( i = 1; i < NumOutputLayerSets; i++ ) { | |
|   if( i > vps_number_layer_sets_minus1 ){ | |
|     output_layer_set_idx_minus1[ i ] | u(v) |
|     lsIdx = output_layer_set_idx_minus1[ i ] | |
|     for( j = 0; j < NumLayersInIdList[ lsIdx ] -1; j++) | |
|       output_layer_flag[ i ][ j ] | u(1) |
|   } | |
|   profile_level_tier_idx[ i ] | u(v) |
| } | |
| max_one_active_ref_layer_flag | u(1) |
| direct_dep_type_len_minus2 | ue(v) |
| for( i = 1; i <= vps_max_layers_minus1; i++) | |
|   for( j = 0; j < i; j++ ) | |
|     if( direct_dependency_flag[ i ][ j ] ) | |
|       direct_dependency_type[ i ][ j ] | u(v) |
| single_layer_for_non_irap_flag | u(1) |
| } | |

FIG. 20B

| slice_segment_header( ) { | Descriptor |
|---|---|
|   first_slice_segment_in_pic_flag | u(1) |
|   if( nal_unit_type >= BLA_W_LP && nal_unit_type <= RSV_IRAP_VCL23 ) | |
|     no_output_of_prior_pics_flag | u(1) |
|   ... | |
|     if( sps_temporal_mvp_enabled_flag ) | |
|       slice_temporal_mvp_enabled_flag | u(1) |
|     } | |
|   if( nuh_layer_id > 0 && NumDirectRefLayers[ nuh_layer_id ] > 0 ) { | |
|     inter_layer_pred_enabled_flag | u(1) |
|     if( inter_layer_pred_enabled_flag && NumDirectRefLayers[ nuh_layer_id ] > 1) { | |
|       if( !max_one_active_ref_layer_flag ) | |
|         num_inter_layer_ref_pics_minus1 | u(v) |
|       if(NumActiveRefLayerPics1=NumDirectRefLayers[ nuh_layer_id ]){ | |
|         for( i = 0; i < NumActiveRefLayerPics; i++ ) | |
|           inter_layer_pred_layer_mask[ i ] | u(v) |
|       } | |
|     } | |
|   } | |
|   if( NumSamplePredRefLayers[ nuh_layer_id ] > 0 && NumActiveRefLayerPics > 0 ) | |
|     inter_layer_sample_pred_only_flag | u(1) |
|   ... | |
|   byte_alignment( ) | |
| } | |

FIG. 21

| slice_segment_header( ) { | Descriptor |
|---|---|
|   first_slice_segment_in_pic_flag | u(1) |
|   if( nal_unit_type >= BLA_W_LP && nal_unit_type <= RSV_IRAP_VCL23 ) | |
|     no_output_of_prior_pics_flag | u(1) |
|   ... | |
|     if( sps_temporal_mvp_enabled_flag ) | |
|       slice_temporal_mvp_enabled_flag | u(1) |
|     } | |
|   if( nuh_layer_id > 0 && NumDirectRefLayers[ nuh_layer_id ] > 0 ) { | |
|     inter_layer_pred_enabled_flag | u(1) |
|     if( inter_layer_pred_enabled_flag && NumDirectRefLayers[ nuh_layer_id ] > 1 ) { | |
|       if( !max_one_active_ref_layer_flag ) | |
|         num_inter_layer_ref_pics_minus1 | u(v) |
|       for( i = (NumActiveRefLayersPic= = NumDirectRefLayers[ nuh_layer_id]) ? NumActiveRefLayerPics : 0); i < NumActiveRefLayerPics; i++ ) | |
|         inter_layer_pred_layer_mask[ i ] | u(v) |
|       } | |
|     } | |
|   if( NumSamplePredRefLayers[ nuh_layer_id ] > 0 && NumActiveRefLayerPics > 0 ) | |
|     inter_layer_sample_pred_only_flag | u(1) |
|   ... | |
|   byte_alignment( ) | |
| } | |

FIG. 22

| slice_segment_header( ) { | Descriptor |
|---|---|
|   first_slice_segment_in_pic_flag | u(1) |
|   if( nal_unit_type >= BLA_W_LP && nal_unit_type <= RSV_IRAP_VCL23 ) | |
|     no_output_of_prior_pics_flag | u(1) |
|   ... | |
|     if( sps_temporal_mvp_enabled_flag ) | |
|       slice_temporal_mvp_enabled_flag | u(1) |
|     } | |
|   if( nuh_layer_id > 0 && NumDirectRefLayers[ nuh_layer_id ] > 0 ) { | |
|     inter_layer_pred_enabled_flag | u(1) |
|     if( inter_layer_pred_enabled_flag && NumDirectRefLayers[ nuh_layer_id ] > 1) { | |
|       if( !max_one_active_ref_layer_flag ) | |
|         num_inter_layer_ref_pics_minus1 | u(v) |
|       for( i = 0; i < NumDirectRefLayers[ nuh_layer_id ]; i++) | |
|         inter_layer_pred_layer_mask[ i ] | u(1) |
|     } | |
|   } | |
|   if( NumSamplePredRefLayers[ nuh_layer_id ] > 0 && NumActiveRefLayerPics > 0 ) | |
|     inter_layer_sample_pred_only_flag | u(1) |
|   ... | |
|   byte_alignment( ) | |
| } | |

FIG. 23

| slice_segment_header( ) { | Descriptor |
|---|---|
|   first_slice_segment_in_pic_flag | u(1) |
|   if( nal_unit_type >= BLA_W_LP && nal_unit_type <= RSV_IRAP_VCL23 ) | |
|     no_output_of_prior_pics_flag | u(1) |
|   ... | |
|     if( sps_temporal_mvp_enabled_flag ) | |
|       slice_temporal_mvp_enabled_flag | u(1) |
|     } | |
|   if(ilp_slice_signaling_enabled_flag{ | |
|     if( nuh_layer_id > 0 && NumDirectRefLayers[ nuh_layer_id ] > 0 ) { | |
|       inter_layer_pred_enabled_flag | u(1) |
|       if( inter_layer_pred_enabled_flag && NumDirectRefLayers[ nuh_layer_id ] > 1) { | |
|         if( !max_one_active_ref_layer_flag ) | |
|           num_inter_layer_ref_pics_minus1 | u(v) |
|         for( i = 0; i < NumActiveRefLayerPics; i++ ) | |
|           inter_layer_pred_layer_idc[ i ] | u(v) |
|         } | |
|       } | |
|     } | |
|     if( NumSamplePredRefLayers[ nuh_layer_id ] > 0 && NumActiveRefLayerPics > 0 ) | |
|       inter_layer_sample_pred_only_flag | u(1) |
|   ... | |
|   byte_alignment( ) | |
| } | |

FIG. 25

| vps_extension( ) { | Descriptor |
|---|---|
|   while( !byte_aligned( ) ) | |
|     vps_extension_byte_alignment_reserved_one_bit | u(1) |
|   avc_base_layer_flag | u(1) |
|   splitting_flag | u(1) |
|   for( i = 0, NumScalabilityTypes = 0; i < 16; i++ ) { | |
|     scalability_mask[ i ] | u(1) |
|     NumScalabilityTypes += scalability_mask[ i ] | |
|   } | |
|   for( j = 0; j < ( NumScalabilityTypes − splitting_flag ); j++ ) | |
|     dimension_id_len_minus1[ j ] | u(3) |
|   vps_nuh_layer_id_present_flag | u(1) |
|   for( i = 0; i <= vps_max_layers_minus1; i++ ) { | |
|     if( vps_nuh_layer_id_present_flag) | |
|       layer_id_in_nuh[ i ] | u(6) |
|     if( !splitting_flag ) | |
|       for( j = 0; j < NumScalabilityTypes; j++ ) | |
|         dimension_id[ i ][ j ] | u(v) |
|   } | |
|   for( i = 1; i <= vps_max_layers_minus1; i++ ) | |
|     for( j = 0; j < i; j++ ) | |
|       direct_dependency_flag[ i ][ j ] | u(1) |
|   for( i = 0; i< vps_max_layers_minus1; i++ ) | |
|     max_tid_il_ref_pics_plus1[ i ] | u(3) |
|   if( nuh_layer_id>0) | |
|     ilp_slice_signaling_enabled_flag | u(1) |
|   ..... | |

FIG. 26

| vps_extension( ) { | Descriptor |
|---|---|
|   while( !byte_aligned( ) ) | |
|     vps_extension_byte_alignment_reserved_one_bit | u(1) |
|   avc_base_layer_flag | u(1) |
|   splitting_flag | u(1) |
|   for( i = 0, NumScalabilityTypes = 0; i < 16; i++ ) { | |
|     scalability_mask[ i ] | u(1) |
|     NumScalabilityTypes += scalability_mask[ i ] | |
|   } | |
|   for( j = 0; j < ( NumScalabilityTypes − splitting_flag ); j++ ) | |
|     dimension_id_len_minus1[ j ] | u(3) |
|   vps_nuh_layer_id_present_flag | u(1) |
|   for( i = 1; i <= vps_max_layers_minus1; i++ ) { | |
|     if( vps_nuh_layer_id_present_flag) | |
|       layer_id_in_nuh[ i ] | u(6) |
|     if( !splitting_flag ) | |
|       for( j = 0; j < NumScalabilityTypes; j++ ) | |
|         dimension_id[ i ][ j ] | u(v) |
|   } | |
|   for( i = 1; i <= vps_max_layers_minus1; i++ ) | |
|     for( j = 0; j < i; j++ ) | |
|       direct_dependency_flag[ i ][ j ] | u(1) |
|   for( i = 0; i< vps_max_layers_minus1; i++ ) | |
|     max_tid_il_ref_pics_plus1[ i ] | u(3) |
|     ilp_slice_signaling_enabled_flag | u(1) |
|   ..... | |

FIG. 26A

| seq_parameter_set_rbsp( ) { | Descriptor |
|---|---|
| sps_video_parameter_set_id | u(4) |
| sps_max_sub_layers_minus1 | u(3) |
| sps_temporal_id_nesting_flag | u(1) |
| profile_tier_level( sps_max_sub_layers_minus1 ) | |
| sps_seq_parameter_set_id | ue(v) |
| chroma_format_idc | ue(v) |
| ... | |
| scaling_list_enabled_flag | u(1) |
| if( scaling_list_enabled_flag ) { | |
|    sps_scaling_list_data_present_flag | u(1) |
|    if( sps_scaling_list_data_present_flag ) | |
|      scaling_list_data( ) | |
| } | |
| amp_enabled_flag | u(1) |
| sample_adaptive_offset_enabled_flag | u(1) |
| pcm_enabled_flag | u(1) |
| if( nuh_layer_id>0 ) { | |
|    ilp_slice_signaling_enabled_flag | u(1) |
| ... | |
| sps_extension_flag | u(1) |
| if( sps_extension_flag ) | |
|    while( more_rbsp_data( ) ) | |
|      sps_extension_data_flag | u(1) |
| rbsp_trailing_bits( ) | |
| } | |

FIG. 27

| pic_parameter_set_rbsp( ) { | Descriptor |
|---|---|
| pps_pic_parameter_set_id | ue(v) |
| pps_seq_parameter_set_id | ue(v) |
| dependent_slice_segments_enabled_flag | u(1) |
| output_flag_present_flag | u(1) |
| num_extra_slice_header_bits | u(3) |
| sign_data_hiding_enabled_flag | u(1) |
| cabac_init_present_flag | u(1) |
| num_ref_idx_l0_default_active_minus1 | ue(v) |
| num_ref_idx_l1_default_active_minus1 | ue(v) |
| init_qp_minus26 | se(v) |
| pps_loop_filter_across_slices_enabled_flag | u(1) |
| ... | |
| if ( nuh_layer_id>0) | |
|    ilp_slice_signaling_enabled_flag | u(1) |
| ... | |
| pps_extension_flag | u(1) |
| if (pps_extension_flag) | |
|    while( more_rbsp_data()) | |
|       pps_extension_data_flag | u(1) |
| rbsp_trailing_bits() | |
| } | |

Figure 28

| slice_segment_header( ) { | Descriptor |
|---|---|
|   first_slice_segment_in_pic_flag | u(1) |
|   if( nal_unit_type >= BLA_W_LP && nal_unit_type <= RSV_IRAP_VCL23 ) | |
|     no_output_of_prior_pics_flag | u(1) |
|   slice_pic_parameter_set_id | ue(v) |
|   if( !first_slice_segment_in_pic_flag ) { | |
|     if( dependent_slice_segments_enabled_flag ) | |
|       dependent_slice_segment_flag | u(1) |
|     slice_segment_address | u(v) |
|   } | |
|   if( !dependent_slice_segment_flag ) { | |
|   i = 0 | |
|   if( num_extra_slice_header_bits > i ) { | |
|     ~~i++~~ | |
|     poc_reset_flag | u(1) |
|   } | |
|   if( num_extra_slice_header_bits > i ) { | |
|     ~~i++~~ | |
|     discardable_flag | u(1) |
|   } | |
|   for( ~~i = 1~~; i < num_extra_slice_header_bits; i++ ) | |
|     slice_reserved_flag[ i ] | u(1) |
|   slice_type | ue(v) |
|   if( output_flag_present_flag ) | |
|     pic_output_flag | u(1) |
|   if( separate_colour_plane_flag == 1 ) | |
|     colour_plane_id | u(2) |
|   if( nuh_layer_id > 0 \|\| <br>     ( nal_unit_type != IDR_W_RADL && nal_unit_type != IDR_N_LP ) ) { | |
|     slice_pic_order_cnt_lsb | u(v) |
|   if( nal_unit_type != IDR_W_RADL && nal_unit_type != IDR_N_LP ) { | |
|     short_term_ref_pic_set_sps_flag | u(1) |
|     if( !short_term_ref_pic_set_sps_flag ) | |
|       short_term_ref_pic_set( num_short_term_ref_pic_sets ) | |
|     else if( num_short_term_ref_pic_sets > 1 ) | |
|       short_term_ref_pic_set_idx | u(v) |

FIG. 30A

| | |
|---|---|
| if( long_term_ref_pics_present_flag ) { | |
|     if( num_long_term_ref_pics_sps > 0 ) | |
|         num_long_term_sps | ue(v) |
|         num_long_term_pics | ue(v) |
|     for( i = 0; i < num_long_term_sps + num_long_term_pics; i++ ) { | |
|         if( i < num_long_term_sps ) { | |
|             if( num_long_term_ref_pics_sps > 1 ) | |
|                 lt_idx_sps[ i ] | u(v) |
|         } else { | |
|             poc_lsb_lt[ i ] | u(v) |
|             used_by_curr_pic_lt_flag[ i ] | u(1) |
|         } | |
|         delta_poc_msb_present_flag[ i ] | u(1) |
|         if( delta_poc_msb_present_flag[ i ] ) | |
|             delta_poc_msb_cycle_lt[ i ] | ue(v) |
|     } | |
| } | |
| if( sps_temporal_mvp_enabled_flag ) | |
|     slice_temporal_mvp_enabled_flag | u(1) |
| } | |
| if( nuh_layer_id > 0 && all_ref_layers_active_flag && <br>     NumDirectRefLayers[ nuh_layer_id ] > 0 ) { | |
|     inter_layer_pred_enabled_flag | u(1) |
|     if( inter_layer_pred_enabled_flag && NumDirectRefLayers[ nuh_layer_id ] > 1) { | |
|         if( !max_one_active_ref_layer_flag ) | |
|             num_inter_layer_ref_pics_minus1 | u(v) |
|         if( NumActiveRefLayerPics != NumDirectRefLayers[ nuh_layer_id ] ) | |
|             for( i = 0; i < NumActiveRefLayerPics; i++ ) | |
|                 inter_layer_pred_layer_idc[ i ] | u(v) |
|     } | |
| } | |
| if( sample_adaptive_offset_enabled_flag ) { | |
|     slice_sao_luma_flag | u(1) |
|     slice_sao_chroma_flag | u(1) |
| } | |

FIG. 30B

| | |
|---|---|
| if( slice_type == P \|\| slice_type == B ) { | |
|   num_ref_idx_active_override_flag | u(1) |
|   if( num_ref_idx_active_override_flag ) { | |
|     num_ref_idx_l0_active_minus1 | ue(v) |
|     if( slice_type == B ) | |
|       num_ref_idx_l1_active_minus1 | ue(v) |
|   } | |
|   if( lists_modification_present_flag && NumPicTotalCurr > 1 ) | |
|     ref_pic_lists_modification( ) | |
|   if( slice_type == B ) | |
|     mvd_l1_zero_flag | u(1) |
|   if( cabac_init_present_flag ) | |
|     cabac_init_flag | u(1) |
|   if( slice_temporal_mvp_enabled_flag ) { | |
|     if( slice_type == B ) | |
|       collocated_from_l0_flag | u(1) |
|     if( ( collocated_from_l0_flag && num_ref_idx_l0_active_minus1 > 0 ) \|\|<br>      ( !collocated_from_l0_flag && num_ref_idx_l1_active_minus1 > 0 ) ) | |
|       collocated_ref_idx | ue(v) |
|   } | |
|   if( ( weighted_pred_flag && slice_type == P ) \|\|<br>    ( weighted_bipred_flag && slice_type == B ) ) | |
|     pred_weight_table( ) | |
|   five_minus_max_num_merge_cand | ue(v) |
| } | |
| slice_qp_delta | se(v) |
| if( pps_slice_chroma_qp_offsets_present_flag ) { | |
|   slice_cb_qp_offset | se(v) |
|   slice_cr_qp_offset | se(v) |
| } | |
| if( deblocking_filter_override_enabled_flag ) | |
|   deblocking_filter_override_flag | u(1) |
| if( deblocking_filter_override_flag ) { | |
|   slice_deblocking_filter_disabled_flag | u(1) |
|   if( !slice_deblocking_filter_disabled_flag ) { | |
|     slice_beta_offset_div2 | se(v) |
|     slice_tc_offset_div2 | se(v) |
|   } | |
| } | |

FIG. 30C

| | |
|---|---|
| if( pps_loop_filter_across_slices_enabled_flag &&<br>   ( slice_sao_luma_flag \|\| slice_sao_chroma_flag \|\|<br>    !slice_deblocking_filter_disabled_flag ) ) | |
|   slice_loop_filter_across_slices_enabled_flag | u(1) |
| } | |
| if( tiles_enabled_flag \|\| entropy_coding_sync_enabled_flag ) { | |
|   num_entry_point_offsets | ue(v) |
|   if( num_entry_point_offsets > 0 ) { | |
|     offset_len_minus1 | ue(v) |
|     for( i = 0; i < num_entry_point_offsets; i++ ) | |
|       entry_point_offset_minus1[ i ] | u(v) |
|   } | |
| } | |
| if( slice_segment_header_extension_present_flag ) { | |
|   slice_segment_header_extension_length | ue(v) |
|   for( i = 0; i < slice_segment_header_extension_length; i++) | |
|     slice_segment_header_extension_data_byte[ i ] | u(8) |
| } | |
| byte_alignment( ) | |
| } | |

FIG. 30D

| vps_extension( ) { | Descriptor |
|---|---|
|   avc_base_layer_flag | u(1) |
|   vps_vui_offset | u(16) |
|   ... | |
|   for( i = 1; i <= vps_max_layers_minus1; i++ ) | |
|     for( j = 0; j < i; j++ ) | |
|       direct_dependency_flag[ i ][ j ] | u(1) |
|   for( i=0;i <= vps_max_layers_minus1; i++ ) | |
|     sub_layers_vps_max_minus1[ i ] | u(3) |
|   max_tid_ref_present_flag | u(1) |
|   if( max_tid_ref_present_flag ) | |
|     for( i = 0; i < vps_max_layers_minus1; i++ ) | |
|       max_tid_il_ref_pics_plus1[ i ] | u(3) |
|   all_ref_layers_active_flag | u(1) |
|   ... | |
| } | |

FIG. 31

| | |
|---|---|
| ... | |
|     direct_dependency_flag[ i ][ j ] | u(1) |
|   for( i=1;i <= vps_max_layers_minus1; i++) | |
|     sub_layers_vps_max_minus1[ i ] | u(3) |
| max_tid_ref_present_flag | u(1) |
| ... | |

FIG. 32

| vps_extension( ) { | Descriptor |
|---|---|
| avc_base_layer_flag | u(1) |
| vps_vui_offset | u(16) |
| ... | |
| for( i = 1; i <= vps_max_layers_minus1; i++ ) | |
|    for( j = 0; j < i; j++ ) | |
|       direct_dependency_flag[ i ][ j ] | u(1) |
| sub_layers_vps_max_minus1_present_flag | u(1) |
| if(sub_layers_vps_max_minus1_present_flag) | |
|    for( i = 0; i < vps_max_layers_minus1; i++ ) | |
|       sub_layers_vps_max_minus1[ i ] | u(3) |
| max_tid_ref_present_flag | u(1) |
| if(max_tid_ref_present_flag) | |
|    for( i=0; i < vps_max_layers_minus1; i ++ ) | |
|       max_tid_il_ref_pics_plus1[ i ] | u(3) |
| ... | |
| } | |

FIG. 33

| | |
|---|---|
| ... | |
|     direct_dependency_flag[ i ][ j ] | u(1) |
| sub_layers_vps_max_minus1_present_flag | u(1) |
| if(sub_layers_vps_max_minus1_present_flag) | |
| for( i = 0; i <= vps_max_layers_minus1; i++ ) | |
|     sub_layers_vps_max_minus1[ i ] | u(3) |
| max_tid_ref_present_flag | u(1) |
| ... | |

FIG. 34

| vps_extension( ) { | Descriptor |
|---|---|
|   avc_base_layer_flag | u(1) |
|   vps_vui_offset | u(16) |
|   ... | |
|   for( i = 1; i <= vps_max_layers_minus1; i++ ) | |
|     for( j = 0; j < i; j++ ) | u(1) |
|       direct_dependency_flag[ i ][ j ] | |
|   for( i = 0; i <= vps_max_layers_minus1; i++ ) | u(1) |
|     sub_layers_vps_max_minus1_predict_flag[ i ] | |
|     if( !sub_layers_vps_max_minus1_predict_flag[ i ]) | u(3) |
|       sub_layers_vps_max_minus1[ i ] | |
|   } | u(1) |
|   max_tid_ref_present_flag | |
|   if( max_tid_ref_present_flag) | |
|     for( i=0; i<vps_max_layers_minus1; i++) | u(3) |
|       max_tid_il_ref_pics_plus1[ i ] | u(1) |
|   all_ref_layers_active_flag | |
|   ... | |
| } | |

FIG. 35

| | |
|---|---|
| ... | |
| direct_dependency_flag[ i ][ j ] | u(1) |
| for( i = 1; i <= vps_max_layers_minus1; i++ ) { | |
|    sub_layers_vps_max_minus1_predict_flag[ i ] | u(1) |
|    if( !sub_layers_vps_max_minus1_predict_flag[ i ]) | |
|      sub_layers_vps_max_minus1[ i ] | u(3) |
| } | |
| max_tid_ref_present_flag | u(1) |
| ... | |

FIG. 36

| slice_segment_header( ) { | Descriptor |
|---|---|
|   first_slice_segment_in_pic_flag | u(1) |
|   ... | |
|     if( sps_temporal_mvp_enabled_flag ) | |
|       slice_temporal_mvp_enabled_flag | u(1) |
|   } | |
|     if( nuh_layer_id > 0 && all_ref_layers_active_flag && <br>        NumDirectRefLayers[ nuh_layer_id ] > 0 ) { | |
|       inter_layer_pred_enabled_flag | u(1) |
|       if( inter_layer_pred_enabled_flag && NumDirectRefLayers[ nuh_layer_id ] > 1 ) { | |
|         if( !max_one_active_ref_layer_flag ) | |
|           num_inter_layer_ref_pics_minus1 | u(v) |
|         if( NumActiveRefLayerPics != NumDirectRefLayers[ nuh_layer_id ]) | |
|           for( i=0; i<NumActiveRefLayerPics; i++) | |
|             inter_layer_pred_layer_idc[ i ] | u(v) |
|       } | |
|   } | |
|   if( nuh_layer_id>0){ | |
|     for( i=0; i<NumActiveRefLayerPics; i++) | |
|       layer_present_in_au_flag[ i ] | u(1) |
|   } | |
|   if( sample_adaptive_offset_enabled_flag){ | |
|     slice_sao_luma_flag | u(1) |
|     slice_sao_chroma_flag | u(1) |
|   } | |
|   ... | |
| } | |

FIG. 37

| slice_segment_header( ) { | Descriptor |
|---|---|
|   first_slice_segment_in_pic_flag | u(1) |
|   ... | |
|   if( sps_temporal_mvp_enabled_flag ) | |
|     slice_temporal_mvp_enabled_flag | u(1) |
|   } | |
|   if( nuh_layer_id > 0 && all_ref_layers_active_flag && <br>       NumDirectRefLayers[ nuh_layer_id ] > 0 ) { | |
|     inter_layer_pred_enabled_flag | u(1) |
|     if( inter_layer_pred_enabled_flag && NumDirectRefLayers[ nuh_layer_id ] > 1 ) { | |
|       if( !max_one_active_ref_layer_flag ) | |
|         num_inter_layer_ref_pics_minus1 | u(v) |
|       if( NumActiveRefLayerPics != NumDirectRefLayers[ nuh_layer_id ]) | |
|         for( i=0; i<NumActiveRefLayerPics; i++) | |
|           inter_layer_pred_layer_idc[ i ] | u(v) |
|     } | |
|   } | |
|   if( nuh_layer_id>0){ | |
|     for( i=0; i<NumDirectRefLayers[ nuh_layer_id]; i++); | |
|       layer_present_in_au_flag[ i ] | u(1) |
|   } | |
|   if( sample_adaptive_offset_enabled_flag){ | |
|     slice_sao_luma_flag | u(1) |
|     slice_sao_chroma_flag | u(1) |
|   } | |
|   ... | |
| } | |

FIG. 38

| slice_segment_header( ) { | Descriptor |
|---|---|
|   first_slice_segment_in_pic_flag | u(1) |
|   ... | |
|     if( sps_temporal_mvp_enabled_flag ) | |
|       slice_temporal_mvp_enabled_flag | u(1) |
|     } | |
|     if( nuh_layer_id > 0 && all_ref_layers_active_flag && <br>        NumDirectRefLayers[ nuh_layer_id ] > 0 ) { | |
|       inter_layer_pred_enabled_flag | u(1) |
|       if( inter_layer_pred_enabled_flag && NumDirectRefLayers[ nuh_layer_id ] > 1) { | |
|         if( !max_one_active_ref_layer_flag ) | |
|           num_inter_layer_ref_pics_minus1 | u(v) |
|         if( NumActiveRefLayerPics != NumDirectRefLayers[ nuh_layer_id ]) | |
|           for( i=0; i<NumActiveRefLayerPics; i++) | |
|             inter_layer_pred_layer_idc[ i ] | u(v) |
|       } | |
|     } | |
|   if( nuh_layer_id>0){ | |
|     for( i=0; i<LayerIdxInVps[ nuh_layer_id]; i++): | |
|       layer_present_in_au_flag[ i ] | u(1) |
|   } | |
|   if( sample_adaptive_offset_enabled_flag){ | |
|     slice_sao_luma_flag | u(1) |
|     slice_sao_chroma_flag | u(1) |
|   } | |
|   ... | |
| } | |

FIG. 39

| | |
|---|---|
| if( nuh_layer_id > 0 && (all_ref_layers_active_flag \|\| max_one_active_ref_layer_flag \|\| (NumDirectRefLayers[ nuh_layer_id ] = = 1)){ | |
|    for( i=0; i< NumActiveRefLayerPics; i++) | |
|      layer_present_in_au_flag[ i ] | u(1) |
| } | |

FIG. 40

| if( nuh_layer_id > 0 && (all_ref_layers_active_flag \|\| max_one_active_ref_layer_flag \|\| (NumDirectRefLayers[ nuh_layer_id ] == 1)){ | |
|---|---|
| for( i=0; i< NumDirectRefLayers[ nuh_layer_id]; i++) | |
| layer_present_in_au_flag[ i ] | u(1) |
| } | |

FIG. 41

| | |
|---|---|
| if( nuh_layer_id > 0  && (all_ref_layers_active_flag \|\| max_one_active_ref_layer_flag \|\| (NumDirectRefLayers[ nuh_layer_id ] = = 1)){ | |
| for( i=0; i< LayerIdxInVps[ nuh_layer_id]; i++) | |
|    layer_present_in_au_flag[ i ] | u(1) |
| } | |

FIG. 42

```
for( i = 0; i < NumActiveRefLayerPics; i++ ) {
   if(layer_present_in_au_flag[ i ]) {
   if( there is a picture picX in the DPB that is in the same access unit as the current picture and has
       nuh_layer_id equal to RefPicLayerId[ i ] ) {
       an interlayer reference picture rsPic is derived by invoking the subclause H.8.1.4 with picX and
          RefPicLayerId[ i ] given as inputs
       if( ( ViewId[ nuh_layer_id ] <= ViewId[ 0 ] &&
                                     ViewId[ nuh_layer_id ] <= ViewId[ RefPicLayerId[ i ] ] ) ||
           ( ViewId[ nuh_layer_id ] >= ViewId[ 0 ] &&
                                     ViewId[ nuh_layer_id ] >= ViewId[ RefPicLayerId[ i ] ] ) ) {
          RefPicSetInterLayer0[ NumActiveRefLayerPics0 ] = rsPic
          RefPicSetInterLayer0[ NumActiveRefLayerPics0++ ] is marked as "used for long-term
reference"
       } else {
          RefPicSetInterLayer1[ NumActiveRefLayerPics1 ] = rsPic
          RefPicSetInterLayer1[ NumActiveRefLayerPics1++ ] is marked as "used for long-term
reference"
       }
   } else
       RefPicSetInterLayer0[ NumActiveRefLayerPics0++ ] = "no reference picture"
   }
}
```

FIG. 43

```
for( i = 0; i < NumActiveRefLayerPics; i++ ) {
  if(layer_present_in_au_flag[ LayerIdxInVps[ RefPicLayerId[ i ] ]) {
    if( there is a picture picX in the DPB that is in the same access unit as the current picture and has
        nuh_layer_id equal to RefPicLayerId[ i ] ) {
      an interlayer reference picture rsPic is derived by invoking the subclause H.8.1.4 with picX and
          RefPicLayerId[ i ] given as inputs
      if( ( ViewId[ nuh_layer_id ] <= ViewId[ 0 ] &&
                              ViewId[ nuh_layer_id ] <= ViewId[ RefPicLayerId[ i ] ] ) ||
          ( ViewId[ nuh_layer_id ] >= ViewId[ 0 ] &&
                              ViewId[ nuh_layer_id ] >= ViewId[ RefPicLayerId[ i ] ] ) ) {
        RefPicSetInterLayer0[ NumActiveRefLayerPics0 ] = rsPic
        RefPicSetInterLayer0[ NumActiveRefLayerPics0++ ] is marked as "used for long-term reference"
      } else {
        RefPicSetInterLayer1[ NumActiveRefLayerPics1 ] = rsPic
        RefPicSetInterLayer1[ NumActiveRefLayerPics1++ ] is marked as "used for long-term reference"
      }
    } else
      RefPicSetInterLayer0[ NumActiveRefLayerPics0++ ] = "no reference picture"
  }
}
```

FIG. 44

```
for( i = 0; i < NumActiveRefLayerPics; i++ ) {
if(layer_present_in_au_flag[ LayerIdxInVps[ RefLayerId[ nuh_layer_id ][ inter_layer_pred_layer_idc[ i ] ]
] ]) {
        if( there is a picture picX in the DPB that is in the same access unit as the current picture and has
            nuh_layer_id equal to RefPicLayerId[ i ] ) {
                an interlayer reference picture rsPic is derived by invoking the subclause H.8.1.4 with
picX and
                        RefPicLayerId[ i ] given as inputs
                if( ( ViewId[ nuh_layer_id ] <= ViewId[ 0 ]   &&
                                                                                    ViewId[ nuh_layer_id ]
<= ViewId[ RefPicLayerId[ i ] ] ) ||
                        ( ViewId[ nuh_layer_id ] >= ViewId[ 0 ]   &&
                                                                                    ViewId[ nuh_layer_id ]
>= ViewId[ RefPicLayerId[ i ] ] ) ) {
                        RefPicSetInterLayer0[ NumActiveRefLayerPics0 ] = rsPic
                        RefPicSetInterLayer0[ NumActiveRefLayerPics0++ ] is marked as "used for
long-term reference"
                } else {
                        RefPicSetInterLayer1[ NumActiveRefLayerPics1 ] = rsPic
                        RefPicSetInterLayer1[ NumActiveRefLayerPics1++ ] is marked as "used for
long-term reference"
                }
        } else
                RefPicSetInterLayer0[ NumActiveRefLayerPics0++ ] = "no reference picture"
        }
}
```

FIG. 45

```
for( i = 0; i < NumActiveRefLayerPics; i++ ) {
  if(layer_present_in_au_flag[ LayerIdxInVps[ RefLayerId[ nuh_layer_id ] [ i ] ])  {
    if( there is a picture picX in the DPB that is in the same access unit as the current picture and has
        nuh_layer_id equal to RefPicLayerId[ i ] ) {
      an interlayer reference picture rsPic is derived by invoking the subclause H.8.1.4 with picX and
          RefPicLayerId[ i ] given as inputs
      if( ( ViewId[ nuh_layer_id ] <= ViewId[ 0 ] &&
                          ViewId[ nuh_layer_id ] <= ViewId[ RefPicLayerId[ i ] ] ) ||
          ( ViewId[ nuh_layer_id ] >= ViewId[ 0 ] &&
                          ViewId[ nuh_layer_id ] >= ViewId[ RefPicLayerId[ i ] ] ) ) {
        RefPicSetInterLayer0[ NumActiveRefLayerPics0 ] = rsPic
        RefPicSetInterLayer0[ NumActiveRefLayerPics0++ ] is marked as "used for long-term reference"
      } else {
        RefPicSetInterLayer1[ NumActiveRefLayerPics1 ] = rsPic
        RefPicSetInterLayer1[ NumActiveRefLayerPics1++ ] is marked as "used for long-term reference"
      }
    } else
      RefPicSetInterLayer0[ NumActiveRefLayerPics0++ ] = "no reference picture"
  }
}
```

FIG. 46

| slice_segment_header( ) { | Descriptor |
|---|---|
|   first_slice_segment_in_pic_flag | u(1) |
|   ... | |
|     if( sps_temporal_mvp_enabled_flag) | |
|       sps_temporal_mvp_enabled_flag | u(1) |
|     } | |
|       if( nuh_layer_id>0 && NumDirectRefLayers[ nuh_layer_id]>0{ | |
|         inter_layer_pred_enabled_flag | u(1) |
|         if(inter_layer_pred_enabled_flag){ | |
|           num_inter_layer_ref_pics_minus1 | u(v) |
|           for( i = 0; i < num_inter_layer_ref_pics_minus1; i++ ) | |
|             inter_layer_pred_layer_idc[ i ] | u(v) |
|         } | |
|     } | |
|     if( sample_adaptive_offset_enabled_flag){ | |
|       slice_sao_luma_flag | u(1) |
|       slice_sao_chroma_flag | u(1) |
|     } | |
|   ... | |
| } | |

FIG. 47

| | |
|---|---|
| ... | |
| ilp_restricted_ref_layers_flag | u(1) |
| if( ilp_restricted_ref_layers_flag ) | |
|   for( i = 1; i <= MaxLayersMinus1; i++ ) | |
|     for( j = 0; j < NumDirectRefLayers[ layer_id_in_nuh[ i ] ]; j++ ) { | |
|       if( ( vps_base_layer_external_flag == 0 ) \|\| ( ( vps_base_layer_external_flag == 1 ) && ( layer_id_in_nuh[ LayerIdxInVps[ RefLayerId( layer_id_in_nuh[ i ][ j ] ] ] ] != 0 ) ) ) { | |
|         min_spatial_segment_offset_plus1[ i ][ j ] | ue(v) |
|         if( min_spatial_segment_offset_plus1[ i ][ j ] > 0 ) { | |
|           ctu_based_offset_enabled_flag[ i ][ j ] | u(1) |
|           if( ctu_based_offset_enabled_flag[ i ][ j ] ) | |
|             min_horizontal_ctu_offset_plus1[ i ][ j ] | ue(v) |
|         } | |
|       } | |
|     } | |
| vps_vui_bsp_hrd_present_flag | u(1) |

FIG. 52

| | |
|---|---|
| ... | |
| tiles_not_in_use_flag | u(1) |
| if( !tiles_not_in_use_flag ) { | |
|   for( i = vps_base_layer_external_flag ? 1 : 0; i <= MaxLayersMinus1; i++ ) { | |
|     tiles_in_use_flag[ i ] | u(1) |
|     if( tiles_in_use_flag[ i ] ) | |
|       loop_filter_not_across_tiles_flag[ i ] | u(1) |
|   } | |
|   for( i = 1; i <= MaxLayersMinus1; i++ ) | |
|     for( j = 0; j < NumDirectRefLayers[ layer_id_in_nuh[ i ] ]; j++ ) { | |
|       if( ( vps_base_layer_external_flag == 0 ) \|\| ( ( vps_base_layer_external_flag == 1 ) && ( layer_id_in_nuh[ LayerIdxInVps[ RefLayerId[ layer_id_in_nuh[ i ][ j ] ] ] ] != 0 ) ) ) { | |
|         layerIdx = LayerIdxInVps[ RefLayerId[ layer_id_in_nuh[ i ] ][ j ] ] | |
|         if( tiles_in_use_flag[ i ] && tiles_in_use_flag[ layerIdx ] ) | |
|           tile_boundaries_aligned_flag[ i ][ j ] | u(1) |
|       } | |
|     } | |
| } | |

FIG. 53

| | |
|---|---|
| ... | |
| bit_rate_present_vps_flag | u(1) |
| pic_rate_present_vps_flag | u(1) |
| if( bit_rate_present_vps_flag \|\| pic_rate_present_vps_flag ) | |
|   for( i = vps_base_layer_external_flag ? 1 : 0; i < vps_number_layer_sets_minus1; i++ ) | |
|     for( j = 0; j <= vps_max_sub_layers_minus1; j++ ) { | |
|       If( bit_rate_present_vps_flag ) | |
|         bit_rate_present_flag[ i ][ j ] | u(1) |
|       if( pic_rate_present_vps_flag ) | |
|         pic_rate_present_flag[ i ][ j ] | u(1) |
|       if( bit_rate_present_flag[ i ][ j ] ) { | |
|         avg_bit_rate[ i ][ j ] | u(16) |
|         max_bit_rate[ i ][ j ] | u(16) |
|       } | |
|       if( pic_rate_present_flag[ i ][ j ] ) { | |
|         constant_pic_rate_idc[ i ][ j ] | u(2) |
|         avg_pic_rate[ i ][ j ] | u(16) |
|       } | |
|     } | |

FIG. 54

SYSTEM FOR TEMPORAL IDENTIFIER HANDLING FOR HYBRID SCALABILITY

TECHNICAL FIELD

The present disclosure relates generally to electronic devices.

BACKGROUND OF THE INVENTION

Background Art

Electronic devices have become smaller and more powerful in order to meet consumer needs and to improve portability and convenience. Consumers have become dependent upon electronic devices and have come to expect increased functionality. Some examples of electronic devices include desktop computers, laptop computers, cellular phones, smart phones, media players, integrated circuits, etc.

Some electronic devices are used for processing and displaying digital media. For example, portable electronic devices now allow for digital media to be consumed at almost any location where a consumer may be. Furthermore, some electronic devices may provide download or streaming of digital media content for the use and enjoyment of a consumer.

SUMMARY OF INVENTION

Technical Problem

The increasing popularity of digital media has presented several problems. For example, efficiently representing high-quality digital media for storage, transmittal and rapid playback presents several challenges. As can be observed from this discussion, systems and methods that represent digital media efficiently with improved performance may be beneficial.

Solution to Problem

According to the present invention, A method for decoding a video bitstream comprising the steps of: (a) receiving a base bitstream representative of a coded video sequence; (b) receiving at least one enhancement bitstreams representative of said coded video sequence; (c) receiving a video parameter set containing syntax elements that apply to said base bitstream and said at least one enhancement bitstreams where said syntax elements selectively signaling bitrate and picture rate information for said base bitstream based upon whether said base bitstream is externally signaled or internally specified.

BRIEF DESCRIPTION OF DRAWINGS

The foregoing and other objectives, features, and advantages of the invention will be more readily understood upon consideration of the following detailed description of the invention, taken in conjunction with the accompanying drawings.

FIG. 8A illustrates different NAL Unit header syntax.

FIG. 8B illustrates different NAL Unit header syntax.

FIG. 8C illustrates different NAL Unit header syntax.

FIG. 9 illustrates a general NAL Unit syntax.

FIG. 10 illustrates an existing video parameter set.

FIG. 11 illustrates existing scalability types.

FIG. 12 illustrates a base layer and enhancement layers.

FIG. 15 illustrates a picture with column and row boundaries.

FIG. 16 illustrates a picture with slices.

FIG. 17 illustrates an access unit with a base layer, enhancement layers, and tiles.

FIG. 18A illustrates an exemplary slide segment header syntax.

FIG. 18B illustrates an exemplary slide segment header syntax.

FIG. 18C illustrates an exemplary slide segment header syntax.

FIG. 18D illustrates an exemplary slide segment header syntax.

FIG. 20A illustrates an exemplary vps extension syntax syntax.

FIG. 20B illustrates an exemplary vps extension syntax syntax.

FIG. 21 illustrates an exemplary slice segment header syntax.

FIG. 22 illustrates an exemplary slice segment header syntax.

FIG. 23 illustrates an exemplary slice segment header syntax.

FIG. 25 illustrates an exemplary slice segment header.

FIG. 26 illustrates an exemplary vps extension syntax.

FIG. 26A illustrates an exemplary vps extension syntax.

FIG. 27 illustrates an exemplary sequence parameter set syntax.

FIG. 28 illustrates an exemplary picture parameter set syntax.

FIG. 30A illustrates an exemplary slice segment header syntax.

FIG. 30B illustrates an exemplary slice segment header syntax.

FIG. 30C illustrates an exemplary slice segment header syntax.

FIG. 30D illustrates an exemplary slice segment header syntax.

FIG. 31 illustrates an exemplary vps_extension syntax.

FIG. 32 illustrates vps_max_sub_layers_minus1 signaling.

FIG. 33 illustrates an exemplary vps_extension syntax.

FIG. 34 illustrates vps_max_sub_layers_minus1 signaling.

FIG. 35 illustrates an exemplary vps_extension syntax.

FIG. 36 illustrates vps_max_sub_layers_minus1 signaling.

FIG. 37 illustrates an exemplary slice_segment_header syntax.

FIG. 38 illustrates an exemplary slice_segment_header syntax.

FIG. 39 illustrates an exemplary slice_segment_header syntax.

FIG. 40 illustrates an exemplary implementation for the layer_present_in_au_flag[i].

FIG. 41 illustrates an exemplary implementation for the layer_present_in_au_flag[i].

FIG. 42 illustrates an exemplary implementation for the layer_present_in_au_flag[i].

FIG. 43 illustrates an exemplary decoding process for inter-layer reference picture set.

FIG. 44 illustrates an exemplary decoding process for inter-layer reference picture set.

FIG. 45 illustrates an exemplary decoding process for inter-layer reference picture set.

FIG. 46 illustrates an exemplary decoding process for inter-layer reference picture set.

FIG. 47. Illustrates an exemplary slice segment header.

FIG. 52 illustrates an exemplary portion of a VPS extension syntax.

FIG. 53 illustrates an exemplary portion of a VPS extension syntax.

FIG. 54 illustrates a layer set signaling structure.

DESCRIPTION OF EMBODIMENTS

Figure 1A:
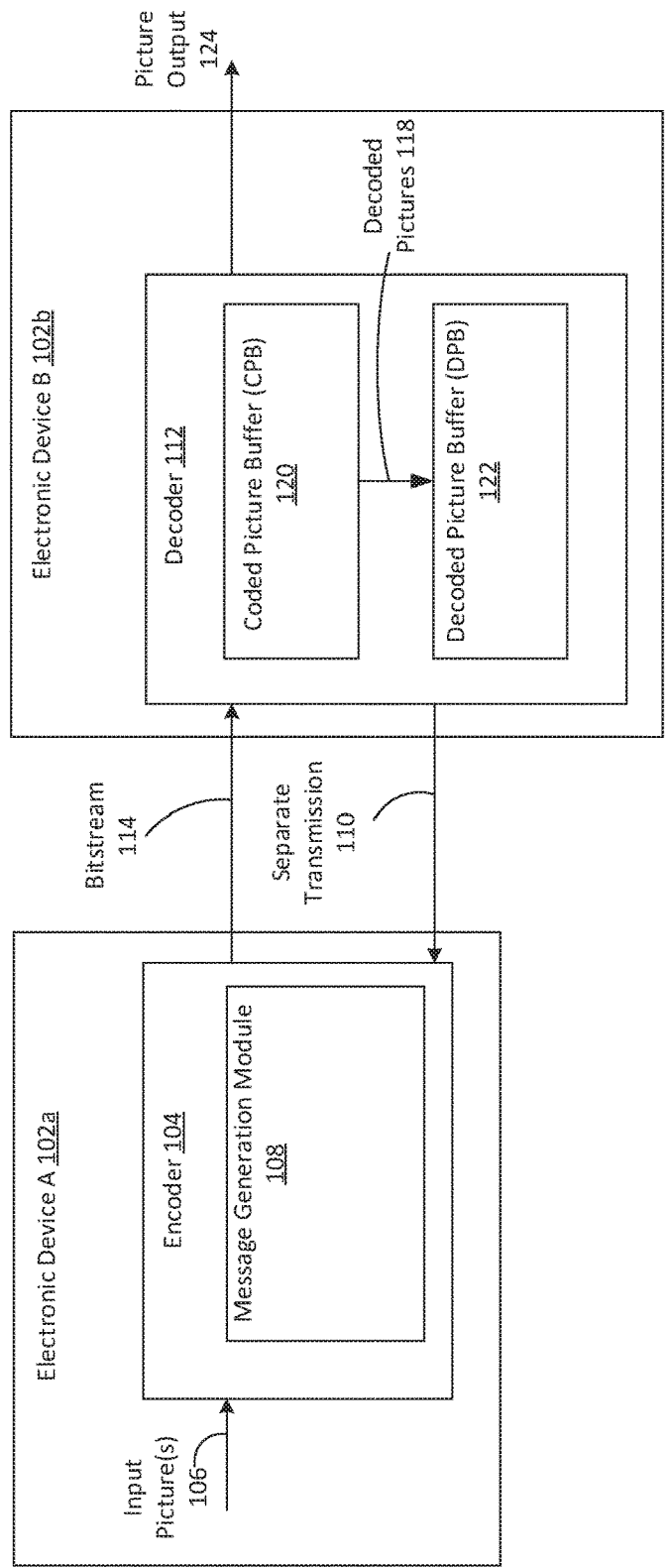
FIG. 1A is a block diagram illustrating an example of one or more electronic devices in which systems and methods for sending a message and buffering a bitstream may be implemented.

FIG. 1A is a block diagram illustrating an example of one or more electronic devices 102 in which systems and methods for sending a message and buffering a bitstream may be implemented. In this example, electronic device A 102a and electronic device B 102b are illustrated. However, it should be noted that one or more of the features and functionality described in relation to electronic device A 102a and electronic device B 102b may be combined into a single electronic device in some configurations.

Electronic device A 102a includes an encoder 104. The encoder 104 includes a message generation module 108.

Each of the elements included within electronic device A 102a (e.g., the encoder 104 and the message generation module 108) may be implemented in hardware, software or a combination of both.

Electronic device A 102a may obtain one or more input pictures 106. In some configurations, the input picture(s) 106 may be captured on electronic device A 102a using an image sensor, may be retrieved from memory and/or may be received from another electronic device.

The encoder 104 may encode the input picture(s) 106 to produce encoded data. For example, the encoder 104 may encode a series of input pictures 106 (e.g., video). In one configuration, the encoder 104 may be a HEVC encoder. The encoded data may be digital data (e.g., part of a bitstream 114). The encoder 104 may generate overhead signaling based on the input signal.

The message generation module 108 may generate one or more messages. For example, the message generation module 108 may generate one or more SEI messages or other messages. For a CPB that supports operation on a sub-picture level, the electronic device 102 may send sub-picture parameters, (e.g., CPB removal delay parameter). Specifically, the electronic device 102 (e.g., the encoder 104) may determine whether to include a common decoding unit CPB removal delay parameter in a picture timing SEI message. For example, the electronic device may set a flag (e.g., common_du_cpb_removal_delay_flag) to one when the encoder 104 is including a common decoding unit CPB removal delay parameter (e.g., common_du_cpb_removal_delay) in the picture timing SEI message. When the common decoding unit CPB removal delay parameter is included, the electronic device may generate the common decoding unit CPB removal delay parameter that is applicable to all decoding units in an access unit. In other words, rather than including a decoding unit CPB removal delay parameter for each decoding unit in an access unit, a common parameter may apply to all decoding units in the access unit with which the picture timing SEI message is associated.

In contrast, when the common decoding unit CPB removal delay parameter is not to be included in the picture timing SEI message, the electronic device 102 may generate a separate decoding unit CPB removal delay for each decoding unit in the access unit with which the picture timing SEI message is associated in some configurations, electronic device A 102a may send the message to electronic device B 102b as part of the bitstream 114. In some configurations electronic device A 102a may send the message to electronic device B 102b by a separate transmission 110. For example, the separate transmission may not be part of the bitstream 114. For instance, a picture timing SEI message or other message may be sent using some out-of-band mechanism. It should be noted that, in some configurations, the other message may include one or more of the features of a picture timing SEI message described above. Furthermore, the other message, in one or more aspects, may be utilized similarly to the SEI message described above.

The encoder 104 (and message generation module 108, for example) may produce a bitstream 114. The bitstream 114 may include encoded picture data based on the input picture(s) 106. In some configurations, the bitstream 114 may also include overhead data, such as a picture timing SEI message or other message, slice header(s), PPS(s), etc. As additional input pictures 106 are encoded, the bitstream 114 may include one or more encoded pictures. For instance, the bitstream 114 may include one or more encoded pictures with corresponding overhead data (e.g., a picture timing SEI message or other message).

The bitstream 114 may be provided to a decoder 112. In one example, the bitstream 114 may be transmitted to electronic device B 102b using a wired or wireless link. In some cases, this may be done over a network, such as the Internet or a Local Area Network (LAN). As illustrated in FIG. 1A, the decoder 112 may be implemented on electronic device B 102b separately from the encoder 104 on electronic device A 102a. However, it should be noted that the encoder 104 and decoder 112 may be implemented on the same electronic device in some configurations. In an implementation where the encoder 104 and decoder 112 are implemented on the same electronic device, for instance, the bitstream 114 may be provided over a bus to the decoder 112 or stored in memory for retrieval by the decoder 112.

The decoder 112 may be implemented in hardware, software or a combination of both. In one configuration, the decoder 112 may be a HEVC decoder. The decoder 112 may receive (e.g., obtain) the bitstream 114. The decoder 112 may generate one or more decoded pictures 118 based on the bitstream 114. The decoded picture(s) 118 may be displayed, played back, stored in memory and/or transmitted to another device, etc.

The decoder 112 may include a CPB 120. The CPB 120 may temporarily store encoded pictures. The CPB 120 may use parameters found in a picture timing SEI message to determine when to remove data. When the CPB 120 supports operation on a sub-picture level, individual decoding units may be removed rather than entire access units at one time. The decoder 112 may include a Decoded Picture Buffer (DPB) 122. Each decoded picture is placed in the DPB 122 for being referenced by the decoding process as well as for output and cropping. A decoded picture is removed from the DPB at the later of the DPB output time or the time that it becomes no longer needed for inter-prediction reference.

The decoder 112 may receive a message (e.g., picture timing SEI message or other message). The decoder 112 may also determine whether the received message includes a common decoding unit CPB removal delay parameter (e.g., common_du_cpb_removal_delay). This may include identifying a flag (e.g., common_du_cpb_removal_delay_flag) that is set when the common parameter is present in the picture timing SEI message. If the common parameter is present, the decoder 112 may determine the common decoding unit CPB removal delay parameter applicable to all decoding units in the access unit. If the common parameter is not present, the decoder 112 may determine a separate decoding unit CPB removal delay parameter for each decoding unit in the access unit. The decoder 112 may also remove decoding units from the CPB 120 using either the common decoding unit CPB removal delay parameter or the separate decoding unit CPB removal delay parameters.

The HRD described above may be one example of the decoder 112 illustrated in FIG. 1A. Thus, an electronic device 102 may operate in accordance with the HRD and CPB 120 and DPB 122 described above, in some configurations.

It should be noted that one or more of the elements or parts thereof included in the electronic device(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an Application-Specific Integrated Circuit (ASIC), a Large-Scale Integrated circuit (LSI) or integrated circuit, etc.

Figure 1B:
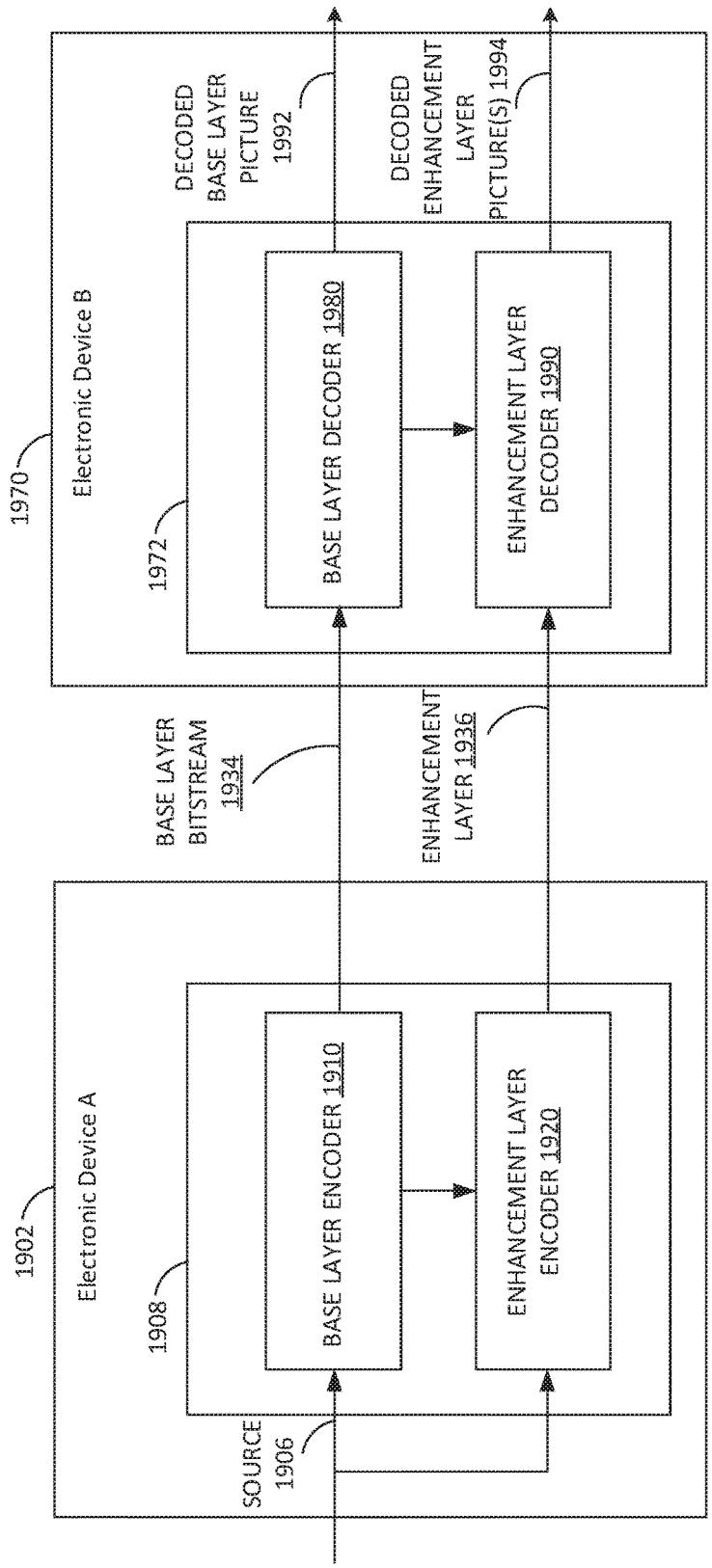
FIG. 1B is another block diagram illustrating an example of one or more electronic devices in which systems and methods for sending a message and buffering a bitstream may be implemented.

FIG. 1B is a block diagram illustrating another example of an encoder 1908 and a decoder 1972. In this example, electronic device A 1902 and electronic device B 1970 are illustrated. However, it should be noted that the features and functionality described in relation to electronic device A 1902 and electronic device B 1970 may be combined into a single electronic device in some configurations.

Electronic device A 1902 includes the encoder 1908. The encoder 1908 may include a base layer encoder 1910 and an enhancement layer encoder 1920. The video encoder 1908 is suitable for scalable video coding and multi-view video coding, as described later. The encoder 1908 may be implemented in hardware, software or a combination of both. In one configuration, the encoder 1908 may be a high-efficiency video coding (HEVC) coder, including scalable and/or multi-view. Other coders may likewise be used. Electronic device A 1902 may obtain a source 1906. In some configurations, the source 1906 may be captured on electronic device A 1902 using an image sensor, retrieved from memory or received from another electronic device.

The encoder 1908 may code the source 1906 to produce a base layer bitstream 1934 and an enhancement layer bitstream 1936. For example, the encoder 1908 may code a series of pictures (e.g., video) in the source 1906. In particular, for scalable video encoding for SNR scalability also known as quality scalability the same source 1906 may be provided to the base layer and the enhancement layer encoder. In particular, for scalable video encoding for spatial scalability a downsampled source may be used for the base layer encoder. In particular, for multi-view encoding a different view source may be used for the base layer encoder and the enhancement layer encoder. The encoder 1908 may be similar to the encoder 1782 described later in connection with FIG. 2B.

The bitstreams 1934, 1936 may include coded picture data based on the source 1906. In some configurations, the bitstreams 1934, 1936 may also include overhead data, such as slice header information, PPS information, etc. As additional pictures in the source 1906 are coded, the bitstreams 1934, 1936 may include one or more coded pictures.

The bitstreams 1934, 1936 may be provided to the decoder 1972. The decoder 1972 may include a base layer decoder 1980 and an enhancement layer decoder 1990. The video decoder 1972 is suitable for scalable video decoding and multi-view video decoding. In one example, the bitstreams 1934, 1936 may be transmitted to electronic device B 1970 using a wired or wireless link. In some cases, this may be done over a network, such as the Internet or a Local Area Network (LAN). As illustrated in FIG. 1B, the decoder 1972 may be implemented on electronic device B 1970 separately from the encoder 1908 on electronic device A 1902. However, it should be noted that the encoder 1908 and decoder 1972 may be implemented on the same electronic device in some configurations. In an implementation where the encoder 1908 and decoder 1972 are implemented on the same electronic device, for instance, the bitstreams 1934, 1936 may be provided over a bus to the decoder 1972 or stored in memory for retrieval by the decoder 1972. The decoder 1972 may provide a decoded base layer 1992 and decoded enhancement layer picture(s) 1994 as output.

The decoder 1972 may be implemented in hardware, software or a combination of both. In one configuration, the decoder 1972 may be a high-efficiency video coding (HEVC) decoder, including scalable and/or multi-view. Other decoders may likewise be used. The decoder 1972 may be similar to the decoder 1812 described later in connection with FIG. 3B. Also, the base layer encoder and/or the enhancement layer encoder may each include a message generation module, such as that described in relation to FIG. 1A. Also, the base layer decoder and/or the enhancement layer decoder may include a coded picture buffer and/or a decoded picture buffer, such as that described in relation to FIG. 1A. In addition, the electronic devices of FIG. 1B may operate in accordance with the functions of the electronic devices of FIG. 1A, as applicable.

Figure 2A:
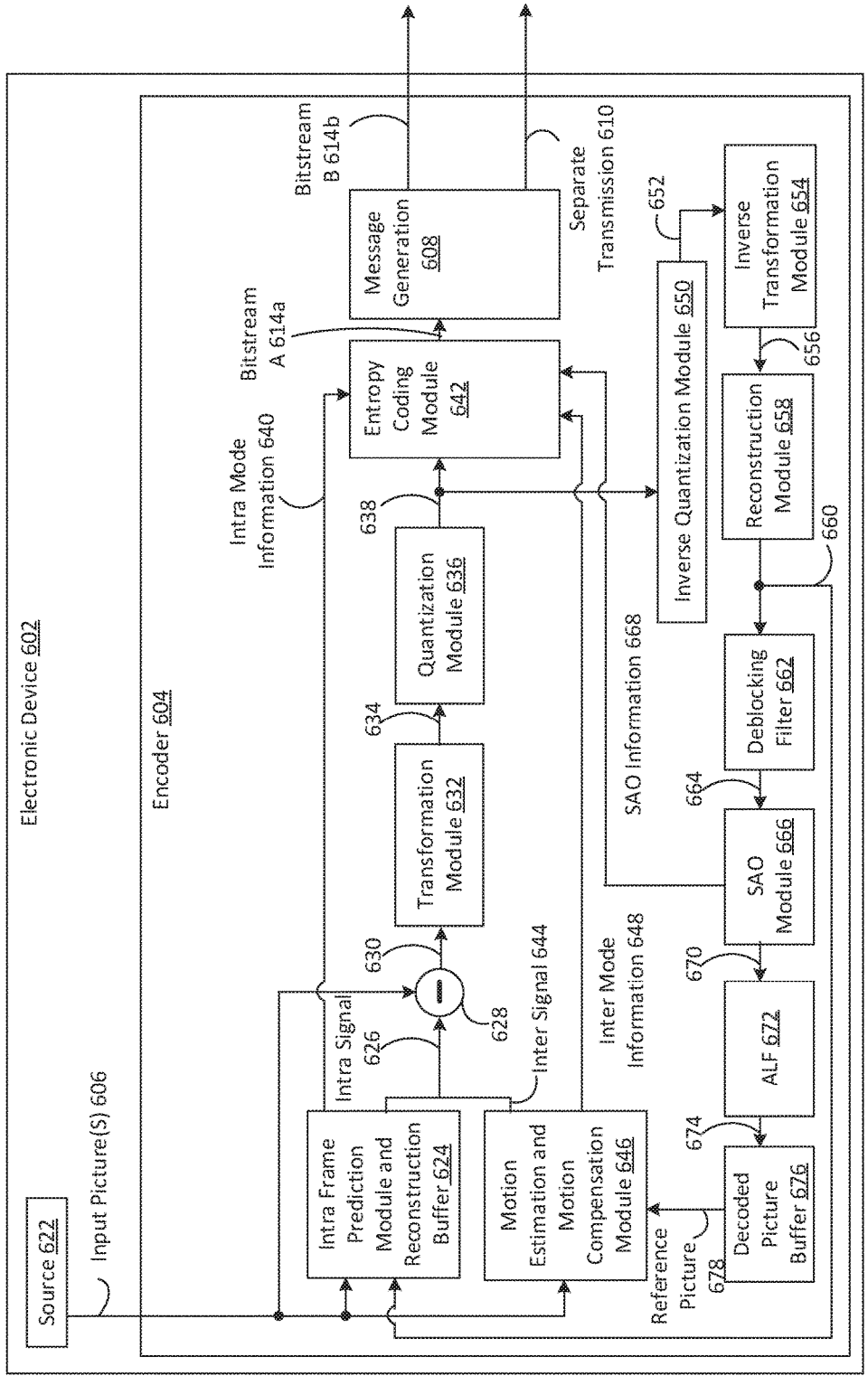
FIG. 2A is a block diagram illustrating one configuration of an encoder 604 on an electronic device.

FIG. 2A is a block diagram illustrating one configuration of an encoder 604 on an electronic device 602. It should be noted that one or more of the elements illustrated as included within the electronic device 602 may be implemented in hardware, software or a combination of both. For example, the electronic device 602 includes an encoder 604, which may be implemented in hardware, software or a combination of both. For instance, the encoder 604 may be implemented as a circuit, integrated circuit, application-specific integrated circuit (ASIC), processor in electronic communication with memory with executable instructions, firmware, field-programmable gate array (FPGA), etc., or a combination thereof. In some configurations, the encoder 604 may be a HEVC coder.

The electronic device 602 may include a source 622. The source 622 may provide picture or image data (e.g., video) as one or more input pictures 606 to the encoder 604. Examples of the source 622 may include image sensors, memory, communication interfaces, network interfaces, wireless receivers, ports, etc.

One or more input pictures 606 may be provided to an intra-frame prediction module and reconstruction buffer 624. An input picture 606 may also be provided to a motion estimation and motion compensation module 646 and to a subtraction module 628.

The intra-frame prediction module and reconstruction buffer 624 may generate intra mode information 640 and an intra-signal 626 based on one or more input pictures 606 and reconstructed data 660. The motion estimation and motion compensation module 646 may generate inter mode information 648 and an inter signal 644 based on one or more input pictures 606 and a reference picture 678 from decoded picture buffer 676. In some configurations, the decoded picture buffer 676 may include data from one or more reference pictures in the decoded picture buffer 676.

The encoder 604 may select between the intra signal 626 and the inter signal 644 in accordance with a mode. The intra signal 626 may be used in order to exploit spatial characteristics within a picture in an intra-coding mode. The inter signal 644 may be used in order to exploit temporal characteristics between pictures in an inter coding mode. While in the intra coding mode, the intra signal 626 may be provided to the subtraction module 628 and the intra mode information 640 may be provided to an entropy coding module 642. While in the inter coding mode, the inter signal 644 may be provided to the subtraction module 628 and the inter mode information 648 may be provided to the entropy coding module 642.

Either the intra signal 626 or the inter signal 644 (depending on the mode) is subtracted from an input picture 606 at the subtraction module 628 in order to produce a prediction residual 630. The prediction residual 630 is provided to a transformation module 632. The transformation module 632 may compress the prediction residual 630 to produce a transformed signal 634 that is provided to a quantization module 636. The quantization module 636 quantizes the transformed signal 634 to produce transformed and quantized coefficients (TQCs) 638.

The TQCs 638 are provided to an entropy coding module 642 and an inverse quantization module 650. The inverse quantization module 650 performs inverse quantization on the TQCs 638 to produce an inverse quantized signal 652 that is provided to an inverse transformation module 654. The inverse transformation module 654 decompresses the inverse quantized signal 652 to produce a decompressed signal 656 that is provided to a reconstruction module 658.

The reconstruction module 658 may produce reconstructed data 660 based on the decompressed signal 656. For example, the reconstruction module 658 may reconstruct (modified) pictures. The reconstructed data 660 may be provided to a deblocking filter 662 and to the intra prediction module and reconstruction buffer 624. The deblocking filter 662 may produce a filtered signal 664 based on the reconstructed data 660.

The filtered signal 664 may be provided to a sample adaptive offset (SAO) module 666. The SAO module 666 may produce SAO information 668 that is provided to the entropy coding module 642 and an SAO signal 670 that is provided to an adaptive loop filter (ALF) 672. The ALF 672 produces an ALF signal 674 that is provided to the decoded picture buffer 676. The ALF signal 674 may include data from one or more pictures that may be used as reference pictures.

The entropy coding module 642 may code the TQCs 638 to produce bitstream A 614a (e.g., encoded picture data). For example, the entropy coding module 642 may code the TQCs 638 using Context-Adaptive Variable Length Coding (CAVLC) or Context-Adaptive Binary Arithmetic Coding (CABAC). In particular, the entropy coding module 642 may code the TQCs 638 based on one or more of intra mode information 640, inter mode information 648 and SAO information 668. Bitstream A 614a (e.g., encoded picture data) may be provided to a message generation module 608. The message generation module 608 may be configured similarly to the message generation module 108 described in connection with FIG. 1

For example, the message generation module 608 may generate a message (e.g., picture timing SEI message or other message) including sub-picture parameters. The sub-picture parameters may include one or more removal delays for decoding units (e.g., common_du_cpb_removal_delay or du_cpb_removal_delay[i]) and one or more NAL parameters (e.g., common_num_nalus_in_du_minus1 or num_nalus_in_du_minus1[i]). In some configurations, the message may be inserted into bitstream A 614a to produce bitstream B 614b. Thus, the message may be generated after the entire bitstream A 614a is generated (e.g., after most of bitstream B 614b is generated), for example. In other configurations, the message may not be inserted into bitstream A 614a (in which case bitstream B 614b may be the same as bitstream A 614a), but may be provided in a separate transmission 610.

In some configurations, the electronic device 602 sends the bitstream 614 to another electronic device. For example, the bitstream 614 may be provided to a communication interface, network interface, wireless transmitter, port, etc. For instance, the bitstream 614 may be transmitted to another electronic device via LAN, the Internet, a cellular phone base station, etc. The bitstream 614 may additionally or alternatively be stored in memory or other component on the electronic device 602.

Figure 2B:
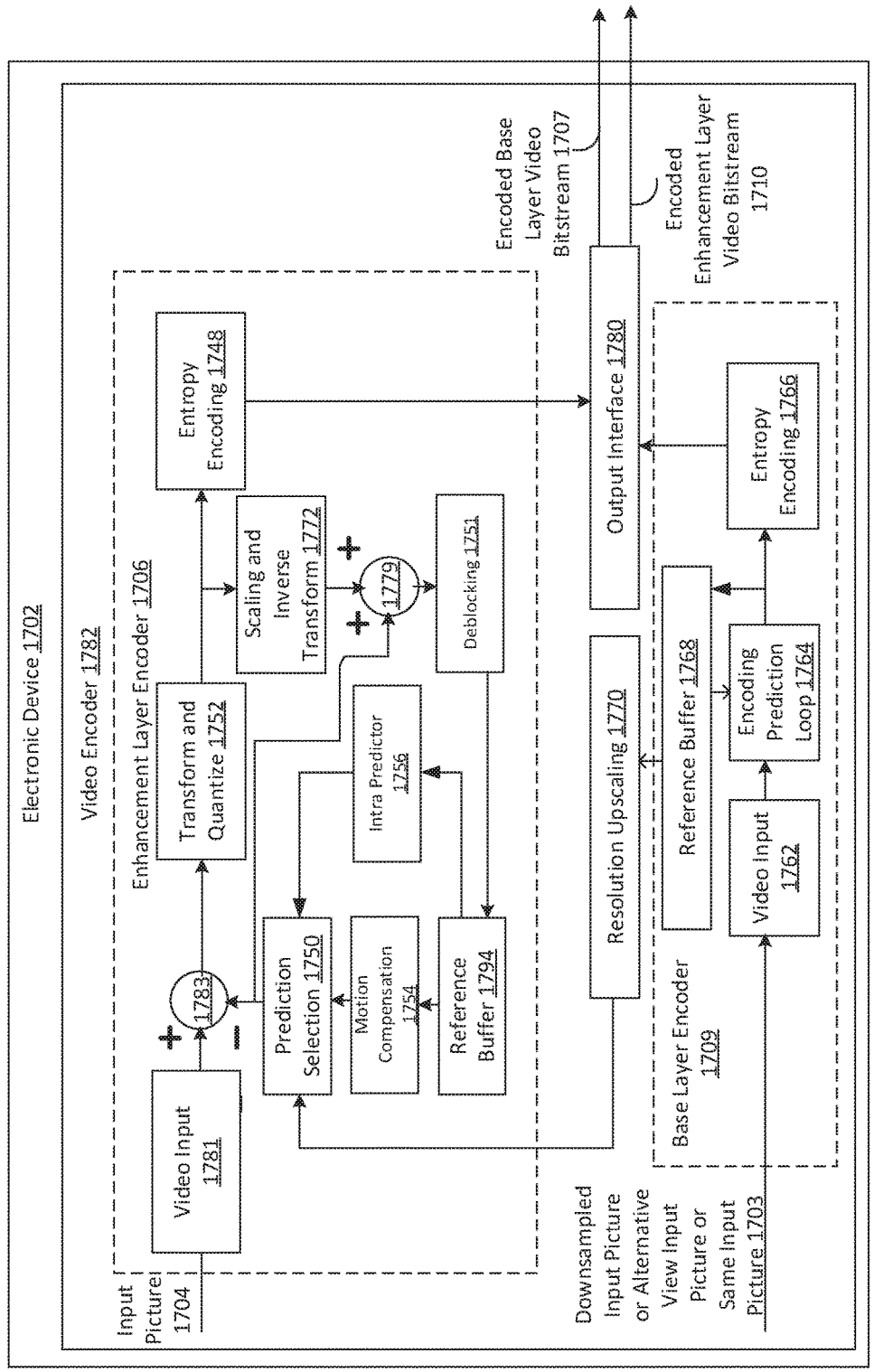
FIG. 2B is another block diagram illustrating one configuration of an encoder 604 on an electronic device.

FIG. 2B is a block diagram illustrating one configuration of a video encoder 1782 on an electronic device 1702. The video encoder 1782 may include an enhancement layer encoder 1706, a base layer encoder 1709, a resolution upscaling block 1770 and an output interface 1780. The video encoder of FIG. 2B, for example, is suitable for scalable video coding and multi-view video coding, as described herein.

The enhancement layer encoder 1706 may include a video input 1781 that receives an input picture 1704. The output of the video input 1781 may be provided to an adder/subtractor 1783 that receives an output of a prediction selection 1750. The output of the adder/subtractor 1783 may be provided to a transform and quantize block 1752. The output of the transform and quantize block 1752 may be provided to an entropy encoding 1748 block and a scaling and inverse transform block 1772. After entropy encoding 1748 is performed, the output of the entropy encoding block 1748 may be provided to the output interface 1780. The output interface 1780 may output both the encoded base layer video bitstream 1707 and the encoded enhancement layer video bitstream 1710.

The output of the scaling and inverse transform block 1772 may be provided to an adder 1779. The adder 1779 may also receive the output of the prediction selection 1750. The output of the adder 1779 may be provided to a deblocking block 1751. The output of the deblocking block 1751 may be provided to a reference buffer 1794. An output of the reference buffer 1794 may be provided to a motion compensation block 1754. The output of the motion compensation block 1754 may be provided to the prediction selection 1750. An output of the reference buffer 1794 may also be provided to an intra predictor 1756. The output of the intra predictor 1756 may be provided to the prediction selection 1750. The prediction selection 1750 may also receive an output of the resolution upscaling block 1770.

The base layer encoder 1709 may include a video input 1762 that receives a downsampled input picture, or other image content suitable for combing with another image, or an alternative view input picture or the same input picture 1703 (i.e., the same as the input picture 1704 received by the enhancement layer encoder 1706). The output of the video input 1762 may be provided to an encoding prediction loop 1764. Entropy encoding 1766 may be provided on the output of the encoding prediction loop 1764. The output of the encoding prediction loop 1764 may also be provided to a reference buffer 1768. The reference buffer 1768 may provide feedback to the encoding prediction loop 1764. The output of the reference buffer 1768 may also be provided to the resolution upscaling block 1770. Once entropy encoding 1766 has been performed, the output may be provided to the output interface 1780. The encoded base layer video bitstream 1707 and/or the encoded enhancement layer video bitstream 1710 may be provided to one or more message generation modules, as desired.

Figure 3A:
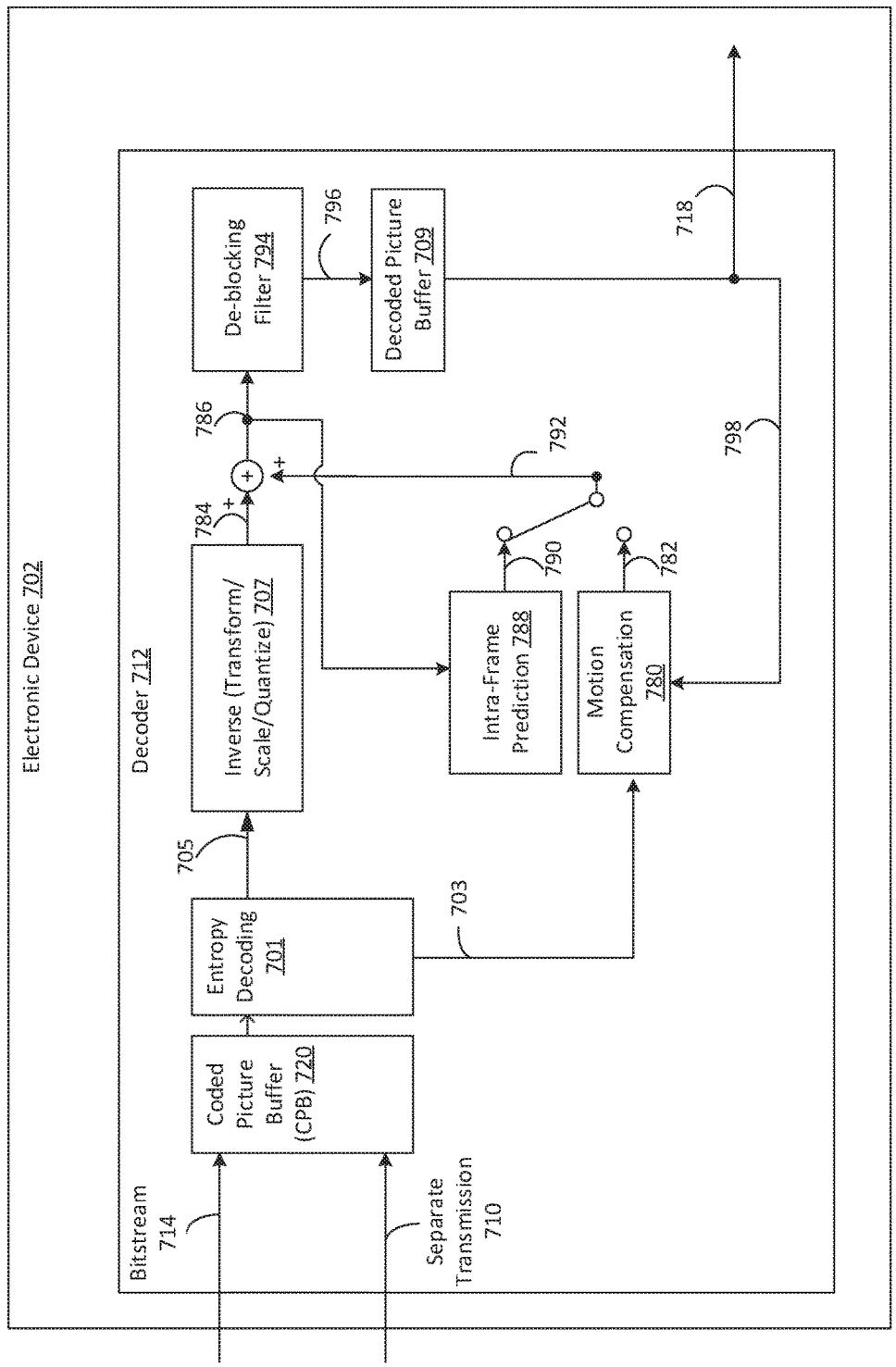
FIG. 3A is a block diagram illustrating one configuration of a decoder on an electronic device.

FIG. 3A is a block diagram illustrating one configuration of a decoder 712 on an electronic device 702. The decoder 712 may be included in an electronic device 702. For example, the decoder 712 may be a HEVC decoder. The decoder 712 and one or more of the elements illustrated as included in the decoder 712 may be implemented in hardware, software or a combination of both. The decoder 712 may receive a bitstream 714 (e.g., one or more encoded pictures and overhead data included in the bitstream 714) for decoding. In some configurations, the received bitstream 714 may include received overhead data, such as a message (e.g., picture timing SEI message or other message), slice header, PPS, etc. In some configurations, the decoder 712 may additionally receive a separate transmission 710. The separate transmission 710 may include a message (e.g., a picture timing SEI message or other message). For example, a picture timing SEI message or other message may be received in a separate transmission 710 instead of in the bitstream 714. However, it should be noted that the separate transmission 710 may be optional and may not be utilized in some configurations.

The decoder 712 includes a CPB 720. The CPB 720 may be configured similarly to the CPB 120 described in connection with FIG. 1 above. The decoder 712 may receive a message (e.g., picture timing SEI message or other message) with sub-picture parameters and remove and decode decoding units in an access unit based on the sub-picture parameters. It should be noted that one or more access units may be included in the bitstream and may include one or more of encoded picture data and overhead data.

The Coded Picture Buffer (CPB) 720 may provide encoded picture data to an entropy decoding module 701. The encoded picture data may be entropy decoded by an entropy decoding module 701, thereby producing a motion information signal 703 and quantized, scaled and/or transformed coefficients 705.

The motion information signal 703 may be combined with a portion of a reference frame signal 798 from a decoded picture buffer 709 at a motion compensation module 780, which may produce an inter-frame prediction signal 782. The quantized, descaled and/or transformed coefficients 705 may be inverse quantized, scaled and inverse transformed by an inverse module 707, thereby producing a decoded residual signal 784. The decoded residual signal 784 may be added to a prediction signal 792 to produce a combined signal 786. The prediction signal 792 may be a signal selected from either the inter-frame prediction signal 782 produced by the motion compensation module 780 or an intra-frame prediction signal 790 produced by an intra-frame prediction module 788. In some configurations, this signal selection may be based on (e.g., controlled by) the bitstream 714.

The intra-frame prediction signal 790 may be predicted from previously decoded information from the combined signal 786 (in the current frame, for example). The combined signal 786 may also be filtered by a de-blocking filter 794. The resulting filtered signal 796 may be written to decoded picture buffer 709. The resulting filtered signal 796 may include a decoded picture. The decoded picture buffer 709 may provide a decoded picture which may be outputted 718. In some cases 709 may be a considered as frame memory.

Figure 3B:
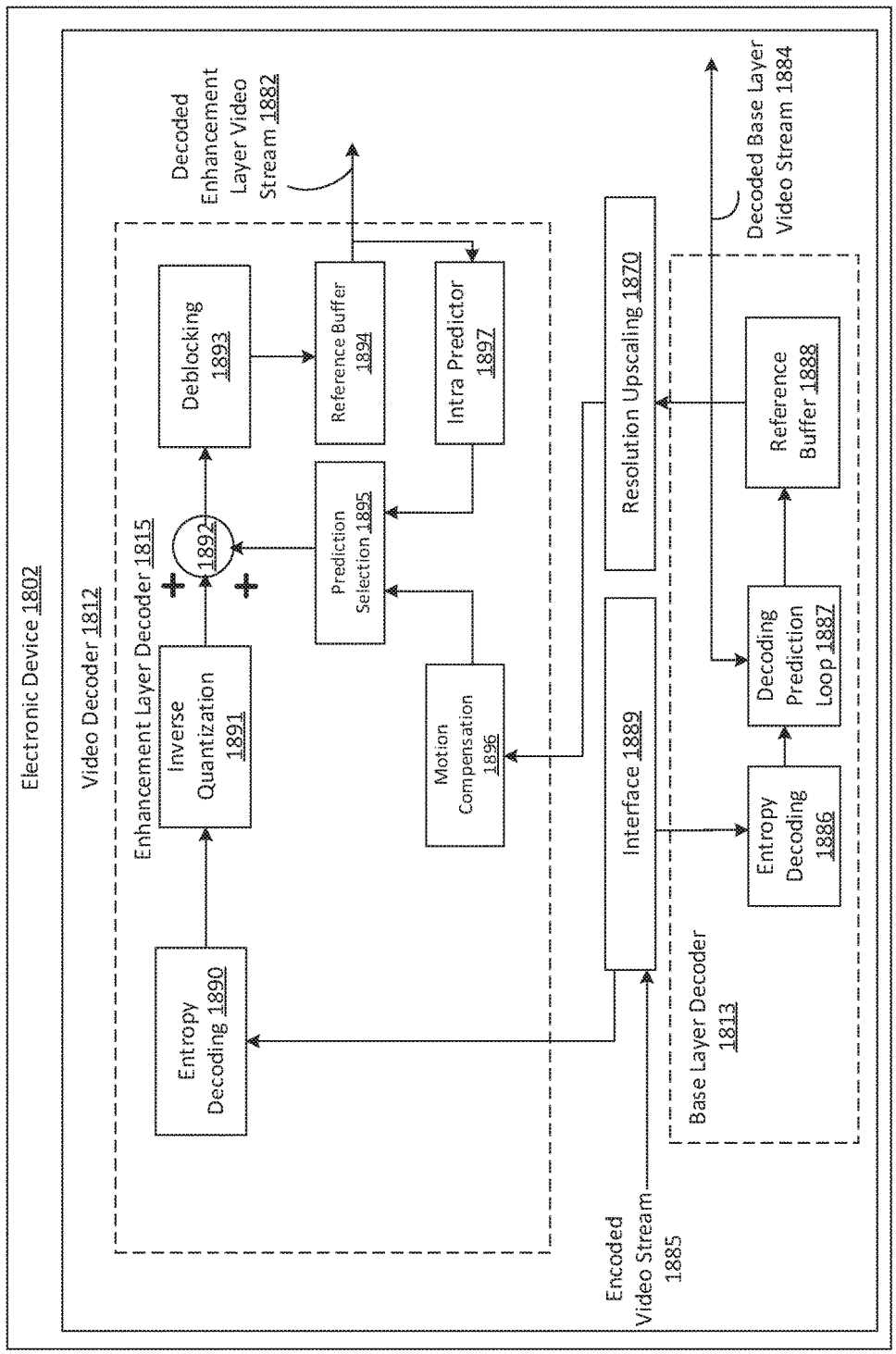
FIG. 3B is another block diagram illustrating one configuration of a decoder on an electronic device.

FIG. 3B is a block diagram illustrating one configuration of a video decoder 1812 on an electronic device 1802. The video decoder 1812 may include an enhancement layer decoder 1815 and a base layer decoder 1813. The video decoder 812 may also include an interface 1889 and resolution upscaling 1870. The video decoder of FIG. 3B, for example, is suitable for scalable video coding and multi-view video encoded, as described herein.

The interface 1889 may receive an encoded video stream 1885. The encoded video stream 1885 may consist of base layer encoded video stream and enhancement layer encoded video stream. These two streams may be sent separately or together. The interface 1889 may provide some or all of the encoded video stream 1885 to an entropy decoding block 1886 in the base layer decoder 1813. The output of the entropy decoding block 1886 may be provided to a decoding prediction loop 1887. The output of the decoding prediction loop 1887 may be provided to a reference buffer 1888. The reference buffer may provide feedback to the decoding prediction loop 1887. The reference buffer 1888 may also output the decoded base layer video stream 1884.

The interface 1889 may also provide some or all of the encoded video stream 1885 to an entropy decoding block 1890 in the enhancement layer decoder 1815. The output of the entropy decoding block 1890 may be provided to an inverse quantization block 1891. The output of the inverse quantization block 1891 may be provided to an adder 1892. The adder 1892 may add the output of the inverse quantization block 1891 and the output of a prediction selection block 1895. The output of the adder 1892 may be provided to a deblocking block 1893. The output of the deblocking block 1893 may be provided to a reference buffer 1894. The reference buffer 1894 may output the decoded enhancement layer video stream 1882. The output of the reference buffer 1894 may also be provided to an intra predictor 1897. The enhancement layer decoder 1815 may include motion compensation 1896. The motion compensation 1896 may be performed after the resolution upscaling 1870. The prediction selection block 1895 may receive the output of the intra predictor 1897 and the output of the motion compensation 1896. Also, the decoder may include one or more coded picture buffers, as desired, such as together with the interface 1889.

Figure 4:
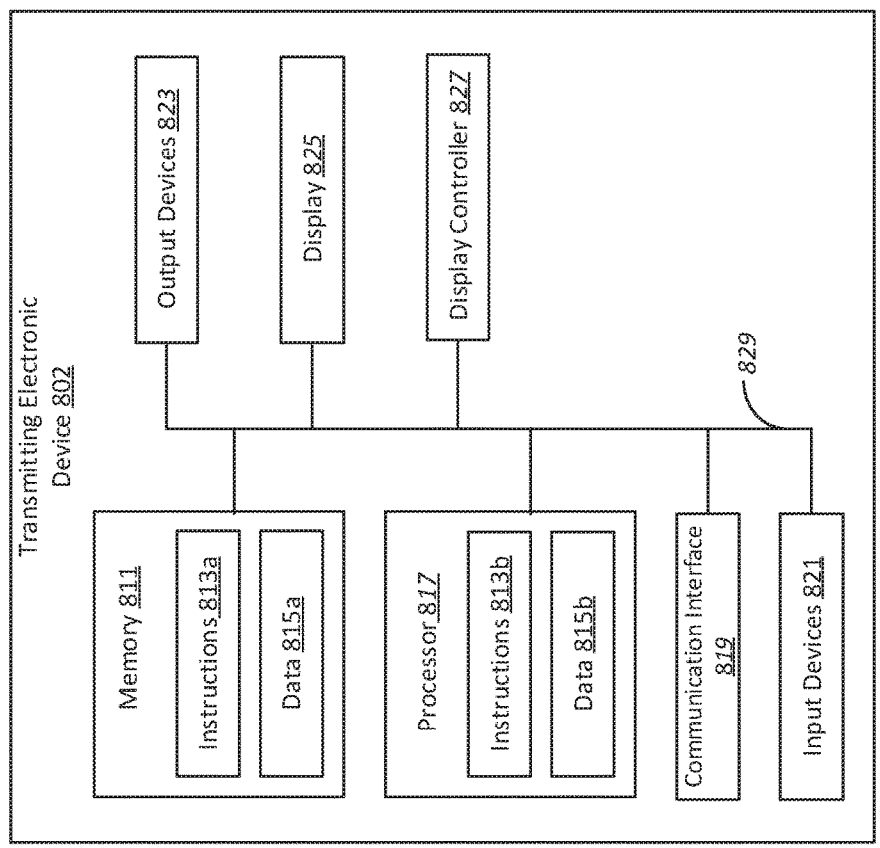
FIG. 4 illustrates various components that may be utilized in a transmitting electronic device.

FIG. 4 illustrates various components that may be utilized in a transmitting electronic device 802. One or more of the electronic devices 102, 602, 702 described herein may be implemented in accordance with the transmitting electronic device 802 illustrated in FIG. 4.

The transmitting electronic device 802 includes a processor 817 that controls operation of the electronic device 802. The processor 817 may also be referred to as a CPU. Memory 811, which may include both read-only memory (ROM), random access memory (RAM) or any type of device that may store information, provides instructions 813a (e.g., executable instructions) and data 815a to the processor 817. A portion of the memory 811 may also include non-volatile random access memory (NVRAM). The memory 811 may be in electronic communication with the processor 817.

Instructions 813b and data 815b may also reside in the processor 817. Instructions 813b and/or data 815b loaded into the processor 817 may also include instructions 813a and/or data 815a from memory 811 that were loaded for execution or processing by the processor 817. The instructions 813b may be executed by the processor 817 to implement the systems and methods disclosed herein. For example, the instructions 813b may be executable to perform one or more of the methods 200, 300, 400, 500 described above.

The transmitting electronic device 802 may include one or more communication interfaces 819 for communicating with other electronic devices (e.g., receiving electronic device). The communication interfaces 819 may be based on wired communication technology, wireless communication technology, or both. Examples of a communication interface 819 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, a wireless transceiver in accordance with $3^{rd}$ Generation Partnership Project (3GPP) specifications and so forth.

The transmitting electronic device 802 may include one or more output devices 823 and one or more input devices 821. Examples of output devices 823 include a speaker, printer, etc. One type of output device that may be included in an electronic device 802 is a display device 825. Display devices 825 used with configurations disclosed herein may utilize any suitable image projection technology, such as a cathode ray tube (CRT), liquid crystal display (LCD), light-emitting diode (LED), gas plasma, electroluminescence or the like. A display controller 827 may be provided for converting data stored in the memory 811 into text, graphics, and/or moving images (as appropriate) shown on the display 825. Examples of input devices 821 include a keyboard, mouse, microphone, remote control device, button, joystick, trackball, touchpad, touchscreen, lightpen, etc.

The various components of the transmitting electronic device 802 are coupled together by a bus system 829, which may include a power bus, a control signal bus and a status signal bus, in addition to a data bus. However, for the sake of clarity, the various buses are illustrated in FIG. 4 as the bus system 829. The transmitting electronic device 802 illustrated in FIG. 4 is a functional block diagram rather than a listing of specific components.

Figure 5:
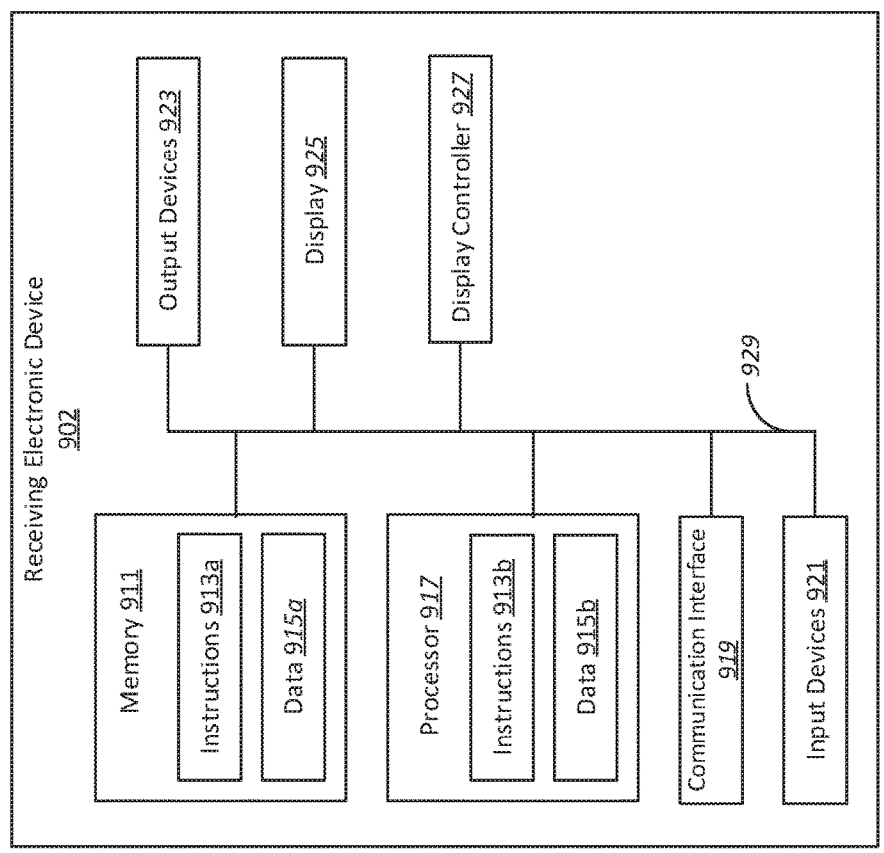
FIG. 5 is a block diagram illustrating various components that may be utilized in a receiving electronic device.

FIG. 5 is a block diagram illustrating various components that may be utilized in a receiving electronic device 902. One or more of the electronic devices 102, 602, 702 described herein may be implemented in accordance with the receiving electronic device 902 illustrated in FIG. 5.

The receiving electronic device 902 includes a processor 917 that controls operation of the electronic device 902. The processor 917 may also be referred to as a CPU. Memory 911, which may include both read-only memory (ROM), random access memory (RAM) or any type of device that may store information, provides instructions 913a (e.g., executable instructions) and data 915a to the processor 917. A portion of the memory 911 may also include non-volatile random access memory (NVRAM). The memory 911 may be in electronic communication with the processor 917.

Instructions 913b and data 915b may also reside in the processor 917. Instructions 913b and/or data 915b loaded into the processor 917 may also include instructions 913a and/or data 915a from memory 911 that were loaded for execution or processing by the processor 917. The instructions 913b may be executed by the processor 917 to implement the systems and methods disclosed herein. For example, the instructions 913b may be executable to perform one or more of the methods 200, 300, 400, 500 described above.

The receiving electronic device 902 may include one or more communication interfaces 919 for communicating with other electronic devices (e.g., a transmitting electronic device). The communication interface 919 may be based on wired communication technology, wireless communication technology, or both. Examples of a communication interface 919 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, a wireless transceiver in accordance with $3^{rd}$ Generation Partnership Project (3GPP) specifications and so forth.

The receiving electronic device 902 may include one or more output devices 923 and one or more input devices 921. Examples of output devices 923 include a speaker, printer, etc. One type of output device that may be included in an electronic device 902 is a display device 925. Display devices 925 used with configurations disclosed herein may utilize any suitable image projection technology, such as a cathode ray tube (CRT), liquid crystal display (LCD), light-emitting diode (LED), gas plasma, electroluminescence or the like. A display controller 927 may be provided for converting data stored in the memory 911 into text, graphics, and/or moving images (as appropriate) shown on the display 925. Examples of input devices 921 include a keyboard, mouse, microphone, remote control device, button, joystick, trackball, touchpad, touchscreen, lightpen, etc.

The various components of the receiving electronic device 902 are coupled together by a bus system 929, which may include a power bus, a control signal bus and a status signal bus, in addition to a data bus. However, for the sake of clarity, the various buses are illustrated in FIG. 5 as the bus system 929. The receiving electronic device 902 illustrated in FIG. 5 is a functional block diagram rather than a listing of specific components.

Figure 6:
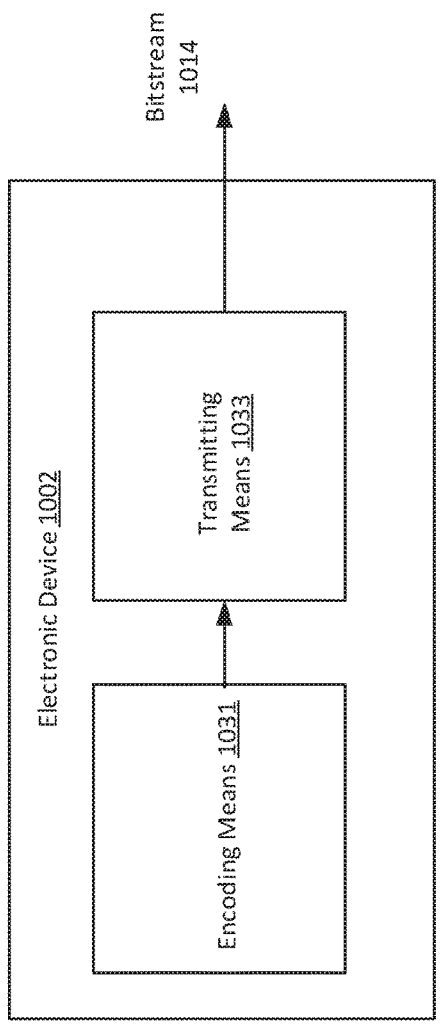
FIG. 6 is a block diagram illustrating one configuration of an electronic device in which systems and methods for sending a message may be implemented.

FIG. 6 is a block diagram illustrating one configuration of an electronic device 1002 in which systems and methods for sending a message may be implemented. The electronic device 1002 includes encoding means 1031 and transmitting means 1033. The encoding means 1031 and transmitting means 1033 may generate a bitstream 1014. FIG. 4 above illustrates one example of a concrete apparatus structure of FIG. 6. A DSP may be realized by software.

Figure 7:
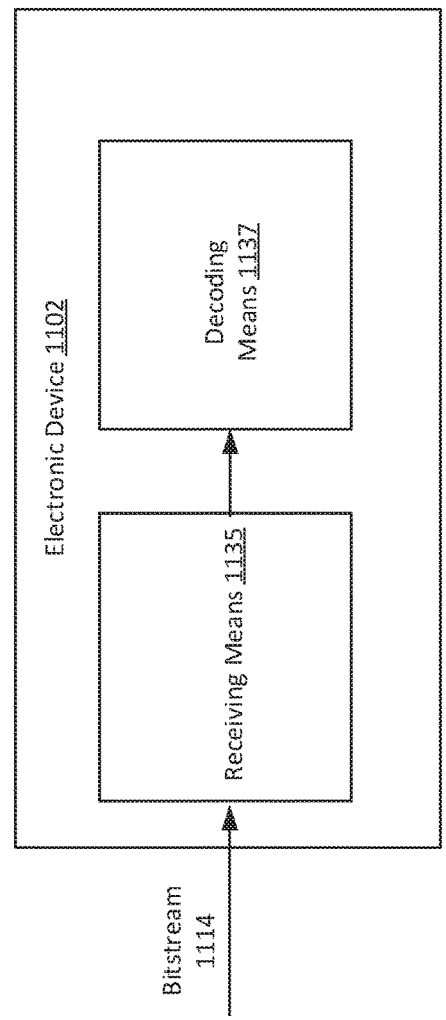
FIG. 7 is a block diagram illustrating one configuration of an electronic device in which systems and methods for buffering a bitstream may be implemented.

FIG. 7 is a block diagram illustrating one configuration of an electronic device 1102 in which systems and methods for buffering a bitstream 1114 may be implemented. The electronic device 1102 may include receiving means 1135 and decoding means 1137. The receiving means 1135 and decoding means 1137 may receive a bitstream 1114. FIG. 5 above illustrates one example of a concrete apparatus structure of FIG. 7. A DSP may be realized by software.

The decoding process for reference picture set (RPS) may be invoked. Reference picture set is a set of reference pictures associated with a picture, consisting of all reference pictures that are prior to the associated picture in decoding order, that may be used for inter prediction of the associated picture or any picture following the associated picture in decoding order.

The bitstream of the video may include a syntax structure that is placed into logical data packets generally referred to as Network Abstraction Layer (NAL) units. Each NAL unit includes a NAL unit header, such as a two-byte NAL unit header (e.g., 16 bits), to identify the purpose of the associated data payload. For example, each coded slice (and/or picture) may be coded in one or more slice (and/or picture) NAL units. Other NAL units may be included for other categories of data, such as for example, supplemental enhancement information, coded slice of temporal sub-layer access (TSA) picture, coded slice of step-wise temporal sub-layer access (STSA) picture, coded slice a non-TSA, non-STSA trailing picture, coded slice of broken link access picture, coded slice of instantaneous decoded refresh picture, coded slice of clean random access picture, coded slice of decodable leading picture, coded slice of tagged for discard picture, video parameter set, sequence parameter set, picture parameter set, access unit delimiter, end of sequence, end of bitstream, filler data, and/or sequence enhancement information message. Table (1) illustrates one example of NAL unit codes and NAL unit type classes. Other NAL unit types may be included, as desired. It should also be understood that the NAL unit type values for the NAL units shown in the Table (1) may be reshuffled and reassigned. Also additional NAL unit types may be added. Also some NAL unit types may be removed.

An intra random access point (IRAP) picture is a coded picture for which each video coding layer NAL unit has nal_unit_type in the range of BLA_W_LP to RSV_I-RAP_VCL23, inclusive as shown in Table (1). An IRAP picture contains only Intra coded (I) slices. An instantaneous decoding refresh (IDR) picture is an IRAP picture for which each video coding layer NAL unit has nal_unit_type equal to IDR_W_RADL or IDR_N_LP as shown in Table (1. An instantaneous decoding referesh (IDR) picture contains only I slices, and may be the first picture in the bitstream in decoding order, or may appear later in the bitstream. Each IDR picture is the first picture of a coded video sequence (CVS) in decoding order. A broken link access (BLA) picture is an IRAP picture for which each video coding layer NAL unit has nal_unit_type equal to BLA_W_LP, BLA_W_RADL, or BLA_N_LP as shown in Table (1). A BLA picture contains only I slices, and may be the first picture in the bitstream in decoding order, or may appear later in the bitstream. Each BLA picture begins a new coded video sequence, and has the same effect on the decoding process as an IDR picture. However, a BLA picture contains syntax elements that specify a non-empty reference picture set. Clean random access (CRA) access unit is an access unit in which the coded picture is a CRA picture. Clean random access (CRA) picture is an IRAP picture for which each VCL NAL unit has nal_unit_type equal to CRA_NUT as shown in Table (1). A CRA picture contains only I slices, and may be the first picture in the bitstream in decoding order, or may appear later in the bitstream. A CRA picture may have associated RADL or RASL pictures. When a CRA picture has NoRaslOutputFlag equal to 1, the associated RASL pictures are not output by the decoder, because they may not be decodable, as they may contain references to pictures that are not present in the bitstream.

TABLE (1)

| nal_unit_type | Name of nal_unit_type | Content of NAL unit and raw byte sequence payload (RBSP) syntax structure | NAL unit type class |
|---|---|---|---|
| 0 | TRAIL_N | Coded slice segment of a non-TSA, non-STSA trailing picture slice_segment_layer_rbsp( ) | Video Coding Layer (VCL) |
| 1 | TRAIL_R | | |
| 2 | TSA_N | Coded slice segment of a temporal sub-layer access (TSA) picture slice_segment_layer_rbsp( ) | VCL |
| 3 | TSA_R | | |
| 4 | STSA_N | Coded slice segment of an Step-wise Temporal sub-layer access (STSA) picture slice_segment_layer_rbsp( ) | VCL |
| 5 | STSA_R | | |
| 6 | RADL_N | Coded slice segment of a random access decodable leading (RADL) picture slice_segment_layer_rbsp( ) | VCL |
| 7 | RADL_R | | |
| 8 | RASL_N | Coded slice segment of a random access skipped leading (RASL) picture slice_segment_layer_rbsp( ) | VCL |
| 9 | RASL_R | | |
| 10 | RSV_VCL_N10 | Reserved non-IRAP sub-layer non-reference VCL NAL unit types | VCL |
| 12 | RSV_VCL_N12 | | |
| 14 | RSV_VCL_N14 | | |
| 11 | RSV_VCL_R11 | Reserved non-IRAP sub-layer reference VCL NAL unit types | VCL |
| 13 | RSV_VCL_R13 | | |
| 15 | RSV_VCL_R15 | | |
| 16 | BLA_W_LP | Coded slice segment of a broken link access (BLA) picture slice_segment_layer_rbsp( ) | VCL |
| 17 | BLA_W_RADL | | |
| 18 | BLA_N_LP | | |
| 19 | IDR_W_RADL | Coded slice segment of an instantaneous decoding refresh (IDR) picture slice_segment_layer_rbsp( ) | VCL |
| 20 | IDR_N_LP | | |

TABLE (1)-continued

| nal_unit_type | Name of nal_unit_type | Content of NAL unit and raw byte sequence payload (RBSP) syntax structure | NAL unit type class |
|---|---|---|---|
| 21 | CRA_NUT | Coded slice segment of a clean random access (CRA) picture slice_segment_layer_rbsp( ) | VCL |
| 22 | RSV_IRAP_VCL22 | Reserved IRAP VCL NAL unit types | VCL |
| 23 | RSV_IRAP_VCL23 | | |
| 24..31 | RSV_VCL24.. RSV_VCL31 | Reserved non-IRAP VCL NAL unit types | VCL |
| 32 | VPS_NUT | Video parameter set video_parameter_set_rbsp( ) | non-video coding layer (non-VCL) |
| 33 | SPS_NUT | Sequence parameter set seq_parameter_set_rbsp( ) | non-VCL |
| 34 | PPS_NUT | Picture parameter set pic_parameter_set_rbsp( ) | non-VCL |
| 35 | AUD_NUT | Access unit delimiter access_unit_delimiter_rbsp( ) | non-VCL |
| 36 | EOS_NUT | End of sequence end_of_seq_rbsp( ) | non-VCL |
| 37 | EOB_NUT | End of bitstream end_of_bitstream_rbsp( ) | non-VCL |
| 38 | FD_NUT | Filler data filler_data_rbsp( ) | non-VCL |
| 39 | PREFIX_SEI_NUT | Supplemental enhancement information sei_rbsp( ) | non-VCL |
| 40 | SUFFIX_SEI_NUT | | |
| 41..47 | RSV_NVCL41.. RSV_NVCL47 | Reserved | non-VCL |
| 48..63 | UNSPEC48.. UNSPEC63 | Unspecified | non-VCL |

Referring to Table (2), the NAL unit header syntax may include two bytes of data, namely, 16 bits. The first bit is a "forbidden_zero_bit" which is always set to zero at the start of a NAL unit. The next six bits is a "nal_unit_type" which specifies the type of raw byte sequence payloads ("RBSP") data structure contained in the NAL unit as shown in Table (1). The next 6 bits is a "nuh_layer_id" which specify the indentifier of the layer. In some cases these six bits may be specified as "nuh_reserved_zero_6 bits" instead. The nuh_reserved_zero_6 bits may be equal to 0 in the base specification of the standard. In a scalable video coding and/or syntax extensions nuh_layer_id may specify that this particular NAL unit belongs to the layer identified by the value of these 6 bits. The next syntax element is "nuh_temporal_id_plus1". The nuh_temporal_id_plus1 minus 1 may specify a temporal identifier for the NAL unit. The variable temporal identifier TemporalId may be specified as TemporalId=nuh_temporal_id_plus1−1. The temporal identifier TemporalId is used to identify a temporal sub-layer. The variable HighestTid identifies the highest temporal sub-layer to be decoded.

TABLE (2)

| | Descriptor |
|---|---|
| nal_unit_header( ) { | |
| forbidden_zero_bit | f(1) |
| nal_unit_type | u(6) |
| nuh_layer_id | u(6) |
| nuh_temporal_id_plus1 | u(3) |
| } | |

Referring to FIG. 8A, as previously described the NAL unit header syntax may include two bytes of data, namely, 16 bits. The first bit is a "forbidden_zero_bit" which is always set to zero at the start of a NAL unit. The next six bits is a "nal_unit_type" which specifies the type of raw byte sequence payloads ("RBSP") data structure contained in the NAL unit. The next 6 bits is a "nuh_reserved_zero_6 bits". The nuh_reserved_zero_6 bits may be equal to 0 in the base specification of the standard. Other values of nuh_reserved_zero_6 bits may be specified as desired. Decoders may ignore (i.e., remove from the bitstream and discard) all NAL units with values of nuh_reserved_zero_6 bits not equal to 0 when handling a stream based on the base specification of the standard. In a scalable or other extension nuh_reserved_zero_6 bits may specify other values, to signal scalable video coding and/or syntax extensions. In some cases syntax element nuh_reserved_zero_6 bits may be called reserved_zero_6 bits. In some cases the syntax element nuh_reserved_zero_6 bits may be called as layer_id_plus1 or layer_id, as illustrated in FIG. 8B and FIG. 8C. In this case the element layer_id will be layer_id_plus1 minus 1. In this case it may be used to signal information related to layer of scalable coded video. The next syntax element is "nuh_temporal_id_plus1". nuh_temporal_id_plus1 minus 1 may specify a temporal identifier for the NAL unit. The variable temporal identifier TemporalId may be specified as TemporalId=nuh_temporal_id_plus1−1.

Referring to FIG. 9, a general NAL unit syntax structure is illustrated. The NAL unit header two byte syntax of FIG. 8 is included in the reference to nal_unit_header( ) of FIG. 9. The remainder of the NAL unit syntax primarily relates to the RBSP.

One existing technique for using the "nuh_reserved_zero_6 bits" is to signal scalable video coding information by partitioning the 6 bits of the nuh_reserved_zero_6 bits into distinct bit fields, namely, one or more of a dependency ID, a quality ID, a view ID, and a depth flag, each of which refers to the identification of a different layer of the scalable coded video. Accordingly, the 6 bits indicate what layer of the scalable encoding technique this particular NAL unit belongs to. Then in a data payload, such as a video parameter set ("VPS") extension syntax ("scalability_type") as illustrated in FIG. 10, the information about the layer is defined. The VPS extension syntax of FIG. 10 includes 4 bits for scalability type (syntax element scalability_type) which specifies the scalability types in use in the coded video sequence and the dimensions signaled through layer_id_plus1 (or layer_id) in the NAL unit header. When the scalability type is equal to 0, the coded video sequence conforms to the base specification, thus layer_id_plus1 of all NAL units is equal to 0 and there are no NAL units belonging to an enhancement layer or view. Higher values of the scalability type are interpreted as illustrated in FIG. 11.

The layer_id_dim_len[i] specifies the length, in bits, of the i-th scalability dimension ID. The sum of the values layer_id_dim_len[i] for all i values in the range of 0 to 7 is less than or equal to 6. The vps_extension_byte_alignment_reserved_zero_bit is zero. The vps_layer_id[i] specifies the value of layer_id of the i-th layer to which the following layer dependency information applies. The num_direct_ref_layers[i] specifies the number of layers the i-th layer directly depends on. The ref_layer_id[i][j] identifies the j-th layer the i-th layer directly depends on.

In this manner, the existing technique signals the scalability identifiers in the NAL unit and in the video parameter set to allocate the bits among the scalability types listed in FIG. 11. Then for each scalability type, FIG. 11 defines how many dimensions are supported. For example, scalability type 1 has 2 dimensions (i.e., spatial and quality). For each of the dimensions, the layer_id_dim_len[i] defines the number of bits allocated to each of these two dimensions, where the total sum of all the values of layer_id_dim_len[i] is less than or equal to 6, which is the number of bits in the nuh_reserved_zero_6 bits of the NAL unit header. Thus, in combination the technique identifies which types of scalability is in use and how the 6 bits of the NAL unit header are allocated among the scalability.

As previously described, scalable video coding is a technique of encoding a video bitstream that also contains one or more subset bitstreams. A subset video bitstream may be derived by dropping packets from the larger video to reduce the bandwidth required for the subset bitstream. The subset bitstream may represent a lower spatial resolution (smaller screen), lower temporal resolution (lower frame rate), or lower quality video signal. For example, a video bitstream may include 5 subset bitstreams, where each of the subset bitstreams adds additional content to a base bitstream. Hannuksela, et al., "Test Model for Scalable Extensions of High Efficiency Video Coding (HEVC)" JCTVC-L0453, Shanghai, October 2012, is hereby incorporated by reference herein in its entirety. Chen, et al., "SHVC Draft Text 1," JCTVC-L1008, Geneva, March, 2013, is hereby incorporated by reference herein in its entirety. J. Chen, J. Boyce, Y. Ye, M Hannuksela, SHVC Draft 3, JCTVC-N1008, Vienna, August 2013; and Y. Chen, Y.-K. Wang, A. K. Ramasubromanian, MV-HEVC/SHVC HLS: Cross-layer POC Alignment, JCTVC-N0244, Vienna, July 2013; each of which is incorporated by reference herein in its entirety.

As previously described, multi-view video coding is a technique of encoding a video bitstream that also contains one or more other bitstreams representative of alternative views. For example, the multiple views may be a pair of views for stereoscopic video. For example, the multiple views may represent multiple views of the same scene from different viewpoints. The multiple views generally contain a large amount of interview statistical dependencies, since the images are of the same scene from different viewpoints. Therefore, combined temporal and inter-view prediction may achieve efficient multi-view encoding. For example, a frame may be efficiently predicted not only from temporally related frames, but also from the frames of neighboring viewpoints. Hannuksela, et al., "Common specification text for scalable and multi-view extensions," JCTVC-L0452, Geneva, January 2013, is hereby incorporated by reference herein in its entirety. Tech, et. al. "MV-HEVC Draft Text 3 (ISO/IEC 23008-2:201x/PDAM2)," JCT3V-C1004_d3, Geneva, January 2013, is hereby incorporated by reference herein in its entirety. G. Tech, K. Wegner, Y. Chen, M. Hannuksela, J. Boyce, "MV-HEVC Draft Text 5 (ISO/IEC 203008-2:201x/PDAM2), JCTVC-E1004, Vienna, August 2013, is hereby incorporated by reference herein in its entirety. G. Tech, K. Wegner, Y. Chen, M. Hannuksela, J. Boyce, "MV-HEVC Draft Text 7", JCT3V-G1004, San Jose, January 2014, is hereby incorporated by reference herein in its entirety.

Chen, et al., "SHVC Draft Text 1," JCTVC-L1008, Geneva, January 2013; Hannuksela, et al. "Test Model for Scalable Extensions of High Efficiency Video Coding (HEVC)," JCTVC-L0453-spec-text, Shanghai, October 2012; and Hannuksela, "Draft Text for Multiview Extension of High Efficiency Video Coding (HEVC)," JCTVC-L0452-spec-text-r1, Shanghai, October 2012; each of which is incorporated by reference herein in its entirety, each have an output order decoded picture buffer (DPB) which operates based on using sps_max_num_reorder_pics[HighestTid], sps_max_latency_increase_plus1[HighestTid] and sps_max_dec_pic_buffering[HighestTid] syntax elements for the output and removal of pictures 0 from the DPB. This information is signaled in the video parameter set for the base layer, which provides buffering information for the video content including the enhancement layers, if any.

Referring to FIG. 12, when coding scalable high efficiency coding ("SVHC") the base layer may include one or more SPS and may also include one or more PPS. Also, each enhancement layer may include one or more SPS and may also include one or more PPS. In FIG. 12 SPS+ indicates one or more SPS and PPS+ indicates one or more PPS being signaled for a particular base or enhancement layer. In this manner, for a video bitstream having both a base layer and one or more enhancement layers, the collective number of SPS and PPS data sets becomes significant together with the required bandwidth to transmit such data, which tends to be limited in many applications. With such bandwidth limitations, it is desirable to limit the data that needs to be transmitted, and locate the data in the bitstream in an effective manner. Each layer may have one SPS and/or PPS that is activate at any particular time, and may select a different active SPS and/or PPS, as desired.

An input picture may comprise a plurality of coded tree blocks (e.g., generally referred to herein as blocks) may be partitioned into one or several slices. The values of the samples in the area of the picture that a slice represents may be properly decoded without the use of data from other slices provided that the reference pictures used at the encoder and the decoder are the same and that de-blocking filtering does not use information across slice boundaries. Therefore, entropy decoding and block reconstruction for a slice does not depend on other slices. In particular, the entropy coding state may be reset at the start of each slice. The data in other slices may be marked as unavailable when defining neighborhood availability for both entropy decoding and reconstruction. The slices may be entropy decoded and reconstructed in parallel. No intra prediction and motion-vector prediction is preferably allowed across the boundary of a slice. In contrast, de-blocking filtering may use information across slice boundaries.

Figure 13:
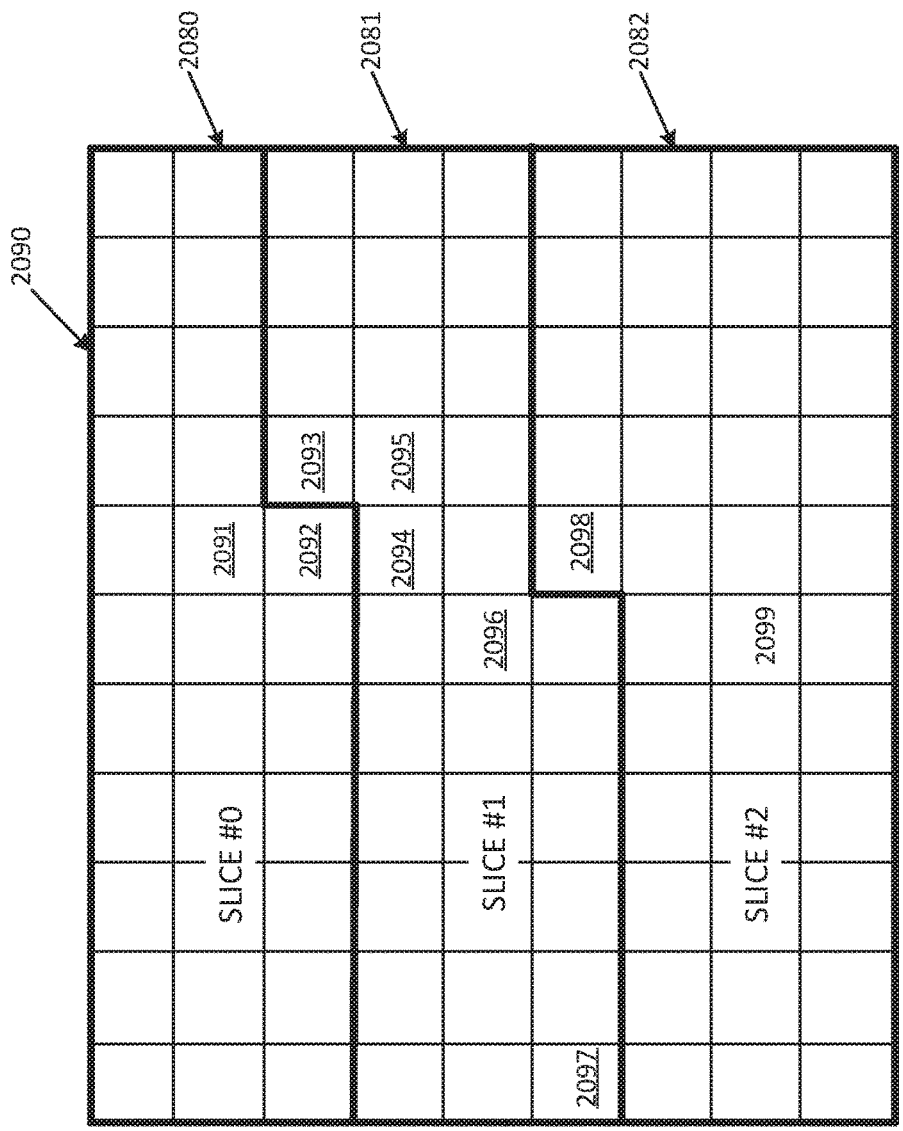
FIG. 13 illustrates an exemplary picture having multiple slices.

FIG. 13 illustrates an exemplary video picture 2090 comprising eleven blocks in the horizontal direction and nine blocks in the vertical direction (nine exemplary blocks labeled 2091-2099). FIG. 13 illustrates three exemplary slices: a first slice denoted "SLICE #0" 2080, a second slice denoted "SLICE #1" 2081 and a third slice denoted "SLICE #2" 2082. The decoder may decode and reconstruct the three slices 2080, 2081, 2082 in parallel. Each of the slices may be transmitted in scan line order in a sequential manner. At the beginning of the decoding/reconstruction process for each slice, context models are initialized or reset and blocks in other slices are marked as unavailable for both entropy decoding and block reconstruction. The context model generally represents the state of the entropy encoder and/or decoder. Thus, for a block, for example, the block labeled 2093, in "SLICE #1," blocks (for example, blocks labeled 2091 and 2092) in "SLICE #0" may not be used for context model selection or reconstruction. Whereas, for a block, for example, the block labeled 2095, in "SLICE #1," other blocks (for example, blocks labeled 2093 and 2094) in "SLICE #1" may be used for context model selection or reconstruction. Therefore, entropy decoding and block reconstruction proceeds serially within a slice. Unless slices are defined using a flexible block ordering (FMO), blocks within a slice are processed in the order of a raster scan.

Flexible block ordering defines a slice group to modify how a picture is partitioned into slices. The blocks in a slice group are defined by a block-to-slice-group map, which is signaled by the content of the picture parameter set and additional information in the slice headers. The block-to-slice-group map consists of a slice-group identification number for each block in the picture. The slice-group identification number specifies to which slice group the associated block belongs. Each slice group may be partitioned into one or more slices, wherein a slice is a sequence of blocks within the same slice group that is processed in the order of a raster scan within the set of blocks of a particular slice group. Entropy decoding and block reconstruction proceeds serially within a slice group.

Figure 14:
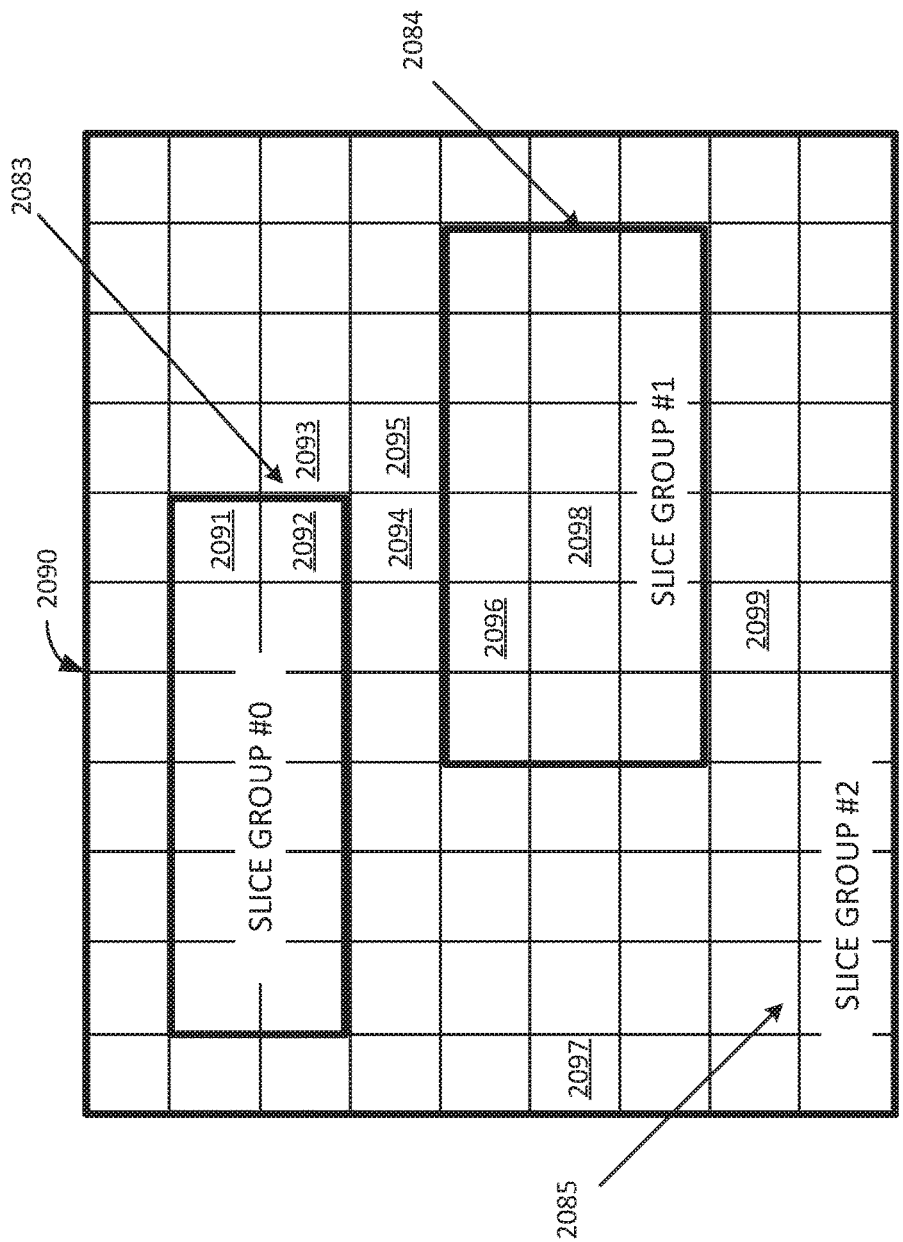
FIG. 14 illustrates another exemplary picture having multiple slices

FIG. 14 depicts an exemplary block allocation into three slice groups: a first slice group denoted "SLICE GROUP #0" 2083, a second slice group denoted "SLICE GROUP #1" 2084 and a third slice group denoted "SLICE GROUP #2" 2085. These slice groups 2083, 2084, 2085 may be associated with two foreground regions and a background region, respectively, in the picture 2090.

The arrangement of slices, as illustrated in FIG. 14, may be limited to defining each slice between a pair of blocks in the image scan order, also known as raster scan or a raster scan order. This arrangement of scan order slices is computationally efficient but does not tend to lend itself to the highly efficient parallel encoding and decoding. Moreover, this scan order definition of slices also does not tend to group smaller localized regions of the image together that are likely to have common characteristics highly suitable for coding efficiency. The arrangement of slices 2083, 2084, 2085, as illustrated in FIG. 14, is highly flexible in its arrangement but does not tend to lend itself to high efficient parallel encoding or decoding. Moreover, this highly flexible definition of slices is computationally complex to implement in a decoder.

Figure 15:
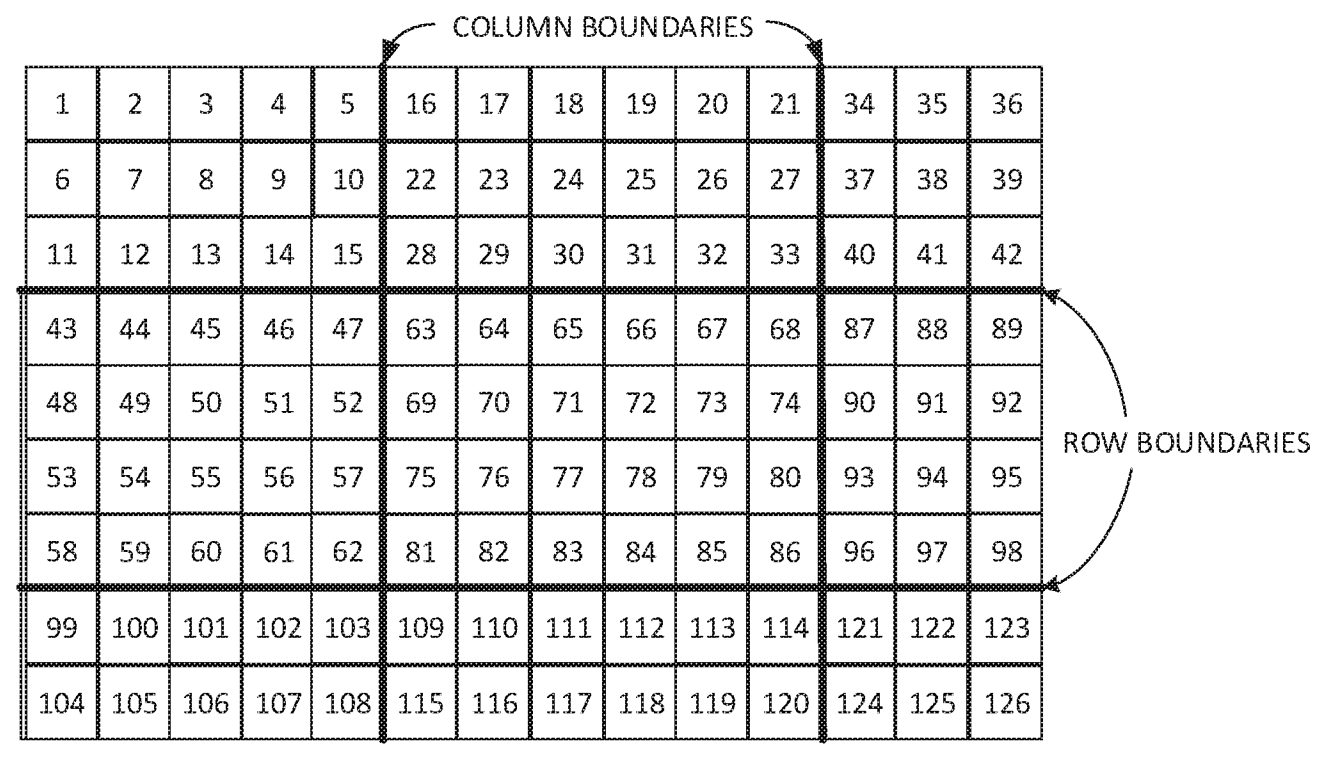

Referring to FIG. 15, a tile technique divides an image into a set of rectangular (inclusive of square) regions. The blocks (alternatively referred to as largest coding units or coded treeblocks in some systems) within each of the tiles are encoded and decoded in a raster scan order. The arrangement of tiles are likewise encoded and decoded in a raster scan order. Accordingly, there may be any suitable number of column boundaries (e.g., 0 or more) and there may be any suitable number of row boundaries (e.g., 0 or more). Thus, the frame may define one or more slices, such as the one slice illustrated in FIG. 15. In some embodiments, blocks located in different tiles are not available for intra-prediction, motion compensation, entropy coding context selection or other processes that rely on neighboring block information.

Referring to FIG. 16, the tile technique is shown dividing an image into a set of three rectangular columns. The blocks (alternatively referred to as largest coding units or coded treeblocks in some systems) within each of the tiles are encoded and decoded in a raster scan order. The tiles are likewise encoded and decoded in a raster scan order. One or more slices may be defined in the scan order of the tiles. Each of the slices are independently decodable. For example, slice 1 may be defined as including blocks 1-9, slice 2 may be defined as including blocks 10-28, and slice 3 may be defined as including blocks 29-126 which spans three tiles. The use of tiles facilitates coding efficiency by processing data in more localized regions of a frame.

Referring to FIG. 17, the base layer and the enhancement layers may each include tiles which each collectively form a picture or a portion thereof. The coded pictures from the base layer and one or more enhancement layers may collectively form an access unit. The access unit may be defined as a set of NAL units that are associated with each other according to a specified classification rule, are consecutive in decoding order, and/or contain the VCL NAL units of all coded pictures associated with the same output time (picture order count or otherwise) and their associated non-VCL NAL units. The VCL NAL is the video coding layer of the network abstraction layer. Similarly, the coded picture may be defined as a coded representation of a picture comprising VCL NAL units with a particular value of nuh_layer_id within an access unit and containing all coding tree units of the picture. Additional descriptions are described in B. Bros, W-J. Han, J-R. Ohm, G. J. Sullivan, and T. Wiegand, "High efficiency video coding (HEVC) text specification draft 10," JCTVC-L1003, Geneva, January 2013; J. Chen, J. Boyce, Y. Ye, M. M. Hannuksela, "SHVC Draft Text 2," JCTVC-M1008, Incheon, May 2013; G. Tech, K. Wegner, Y. Chen, M. Hannuksela, J. Boyce, "MV-HEVC Draft Text 4 (ISO/IEC 23008-2:201x/PDAM2)," JCTVC-D1004, Incheon, May 2013; each of which is incorporated by reference herein in its entirety. J. Chen, J. Boyce, Y. Ye, M. M. Hannuksela, "High Efficiency Video Coding (HEVC) Scalable Extension Draft 5", JCTVC-P1008, San Jose, January 2014, incorporated by reference herein in its entirety. Y. K. Wang, J. Chen, Y. Chen, Hendry, A. K. Ramasubramanian, "Support of AVC base layer in SHVC", JCTVC-P0184v4, February 2014, incorporated by reference herein in its entirety.

Figure 19:
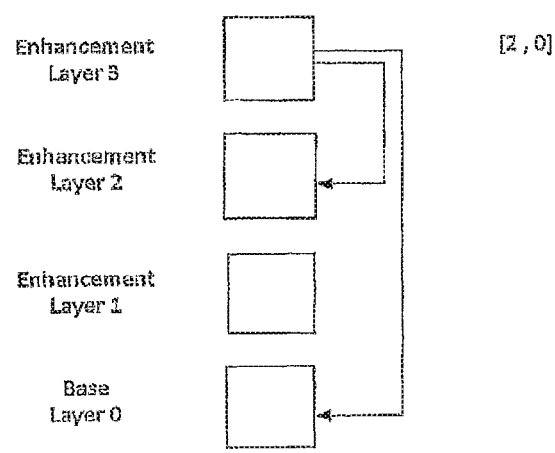
FIG. 19 illustrates a base layer and enhancement layers.

Referring to FIGS. 18A-18D, each slice may include a slice segment header. In some cases a slice segment header may be called slice header. Within the slice segment header there includes syntax elements that are used for inter-layer prediction. This inter-layer prediction defines what other layers the slice may depend upon. In other words this inter-layer prediction defines what other layers the slice may use as its reference layers. The reference layers may be used for sample prediction and/or for motion filed prediction. Referring to FIG. 19 by way of example, enhancement layer 3 may depend upon enhancement layer 2, and base layer layer 0. This dependency relationship may be expressed in the form of a list, such as, [2, 0].

The NumDirectRefLayers for a layer may be derived based upon a direct_dependency_flag[i][j] that when equal to 0 specifies that the layer with index j is not a direct reference layer for the layer with index i. The direct_dependency_flag[i][j] equal to 1 specifies that the layer with index j may be a direct reference layer for the layer with index i. When the direct_dependency_flag[i][j] is not present for i and j in the range of 0 to vps_max_layers_minus1, it is inferred to be equal to 0.

The direct_dep_type_len_minus2 plus 2 specifies the number of bits of the direct_dependency_type[i][j] syntax element. In bitstreams conforming to this version of this Specification the value of direct_dep_type_len_minus2 shall be equal 0. Although the value of direct_dep_type_len_minus2 shall be equal to 0 in this version of this Specification, decoders shall allow other values of direct_dep_type_len_minus2 in the range of 0 to 30, inclusive, to appear in the syntax.

The direct_dependency_type[i][j] is used to derive the variables NumSamplePredRefLayers[i], NumMotionPredRefLayers[i], SamplePredEnabledFlag[i][j], and MotionPredEnabledFlag[i][j]. direct_dependency_type[i][j] shall be in the range of 0 to 2, inclusive, in bitstreams conforming to this version of this Specification. Although the value of direct_dependency_type[i][j] shall be in the range of 0 to 2, inclusive, in this version of this Specification, decoders shall allow values of direct_dependency_type[i][j] in the range of 3 to $2^{32}-2$, inclusive, to appear in the syntax.

The variables NumSamplePredRefLayers[i], NumMotionPredRefLayers[i], SamplePredEnabledFlag[i][j], MotionPredEnabledFlag[i][j], NumDirectRefLayers[i], DirectRefLayerIdx[i][j], RefLayerId[i][j], MotionPredRefLayerId[i][j], and SamplePredRefLayerId[i][j] are derived as follows:

```
for( i = 0; i < 64; i++ ) {
    NumSamplePredRefLayers[ i ] = 0
    NumMotionPredRefLayers[ i ] = 0
    NumDirectRefLayers[ i ] = 0
    for( j = 0; j < 64; j++ ) {
        SamplePredEnabledFlag[ i ][ j ] = 0
        MotionPredEnabledFlag[ i ][ j ] = 0
        RefLayerId[ i ][ j ] = 0
        SamplePredRefLayerId[ i ][ j ] = 0
        MotionPredRefLayerId[ i ][ j ] = 0
    }
}
for( i = 1; i <= vps_max_layers_minus1; i++ ) {
    iNuhLId = layer_id_in_nuh[ i ]
    for( j = 0; j < i; j++ )
        if( direct_dependency_flag[ i ][ j ] ) {
            DirectRefLayerIdx[ iNuhLId ][ layer_id_in_nuh[ j ] ] = NumDirectRefLayers[ iNuhLId ]
            RefLayerId[ iNuhLId ][ NumDirectRefLayers[ iNuhLId ]++ ] = layer_id_in_nuh[ j ]
            SamplePredEnabledFlag[ iNuhLId ][ j ] = ( ( direct_dependency_type[ i ][ j ] + 1 ) & 1 )
            NumSamplePredRefLayers[ iNuhLId ] += SamplePredEnabledFlag[ iNuhLId ][ j ]
            MotionPredEnabledFlag[ iNuhLId ][ j ] = ( ( ( direct_dependency_type[ i ][ j ] + 1 ) & 2 ) >> 1 )
            NumMotionPredRefLayers[ iNuhLId ] += MotionPredEnabledFlag[ iNuhLId ][ j ]
        }
}
for( i = 1, mIdx = 0, sIdx = 0; i <= vps_max_layers_minus1; i++ ) {
    iNuhLId = layer_id_in_nuh[ i ]
    for( j = 0, j < i; j++ ) {
        if( MotionPredEnabledFlag[ iNuhLId ][ j ] )
            MotionPredRefLayerId[ iNuhLId ][ mIdx++ ] = layer_id_in_nuh[ j ]
        if( SamplePredEnabledFlag[ INuhLId ][ j ] )
            SamplePredRefLayerId[ iNuhLId ][ sIdx++ ] = layer_id_in_nuh[ j ]
    }
}
```

The direct_dependency_flag[i][j], direct_dep_type_len_minus2, direct_dependency_type[i][j] are included in the vps_extension syntax illustrated in FIG. 20A and FIG. 20B, which is included by reference in the VPS syntax which provides syntax for the coded video sequence.

It is typically desirable to reduce the number of referenced layers that need to be signaled within the bitstream, and other syntax elements within the slice segment header may be used to effectuate such a reduction. The other syntax elements may include inter_layer_pred_enabled_flag, num_inter_layer_ref_pics_minus1, and/or inter_layer_pred_layer_idc[i]. These syntax elements may be signaled in slice segment header.

The inter_layer_pred_enabled_flag equal to 1 specifies that inter-layer prediction may be used in decoding of the current picture. The inter_layer_pred_enabled_flag equal to 0 specifies that inter-layer prediction is not used in decoding of the current picture. When not present, the value of inter_layer_pred_enabled_flag is inferred to be equal to 0.

The num_inter_layer_ref_pics_minus1 plus 1 specifies the number of pictures that may be used in decoding of the current picture for inter-layer prediction. The length of the num_inter_layer_ref_pics_minus1 syntax element is Ceil (Log 2(NumDirectRefLayers[nuh_layer_id])) bits. The value of num_inter_layer_ref_pics_minus1 shall be in the range of 0 to NumDirectRefLayers[nuh_layer_id]−1, inclusive.

The variable NumActiveRefLayerPics is derived as follows:

```
if( nuh_layer_id = = 0 | | NumDirectRefLayers[
nuh_layer_id ] = = 0
    | | !inter_layer_pred_enabled_flag )
    NumActiveRefLayerPics = 0
else if( max_one_active_ref_layer_flag | |
    NumDirectRefLayers[ nuh_layer_id ] = = 1 )
    NumActiveRefLayerPics = 1
else
    NumActiveRefLayerPics =
        num_inter_layer_ref_pics_minus1 + 1
All slices of a coded picture shall have the same value of
NumActiveRefLayerPics.
```

The inter_layer_pred_layer_idc[i] specifies the variable, RefPicLayerId[i], representing the nuh_layer_id of the i-th picture that may be used by the current picture for inter-layer prediction. The length of the syntax element inter_layer_pred_layer_idc[i] is Ceil(Log 2(NumDirectRefLayers [nuh_layer_id])) bits. The value of inter_layer_pred_layer_idc[i] may be in the range of 0 to NumDirectRefLayers [nuh_layer_id]−1, inclusive. When not present, the value of inter_layer_pred_layer_idc[i] is inferred to be equal to 0.

By way of example, the system may signal various syntax elements especially the direct_dependency_flag[i][j] in VPS which results in the inter-layer reference picture set for layer 3 to be [2, 0]. Then the system may refine further the inter-layer reference picture set with the use of the additional syntax elements for example syntax elements in slice segment header as [2], may refine further the inter-layer reference picture set with the use of the additional syntax elements as [0], or may refine further the inter-layer reference picture set with the use of the additional syntax elements as [ ] which is the null set. However, depending on the design of the encoder, the reference picture set of [2, 0] may be signaled as [2, 0].

Referring to FIG. 21, the slice segment header may be modified to include a comparison between the number of direct reference layers for a particular layer (NumDirectRefLayers[num_layer_id] in the syntax) and the number of active reference layers for the same particular layer (NumActiveRefLayerPics in the syntax). In particular, this may be signaled as "if(NumActiveRefLayerPics!=NumDirectRefLayers[nuh_layer_id])". Thus, if both of these indicate the same number of layers, then there is no need to signal inter_layer_pred_layer_idc[i] in the bitstream, but may rather determine/infer such values based on other syntax elements already signaled.

Referring to FIG. 22, the slice segment header signalling may be modified in a similar manner to FIG. 21 to infer the values for the inter_layer_pred_layer_idc[i] by not signalling them.

If NumActiveRefLayerPics is equal to NumDirectRefLayers[nuh_layer_id], then the value of inter_layer_pred_layer_idc[i] may be inferred as follows.

```
for(i=0;i<NumActiveRefLayerPics;i++)inter_
    layer_pred_layer_idc[i]=i;
```

When not present and when NumActiveRefLayerPics is not equal to NumDirectRefLayers[nuh_layer_id], the value of inter_layer_pred_layer_idc[i] is inferred to be equal to 0.

When i is greater than 0, inter_layer_pred_layer_idc[i] may be greater than inter_layer_pred_layer_idc[i−1].

The variables RefPicLayerId[i] for each value of i in the range of 0 to NumActiveRefLayerPics−1, inclusive, NumActiveMotionPredRefLayers, and ActiveMotionPredRefLayerId[j] for each value of j in the range of 0 to NumActiveMotionPredRefLayers−1, inclusive, maybe derived as follows:

```
for( i = 0, j = 0; i < NumActiveRefLayerPics; i++)
    RefPicLayerId[ i ] =
        RefLayerId[ nuh_layer_id ][ inter_layer_pred_layer_idc[ i ] ]
    if( MotionPredEnabledFlag[ nuh_layer_id ][
        inter_layer_pred_layer_idc[ i ] ]
    )
        ActiveMotionPredRefLayerId[ j++ ] =
            RefLayerId[ nuh_layer_id ][ inter_layer_pred_layer_idc[ i ] ]
}
NumActiveMotionPredRefLayers = j
```

All slices of a picture may have the same value of inter_layer_pred_layer_idc[i] for each value of i in the range of 0 to NumActiveRefLayerPics−1, inclusive.

The max_tid_il_ref_pics_plus1[i] is signaled in VPS extension. max_tid_il_ref_pics_plus1[i] equal to 0 specifies that within the CVS non-IRAP pictures with nuh_layer_id equal to layer_id_in_nuh[i] are not used as reference for inter-layer prediction. max_tid_il_ref_pics_plus1[i] greater than 0 specifies that within the CVS pictures with nuh_layer_id equal to layer_id_in_nuh[i] and TemporalId greater than max_tid_il_ref_pics_plus1[i]−1 are not used as reference for inter-layer prediction. When not present, max_tid_il_ref_pics_plus1[i] is unspecified.

It may be a requirement of bitstream conformance that for each value of i in the range of 0 to NumActiveRefLayerPics−1, inclusive, either of the following two conditions may be true:

The value of max_tid_il_ref_pics_plus1[LayerIdxInVps[RefPicLayerId[*i*]]] is greater than TemporalId.

The values of max_tid_il_ref_pics_plus1[LayerIdxInVps[RefPicLayerId[*i*]]] and TemporalId are both equal to 0 and the picture in the current access unit with nuh_layer_id equal to RefPicLayerId [*i*] is an IRAP picture.

In another embodiment It may be a requirement of bitstream conformance that for each value of i in the range of 0 to NumActiveRefLayerPics−1, inclusive, either of the following two conditions may be true:

The value of max_tid_il_ref_pics_plus1[LayerIdxInVps[RefPicLayerId[*i*]]] is greater than TemporalId of the picture in the current access unit with nuh_layer_id equal to RefPicLayerId[*i*].

The values of LayerIdxInVps[RefPicLayerId[*i*]] is equal to 0 and the picture in the current access unit with nuh_layer_id equal to RefPicLayerId [*i*] is an IRAP picture.

It may be a requirement of bitstream conformance that for each value of i in the range of 0 to NumActiveRefLayerPics−1, inclusive, the value of SamplePredEnabledFlag [nuh_layer_id] [RefPicLayerId[i]] or MotionPredEnabledFlag[nuh_layer_id] [RefPicLayerId[i]] shall be equal to 1.

Referring to FIG. 23, another embodiment for signaling slice segment header is illustrated.

For the embodiment illustrated in FIG. 23, an inter_layer_pred_layer_mask[i] equal to 1 specifies that layer RefLayerId[nuh_layer_id][i], may be used by the current picture for inter-layer prediction. The inter_layer_pred_layer_mask[i] equal to 0 specifies that layer RefLayerId [nuh_layer_id][i], is not used by the current picture for inter-layer prediction.

When not present the value of inter_layer_pred_layer_mask [i] is inferred to be equal to 0.

The variables RefPicLayerId[i] for each value of i in the range of 0 to NumActiveRefLayerPics−1, inclusive, NumActiveMotionPredRefLayers, and ActiveMotionPredRefLayerId[j] for each value of j in the range of 0 to NumActiveMotionPredRefLayers−1, inclusive, are derived as follows:

```
for( i = 0, j = 0, k=0; i < NumDirectRefLayers[ nuh_layer_id ]; i++)
    if(inter_layer_pred_layer_mask[ i ])
        RefPicLayerId[ k++ ] = RefLayerId[ nuh_layer_id ][ i ]
    if( MotionPredEnabledFlag[ nuh_layer_id ][ i ] )
        ActiveMotionPredRefLayerId[ j++ ]=
            RefLayerId[ nuh_layer_id ][ i ]
}
NumActiveMotionPredRefLayers = j
```

All slices of a picture may have the same value of inter_layer_pred_layer_mask[i] for each value of i in the range of 0 to NumDirectRefLayers[nuh_layer_id]−1, inclusive.

It may be a requirement of bitstream conformance that for each value of i in the range of 0 to NumActiveRefLayerPics−1, inclusive, either of the following two conditions shall be true:

The value of max_tid_il_ref_pics_plus1[LayerIdxInVps[RefPicLayerId[*i*]]] is greater than TemporalId.

The values of max_tid_il_ref_pics_plus1[LayerIdxInVps[RefPicLayerId[*i*]]] and TemporalId are both equal to 0 and the picture in the current access unit with nuh_layer_id equal to RefPicLayerId [*i*] is an IRAP picture.

It may be a requirement of bitstream conformance that for each value of i in the range of 0 to NumActiveRefLayerPics−1, inclusive, the value of SamplePredEnabledFlag [nuh_layer_id] [RefPicLayerId[i]] or MotionPredEnabledFlag[nuh_layer_id] [RefPicLayerId[i]] may be equal to 1.

It is shown in FIG. 23 that the inter_layer_pred_layer_mask[i] may be signed with u(1) which uses 1 bit, and FIG. 22 which signals inter_layer_pred_layer_idc[i] may be signed with u(v) which may use multiple bits. In an embodiment inter_layer_pred_layer_mask[i] is signaled instead of intra_layer_pred_idc[i]

Figure 24:
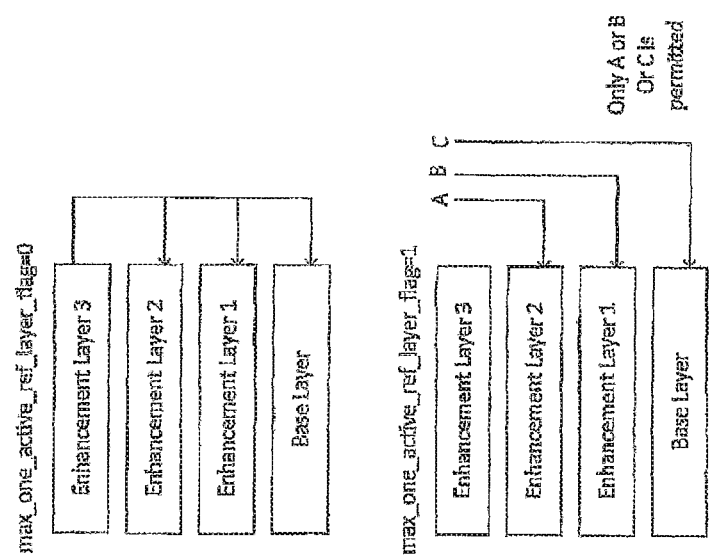
FIG. 24 illustrates an exemplary base layer and enhancement layer with permitted relationships.

Referring to FIG. 24, it is desirable to define profiles where the complexity of the system is reduced by limiting the permitted referencing interrelationships between the different layers (e.g., base layer and/enhancement layers). In general, the sytanx structure permits one layer to reference multiple other layers, which results in a relatively high decoder complexity and also high encoder complexity. If desired, a modified syntax structure may be used for profiles of a reduced complexity where the syntax structure permits one layer to reference at most only one other layer. This limitation on the syntax structure may be signaled by setting a max_one_active_ref_layer_flag being set to 1.

The max_one_active_ref_layer_flag is signaled in VPS extension. max_one_active_ref_layer_flag equal to 1 specifies that at most one picture is used for inter-layer prediction for each picture in the CVS. max_one_active_ref_layer_flag equal to 0 specifies that more than one picture may be used for inter-layer prediction for each picture in the CVS.

vps_max_layers_minus1 plus 1 specifies the maximum allowed number of layers in the CVS. vps_max_layers_minus1 shall be less than 63 in bitstreams conforming to this version of this Specification. The value of 63 for vps_max_layers_minus1 is reserved for future use by ITU-T|ISO/IEC. Although the value of vps_max_layers_minus1 is required to be less than 63 in this version of this Specification, decoders shall allow a value of vps_max_layers_minus1 equal to 63 to appear in the syntax. In a future super multiview coding extension of this specification, the value of 63 for vps_max_layers_minus1 will be used to indicate an extended number of layers.

The variable MaxLayersMinus1 is set equal to Min(62, vps_max_layers_minus1). In this document the variable MaxLayersMinus1 and syntax element vps_max_layers_minus1 may be used interchangeably. Both of them maybe used to denote the same thing.

The layer_id_in_nuh[i] is signaled in VPS extension. layer_id_in_nuh[i] specifies the value of the nuh_layer_id syntax element in VCL NAL units of the i-th layer. For i in a range from 0 to MaxLayersMinus1, inclusive, when not present, the value of layer_id_in_nuh[i] is inferred to be equal to i. When i is greater than 0, layer_id_in_nuh[i] shall be greater than layer_id_in_nuh[i−1]. For i from 0 to MaxLayersMinus1, inclusive, the variable LayerIdxInVps[layer_id_in_nuh[i]] is set equal to i.

A bitstream constraint may be included in the case where only one direct reference layer for a layer is used or at most one picture is used for inter-layer prediction for each picture in CVS, such as follows:

```
In one choice, it may a requirement of the bitstream conformance
that if NumDirectRefLayers[layer_id_in_nuh[ i ]] is equal to 1 for
each layer
i=1,...vps_max_layers_minus1 then max_one_active_ref_layer_flag
is equal to 1.
    In another choice,
    Let
    for(i=1;i<=vps_max_layers_minus1,i++)
        for(j=0,NumDirDepFlags[i]=0;j<i;j++)
            NumDirDepFlags[i]+=direct_dependency_flag[i][j];
    It may be a requirement of the bitstream conformance that if
NumDirDepFlags[i] is equal to 1 for each layer
i=1,...vps_max_layers_minus1 then max_one_active_ref_layer_flag
is equal to 1.
```

In another embodiment, it is desirable to not support the ability to signal an inter-layer reference picture from different direct dependent layers for each picture when max_one_active_ref_layer_flag is set equal to 1. This embodiment results in lower complexity for decoding an output layer set. In this embodiment the bitstream constraint proposed below related to NumDirectRefLayers being equal to 1 may be required to be obeyed:

```
In one choice, it is a requirement of the bitstream conformance that
if max_one_active_ref_layer_flag is equal to 1 then
NumDirectRefLayers[layer_id_in_nuh[ i ]] is equal to 1 for each layer
i=1,...vps_max_layers_minus1.
    In another choice,
    let
    for(i=1;i<=vps_max_layers_minus1,i++)
        for(j=0,NumDirDepFlags[i]=0;j<i;j++)
            NumDirDepFlags[i]+=direct_dependency_flag[i][j];
    It may be a requirement of the bitstream conformance that if
max_one_active_ref_layer_flag is equal to 1 then NumDirDepFlags[i]
is equal to 1 for i=1,...vps_max_layers_minus1.
```

Another embodiment may include a gating flag controlled in a parameter set (e.g. pps, sps, and/or vps) to conditionally signal selected syntax elements in the slice header related to inter-layer prediction signalling.

Referring to FIG. 25, for example, the syntax elements inter_layer_pred_enabled_flag, num_inter_layer_ref_pics_minus1, and/or inter_layer_pred_layer_idc[i] are signaled in slice segment header only if a ilp_slice_signaling_enabled_flag is equal to 1. Thus ilp_slice_signaling_enabled_flag is a gating flag.

Referring to FIG. 26, and FIG. 26A the ilp_slice_signaling_enabled_flag may be signaled in a parameter set such as in video parameter set. Referring to FIG. 27, the ilp_slice_signaling_enabled_flag may be signaled in a parameter set such as in sequence parameter set. Referring to FIG. 28, the ilp_slice_signaling_enabled_flag may be signaled in a parameter set such as in the picture parameter set. The ilp_slice_signaling_enabled_flag may be signaled in another location of the bitstream, as desired. In each of these parameters sets the ilp_slice_signaling_enabled_flag may be sent in any location different than that shown in that illustrated.

The ilp_slice_signaling_enabled_flag equal to 1 specifies that inter_layer_pred_enabled_flag, num_inter_layer_ref_pics_minus1, inter_layer_pred_layer_idc[i] are present in the slice segment headers. ilp_slice_signaling_enabled_flag equal to 0 specifies that inter_layer_pred_enabled_flag, num_inter_layer_ref_pics_minus1, inter_layer_pred_layer_idc[i] are not present in the slice segment header.

In some embodiments ilp_slice_signaling_enabled_flag may be instead called ilp_slice_signaling_present_flag.

When ilp_slice_signaling_enabled_flag is equal to 1 inter_layer_pred_enabled_flag, num_inter_layer_ref_pics_minus1, inter_layer_pred_layer_idc[i] and NumActiveRefLayersPics values are inferred as follows:

```
NumActiveRefLayerPics is inferred as follows:
NumActiveRefLayerPics = NumDirectRefLayers[ nuh_layer_id ]
inter_layer_pred_layer_idc[i] is inferred as follows:
    for( i = 0; i < NumActiveRefLayerPics; i++)
        inter_layer_pred_layer_idc[ i ] = i;
    num_inter_layer_ref_pics_minus1 is inferred to be equal to
NumDirectRefLayers[ nuh_layer_id ] −1.
    inter_layer_pred_enabled_flag is inferred to be equal to 1.
```

In another embodiment one or more of the syntax elements may be signaled using a known fixed number of bits instead of u(v) instead of ue(v). For example they could be signaled using u(8) or u(16) or u(32) or u(64), etc.

In another embodiment one or more of these syntax element could be signaled with ue(v) or some other coding scheme instead of fixed number of bits such as u(v) coding.

In another embodiment the names of various syntax elements and their semantics may be altered by adding a plus 1 or plus2 or by subtracting a minus 1 or a minus2 compared to the described syntax and semantics.

In yet another embodiment various syntax elements may be signaled per picture anywhere in the bitstream. For example they may be signaled in slice segment header, pps/ sps/ vps/ or any other parameter set or other normative part of the bitstream.

Figure 29:
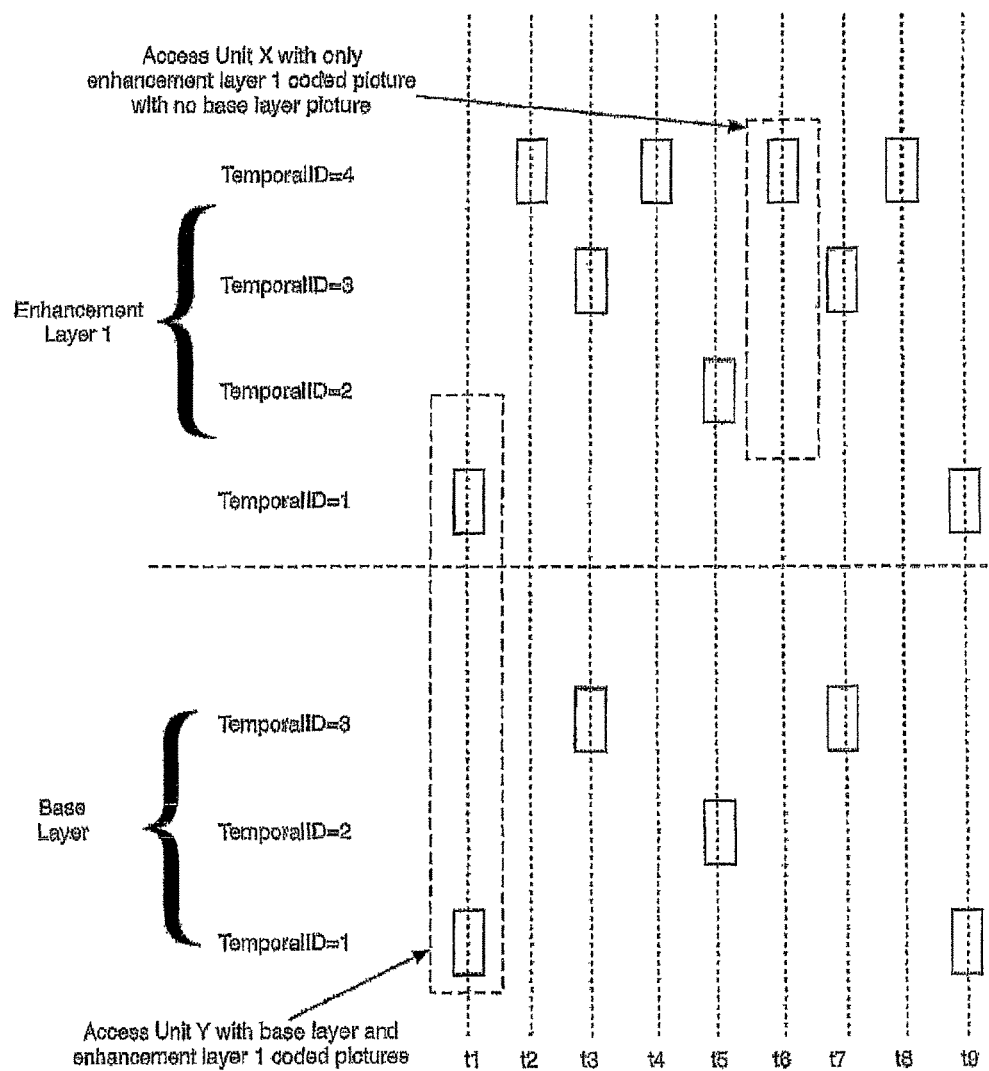
FIG. 29 illustrates temporal sub-layers within a base layer and an enhancement layer.

Referring to FIG. 29, the video may include temporal sub-layer support specified by a temporal identifier in the NAL unit header, which indicates a level in a hierarchical temporal prediction structure. The number of decoded temporal sublayers can be adjusted during the decoding process of one coded video sequence. Different layers may have different number of sub-layers. For example, in FIG. 29 the base layer may include 3 temporal sub-layers, namely, TemporalId 0, TemporalId 1, TemporalId 2. For example, the enhancement layer 1 may include 4 temporal sub-layers, namely, TemporalId 0, TemporalId 1, TemporalId 2, and TemporalId 3. The access unit may be defined as a set of NAL units that are associated with each other according to a specified classification rule, are consecutive in decoding order, and/or contain the VCL NAL units of all coded pictures associated with the same output time (picture order count or otherwise) and their associated non-VCL NAL units.

In FIG. 29 base layer has a lower overall frame rate compared to the enhancement layer 1. For example the frame rate of the base layer may be 30 Hz or 30 frames per second. The frame rate of the enhancement layer 1 may be 60 Hz or 60 frames per second. In FIG. 29 at some output times an access unit may contain a coded picture of base layer and a coded picture of enhancement layer 1 (e.g. access unit Y in FIG. 29). In FIG. 29 at some output times an access unit may contain only a coded picture of enhancement layer 1 (e.g. access unit X in FIG. 29).

As previously described, the dependency of one layer on one or more other layers may be signaled in the VPS for a sequence. In addition at each slice within a respective layer, the slice segment header syntax permits a further refinement of this dependency by removing one or more of the dependencies for the respective slice. For example, the layer dependency in the VPS may indicate that layer 3 is dependent on layer 2 and base layer 0. For example, a slice in layer 3 may further modify this dependency to remove the dependency on layer 2.

Referring to FIGS. 30A-30D, a slice segment header (slice_segment_header), includes a syntax structure that facilitates the identification of dependencies, a portion of which is excerpted below.

tures of the enhancement layer. Unfortunately, this syntax structure does not permit discrimination between the case where a coded picture of the base layer is not present in an access unit in the original bitstream (e.g. access unit X in FIG. 29) and the case where a coded picture of the base layer was present in an access unit in the original bitstream but has been lost during transmission. In this manner, the decoder does not know if the coded picture of the base layer has been lost (i.e. a lost picture) or whether there was no coded picture of the base layer in the first place (i.e. a non-existing base layer picture).

It was determined that even with the syntax illustrated in FIGS. 30A-30D, there are conditions where the system can not signal the removal of a layer in the slice segment header. Under such conditions the decoder is not able to distinguish between the case that an AU had no coded picture for a direct reference layer of a current layer due to that picture not existing in the bitstream (due to the reference layer having different frame rate) versus the case that the coded picture for the direct reference layer of a current layer was lost during transmission. The particular conditions include three conditions, namely, when max_one_active_ref_layer_flag is equal to 1, NumDirectRefLayers[nuh_layer_id] is equal to 1, and/or all_ref_layers_active_flag is equal to 1. For each of these conditions a "No reference picture" would be inferred during the decoding process for the inter-layer reference picture set even when base layer (i.e. reference layer) did not have a picture in the original bitstream. This is incorrect and no-optimal behavior. In some cases in this scenario an unavailable reference picture would be rgeated for such a "no reference picture" and would be used as the base layer (i.e. reference layer) picture thus resulting in incorrect operation.

To alleviate this limitation, it was determined that it is desirable to signal the maximum number of temporal sub-layers for each layer in the SHVC and/or MV-HEVC. This signaling may be achieved in any suitable manner. A first technique for signing the maximum number of temporal sub-layers for each layer is by always explicitly signaling the maximum number for each layer. A second technique for signaling the maximum number of temporal sub-layers for each layer is signaled conditioned on a presence flag. In a third technique for signaling the maximum number of temporal sub-layers for each layer is coded predicatively with respect to the maximum number of temporal sub-layers for

```
if( nuh_layer_id > 0 && all_ref_layers_active_flag &&
        NumDirectRefLayers[ nuh_layer_id ] > 0) {
    inter_layer_pred_enabled_flag                                    u(1)
    if( inter_layer_pred_enabled_flag && NumDirectRefLayers[ nuh_layer_id ] >
1) {
        if( !max_one_active_ref_layer_flag)
            num_inter_layer_ref_pics_minus1                          u(v)
        if( NumActiveRefLayerPics != NumDirectRefLayers[ nuh_layer_id ] )
            for( i = 0; i < NumActiveRefLayerPics; i++ )
                inter_layer_pred_layer_idc[ i ]                      u(v)
    }
}
```

In an example case a base layer has coded pictures at a rate of 30 hertz and an enhancement layer has coded pictures at a rate of 60 hertz, where every other coded picture of the enhancement layer are not aligned with the coded pictures of the base layer. This scenarios is similar to the FIG. 29. Also, it is noted that in general each coded picture of the enhancement layer may not include a corresponding coded picture in the base layer. In some cases, there may be some corresponding coded pictures in the base layer with coded picthe previous layer by conditioning them on a presence flag. Also, the semantics of the slice segment header syntax elements num_inter_layer_ref_pics_minus1 and inter_layer_pred_layer_idc[i] and the derivation of NumActiveRefLayerPics may be modified based upon the signaling of the temporal sub-layer information for each layer. Additionally, or alternatively a layer_present_in_au_flag[i] may be signaled for NumActiveRefLayerPics in the slice segment header, to similarly disambiguate between lost picture case and non-existing picture case.

Referring to FIG. 31, a modified vps_expension( ) syntax may include explicitly signaling the maximum number temporal sub-layers that may be present for each layer, as opposed to the bitstream as a whole. In this manner, two different layers may each have a different maximum number of temporal sublayers. In particular the sub_layers_vps_max_minus1[i] plus 1 specifies the maximum number of temporal sub-layers that may be present in the CVS for layer with nuh_layer_id equal to layer_id_in_nuh[i]. The value of sub_layers_vps_max_minus1[i] shall be in the range of 0 to vps_max_sub_layers_minus1 inclusive. When not present sub_layers_vps_max_minus1[i] shall be equal to vps_max_sub_layers_minus1. Alternatively, the value of sub_layers_vps_max_minus1[i] may be in the range of 0 to 6 inclusive. Alternatively, the value of sub_layers_vps_max_minus1[i] may only be signaled for the enhancement layers in the VPS extension as illustrated in FIG. 32.

Referring to FIG. 33, a modified vps_expension( ) syntax may include signaling the maximum number for each layer conditioned on a presence flag. In this manner, two different layers may each have a different maximum number of temporal sublayers. In particular the sub_layers_vps_max_minus1 present_flag equal to 1 specifies that the syntax elements sub_layers_vps_max_minus1[i] are present. The sub_layers_vps_max_minus1 present_flag equal to 0 specifies that the syntax elements sub_layers_vps_max_minus1[i] are not present. The sub_layers_vps_max_minus1[i] plus 1 specifies the maximum number of temporal sub-layers that may be present in the CVS for layer with nuh_layer_id equal to layer_id_in_nuh[i]. The value of sub_layers_vps_max_minus1[i] shall be in the range of 0 to vps_max_sub_layers_minus1 inclusive. When not present sub_layers_vps_max_minus1[i] shall be equal to vps_max_sub_layers_minus1. Alternatively, the value of sub_layers_vps_max_minus1[i] may be in the range of 0 to 6 inclusive. Alternatively, the value of sub_layers_vps_max_minus1[i] may only be signaled for the enhancement layers in the VPS extension as illustrated in FIG. 34.

Referring to FIG. 35, a modified vps_expension( ) syntax may include signaling the maximum number of temporal sub-layers for each layer by coding them predictively with respect to the maximum number of temporal sub-layers for the previous layer by conditioning them on a presence flag. In this manner, two different layers may each have a different maximum number of temporal sublayers. In particular the sub_layers_vps_max_minus1 predict flag[i] equal to 1 specifies that sub_layers_vps_max_minus1[i] is inferred to be equal to sub_layers_vps_max_minus1[i 1]. The sub_layers_vps_max_minus1 predict flag[i] equal to 0 specifies that sub_layers_vps_max_minus1[i] is explicitly signalled. The value of sub_layers_vps_max_minus1 predict flag[0] is inferred to be equal to 0. The sub_layers_vps_max_minus1[i] plus 1 specifies the maximum number of temporal sub-layers that may be present in the CVS for layer with nuh_layer_id equal to layer_id_in_nuh[i]. The value of sub_layers_vps_max_minus1[i] shall be in the range of 0 to vps_max_sub_layers_minus1 inclusive. When sub_layers_vps_max_minus1 predict flag [i] is equal to 1, sub_layers_vps_max_minus1[i] is inferred to be equal to sub_layers_vps_max_minus1[i−1]. The value of sub_layers_vps_max_minus 1[0] is inferred to be equal to vps_max_sub_layers_minus1. Alternatively, the value of sub_layers_vps_max_minus1[i] may be in the range of 0 to 6 inclusive. Alternatively, the value of sub_layers_vps_max_minus1[i] may only be signaled for the enhancement layers in the VPS extension as illustrated in FIG. 36.

The slice segment headers may be modified, such as described below, in such a manner that the derivation of the NumActiveRefLayerPics accounts for the occurance of one of the aforementioned three conditions so as to reduce the ambiguity using the signaled information about the maximum number of temporal sub-layers that may be present for each layer.

The inter_layer_pred_enabled_flag equal to 1 specifies that inter-layer prediction may be used in decoding of the current picture. The inter_layer_pred_enabled_flag equal to 0 specifies that inter-layer prediction is not used in decoding of the current picture. The num_inter_layer_ref_pics_minus1 plus 1 specifies the number of pictures that may be used in decoding of the current picture for inter-layer prediction. The length of the num_inter_layer_ref_pics_minus1 syntax element is Ceil(Log 2(NumDirectRefLayers[nuh_layer_id])) bits. The value of num_inter_layer_ref_pics_minus1 shall be in the range of 0 to NumDirectRefLayers[nuh_layer_id]−1, inclusive. The variable NumActiveRefLayerPics is derived as follows:

```
if( nuh_layer_id = = 0 | | NumDirectRefLayers[
nuh_layer_id ] = = 0 )
    NumActiveRefLayerPics = 0
else if( all_ref_layers_active_flag ){
    NumActiveRefLayerPics = NumDirectRefLayers[
    nuh_layer_id ]
    for( i = 0; i < NumDirectRefLayers[ nuh_layer_id ]; i++) {
        if( sub_layers_vps_max_minus1[ LayerIdxInVps[
        RefLayer[ n
uh_layer_id ][ i ] ] ] < TemporalId )
            NumActiveRefLayerPics = NumActiveRefLayerPics − 1
    }
}
else if( !inter_layer_pred_enabled_flag )
    NumActiveRefLayerPics = 0
else if( max_one_active_ref_layer_flag | |
NumDirectRefLayers[ nuh_layer_id ] = = 1 ) {
    if( sub_layers_vps_max_minus1[ LayerIdxInVps[ RefLayer[
    nuh_lay
er_id ][ 0 ] ] ] < TemporalId )
        NumActiveRefLayerPics = 0
    else
        NumActiveRefLayerPics = 1
}
else
    NumActiveRefLayerPics =
    num_inter_layer_ref_pics_minus1 + 1
```

All slices of a coded picture shall have the same value of NumActiveRefLayerPics. The inter_layer_pred_layer_idc[i] specifies the variable, RefPicLayerId[i], representing the nuh_layer_id of the i-th picture that may be used by the current picture for inter-layer prediction. The length of the syntax element inter_layer_pred_layer_idc[i] is Ceil(Log 2(NumDirectRefLayers[nuh_layer_id])) bits. The value of inter_layer_pred_layer_idc[i] shall be in the range of 0 to NumDirectRefLayers[nuh_layer_id]−1, inclusive. When not present, the value of inter_layer_pred_layer_idc[i] is inferred as follows:

```
for( i = 0, j = 0; i < NumDirectRefLayers[ nuh_layer_id ]; i++) {
    if( sub_layers_vps_max_minus1[ LayerIdxInVps[ RefLayer[
    nuh_lay
er_id ][ i ] ] ] >= TemporalId )
        inter_layer_pred_layer_idc[ j++ ] = i;
}
```

In a variant embodiment when not present, the value of

-continued

```
inter_layer_pred_layer_idc[ i ] is inferred as follows:
    for( i = 0, j = 0; i < NumDirectRefLayers[ nuh_layer_id ]; i++) {
        if( sub_layers_vps_max_minus1[ LayerIdxInVps[ RefLayer[
            nuh_lay
    er_id ][ i ] ] ] < TemporalId )
            inter_layer_pred_layer_idc[ j++ ] = i;
    }
```

When i is greater than 0, inter_layer_pred_layer_idc[i] shall be greater than inter_layer_pred_layer_idc[i−1]. The variables RefPicLayerId[i] for all values of i in the range of 0 to NumActiveRefLayerPics−1, inclusive, are derived as follows:

for($i=0, j=0; i<$NumActiveRefLayerPics;$i$++)RefPicLayerId[$i$]=RefLayerId[nuh_layer_id] [inter_layer_pred_layer_idc[$i$]]

All slices of a picture shall have the same value of inter_layer_pred_layer_idc[i] for each value of i in the range of 0 to NumActiveRefLayerPics−1, inclusive. It is a requirement of bitstream conformance that for each value of i in the range of 0 to NumActiveRefLayerPics−1, inclusive, either of the following two conditions shall be true:

The value of max_tid_il_ref_pics_plus1[LayerIdxInVps[RefPicLayerId[$i$]]] is greater than TemporalId. (1)

The values of max_tid_il_ref_pics_plus1[LayerIdxInVps[RefPicLayerId[$i$]]] and TemporalId are both equal to 0 and the picture in the current access unit with nuh_layer_id equal to RefPicLayerId [$i$] is an IRAP picture. (2)

In another embodiment the names of various syntax elements and their semantics may be altered by adding a plus 1 or plus2 or by subtracting a minus 1 or a minus2 compared to the described syntax and semantics.

In another embodiment some of the conditions in the if statements may be altered by adding a plus 1 or plus2 or by subtracting a minus 1 or a minus2 compared to the described syntax.

Referring to FIG. 37, an additional signaling technique involves signaling a layer_present_in_au_flag[i]. The layer_present_in_au_flag[i] equal to 1 specifies that a picture with nuh_layer_id equal to RefPicLayerId[i] is present in the current access unit. The layer_present_in_au_flag[i] equal to 0 specifies that a picture with nuh_layer_id equal to RefPicLayerId[i] is not present in the current access unit. When not present layer_present_in_au_flag[i] is inferred to be equal to 1.

Referring to FIG. 38, an additional signaling technique involves signaling the layer_present_in_au_flag[i]. The layer_present_in_au_flag[i] equal to 1 specifies that a picture with nuh_layer_id equal to RefLayerId[nuh_layer_id][i] is present in the current access unit. The layer_present_in_au_flag[i] equal to 0 specifies that a picture with nuh_layer_id equal to RefLayerId[nuh_layer_id][i] is not present in the current access unit. When not present layer_present_in_au_flag[i] is inferred to be equal to 1.

Referring to FIG. 39, an additional signaling technique involves signaling the layer_present_in_au_flag[i]. The layer_present_in_au_flag[i] equal to 1 specifies that a picture with nuh_layer_id equal to layer_id_in_nuh[i] is present in the current access unit. layer_present_in_au_flag[i] equal to 0 specifies that a picture with nuh_layer_id equal to layer_id_in_nuh[i] is not present in the current access unit. When not present layer_present_in_au_flag[i] is inferred to be equal to 1.

If desired, the flags layer_present_in_au_flag[i] may be only signaled in FIG. 37, FIG. 38, and/or FIG. 39 if one or more of the following conditions are met.

The first condition is that if only one active reference layer can be used for each layer (i.e. max_one_active_ref_layer_flag is equal to 1).

The second condition is that the number of direct reference layers for a layer as signaled by direct dependency relationship between layers (e.g. by direct_dependency_flag [i][j]) is equal to 1 (i.e. NumDirectRefLayers[nuh_layer_id] is equal to 1).

The third condition is that all the direct reference layers for a layer as signaled by direct dependency relationship between layers (e.g. by direct_dependency_flag[i][j]) is equal to 1 are active reference layers for the coded picture of the layer (e.g. all_ref_layers_active_flag is equal to 1).

The three variants shown in FIG. 40, FIG. 41, and FIG. 42 for the above three conditions corresponds respectively to FIG. 37, FIG. 38, and FIG. 39.

Referring to FIG. 43, the decoding process for the inter-layer reference picture set may be modified. The outputs of this process are updated lists of inter-layer reference pictures RefPicSetInterLayer0 and RefPicSetInterLayer1 and the variables NumActiveRefLayerPics0 and NumActiveRefLayerPics1. The variable currLayerId is set equal to nuh_layer_id of the current decoded pictures. The lists RefPicSetInterLayer0 and RefPicSetInterLayer1 are first emptied, NumActiveRefLayerPics0 and NumActiveRefLayerPics1 are set equal to 0 followed by steps as illustrated in FIG. 43. There shall be no entry equal to "no reference picture" in RefPicSetInterLayer0 or RefPicSetInterLayer1. The RefPicSetInterLayer1 is always empty since the value of ViewId[i] is equal to zero for all layers. If the current picture is a RADL picture, there shall be no entry in the RefPicSetInterLayer0 or RefPicSetInterLayer1 that is a RASL picture. An access unit may contain both RASL and RADL pictures.

Referring to FIG. 44, the decoding process for the inter-layer reference picture set may be modified. The outputs of this process are updated lists of inter-layer reference pictures RefPicSetInterLayer0 and RefPicSetInterLayer1 and the variables NumActiveRefLayerPics0 and NumActiveRefLayerPics1. The variable currLayerId is set equal to nuh_layer_id of the current decoded picture. The lists RefPicSetInterLayer0 and RefPicSetInterLayer1 are first emptied, NumActiveRefLayerPics0 and NumActiveRefLayerPics1 are set equal to 0 followed by steps as illustrated in FIG. 44. There shall be no entry equal to "no reference picture" in RefPicSetInterLayer0 or RefPicSetInterLayer1. The RefPicSetInterLayer1 is always empty since the value of ViewId[i] is equal to zero for all layers. If the current picture is a RADL picture, there shall be no entry in the RefPicSetInterLayer0 or RefPicSetInterLayer1 that is a RASL picture. An access unit may contain both RASL and RADL pictures.

Referring to FIG. 45, the decoding process for the inter-layer reference picture set may be modified. The outputs of this process are updated lists of inter-layer reference pictures RefPicSetInterLayer0 and RefPicSetInterLayer1 and the variables NumActiveRefLayerPics0 and NumActiveRefLayerPics1. The variable currLayerId is set equal to nuh_layer_id of the current decoded picture. The lists RefPicSetInterLayer0 and RefPicSetInterLayer1 are first emptied, NumActiveRefLayerPics0 and NumActiveRefLayerPics1 are set equal to 0 followed by steps as illustrated in FIG. 45. There shall be no entry equal to "no reference picture" in RefPicSetInterLayer0 or RefPicSetInterLayer1.

The RefPicSetInterLayer1 is always empty since the value of ViewId[i] is equal to zero for all layers. If the current picture is a RADL picture, there shall be no entry in the RefPicSetInterLayer0 or RefPicSetInterLayer1 that is a RASL picture. An access unit may contain both RASL and RADL pictures.

Referring to FIG. 46, the decoding process for the inter-layer reference picture set may be modified. The outputs of this process are updated lists of inter-layer reference pictures RefPicSetInterLayer0 and RefPicSetInterLayer1 and the variables NumActiveRefLayerPics0 and NumActiveRefLayerPics1. The variable currLayerId is set equal to nuh_layer_id of the current decoded picture. The lists RefPicSetInterLayer0 and RefPicSetInterLayer1 are first emptied, NumActiveRefLayerPics0 and NumActiveRefLayerPics1 are set equal to 0 followed by steps as illustrated in FIG. 46. There shall be no entry equal to "no reference picture" in RefPicSetInterLayer0 or RefPicSetInterLayer1. The RefPicSetInterLayer1 is always empty since the value of ViewId[i] is equal to zero for all layers. If the current picture is a RADL picture, there shall be no entry in the RefPicSetInterLayer0 or RefPicSetInterLayer1 that is a RASL picture. An access unit may contain both RASL and RADL pictures.

In an alternative embodiment the syntax for signaling inter-layer predicition information in slice segment header may be modified as shown in FIG. 47. In this case the syntax elements inter_layer_pred_enabled_flag, num_inter_layer_ref_pics_minus1 and inter_layer_pred_layer_idc[i] would be always signaled event when one or more of the conditions as follows are true: when max_one_active_ref_layer_flag is equal to 1, and/or NumDirectRefLayers[nuh_layer_id] is equal to 1, and/or all_ref_layers_active_flag is equal to 1

In this case the ambiguity about a lost reference layer picture versus non-existing reference layer picture is removed. In this case the following may apply.

The inter_layer_pred_enabled_flag equal to 1 specifies that inter-layer prediction may be used in decoding of the current picture. The inter_layer_pred_enabled_flag equal to 0 specifies that inter-layer prediction is not used in decoding of the current picture. The num_inter_layer_ref_pics_minus1 plus 1 specifies the number of pictures that may be used in decoding of the current picture for inter-layer prediction. The length of the num_inter_layer_ref_pics_minus1 syntax element is Ceil(Log 2(NumDirectRefLayers[nuh_layer_id])) bits. The value of num_inter_layer_ref_pics_minus1 shall be in the range of 0 to NumDirectRefLayers[nuh_layer_id]−1, inclusive. The variable NumActiveRefLayerPics is derived as follows:

```
if( nuh_layer_id = = 0 | | NumDirectRefLayers[ nuh_layer_id ] = = 0 )
    NumActiveRefLayerPics = 0
else
    NumActiveRefLayerPics = num_inter_layer_ref_pics_minus1 + 1
```

All slices of a coded picture shall have the same value of NumActiveRefLayerPics. The inter_layer_pred_layer_idc[i] specifies the variable, RefPicLayerId[i], representing the nuh_layer_id of the i-th picture that may be used by the current picture for inter-layer prediction. The length of the syntax element inter_layer_pred_layer_idc[i] is Ceil(Log 2(NumDirectRefLayers[nuh_layer_id])) bits. The value of inter_layer_pred_layer_idc[i] shall be in the range of 0 to NumDirectRefLayers[nuh_layer_id]−1, inclusive. When i is greater than 0, inter_layer_pred_layer_idc[i] shall be greater than inter_layer_pred_layer_idc[i−1]. The variables RefPicLayerId[i] for all values of i in the range of 0 to NumActiveRefLayerPics−1, inclusive, are derived as follows:

```
for(i=0,j=0;i<NumActiveRefLayerPics;i++)RefPi-
    cLayerId[i]=RefLayerId[nuh_layer_id]
    [inter_layer_pred_layer_idc[i]]
```

All slices of a picture shall have the same value of inter_layer_pred_layer_idc[i] for each value of i in the range of 0 to NumActiveRefLayerPics−1, inclusive. It is a requirement of bitstream conformance that for each value of i in the range of 0 to NumActiveRefLayerPics−1, inclusive, either of the following two conditions shall be true:

The value of max_tid_il_ref_pics_plus1[LayerIdxIn-Vps[RefPicLayerId[i]]] is greater than TemporalId. (1)

The values of max_tid_il_ref_pics_plus1[LayerIdxIn-Vps[RefPicLayerId[i]]] and TemporalId are both equal to 0 and the picture in the current access unit with nuh_layer_id equal to RefPicLayerId [i] is an IRAP picture. (2)

In HEVC (JCTVC-L1003), SHVC (JCTVC-P1008) and MV-HEVC (JCT3V-G1004) it is required that the value of TemporalId shall be the same for all VCL NAL units of an access unit. The value of TemporalId of an access unit is the value of the TemporalId of the VCL NAL units of the access unit.

For HEVC an access unit is defined as a set of NAL units that are associated with each other according to a specified classification rule, are consecutive in decoding order, and contain exactly one coded picture.

In SHVC and MV-HEVC an access unit is defined as a set of NAL units that are associated with each other according to a specified classification rule, are consecutive in decoding order, and contain the VCL NAL units of all coded pictures associated with the same output time and their associated non-VCL NAL units.

In SHVC and MV-HEVC TRAP pictures are allowed to be cross-layer non-aligned. This is helpful in supporting different IRAP frequency for different layers. It also allows flexible placement of IRAP pictures in any layer without requiring an IRAP picture to be coded in the same access unit for other layers. However in HEVC, SHVC and MV-HEVC if nal_unit_type is in the range of BLA_W_LP to RSV_IRAP_VCL23, inclusive, i.e. the coded slice segment belongs to an IRAP picture, TemporalId shall be equal to 0.

Thus although in SHVC and MV-HEVC an IRAP picture could be flexibly coded in any layer in an access unit without requiring an IRAP picture in other layers in the same access unit, it is still currently required that when an IRAP picture is coded in any layer in an access unit then all the other layers in the same access unit must have coded pictures with TemporalId equal to 0. It is asserted that this puts unnecessary restrictions on the flexibility of coding structures that can be supported. For example following scenario is currently not supported in SHVC and MV-HEVC.

Figure 48:
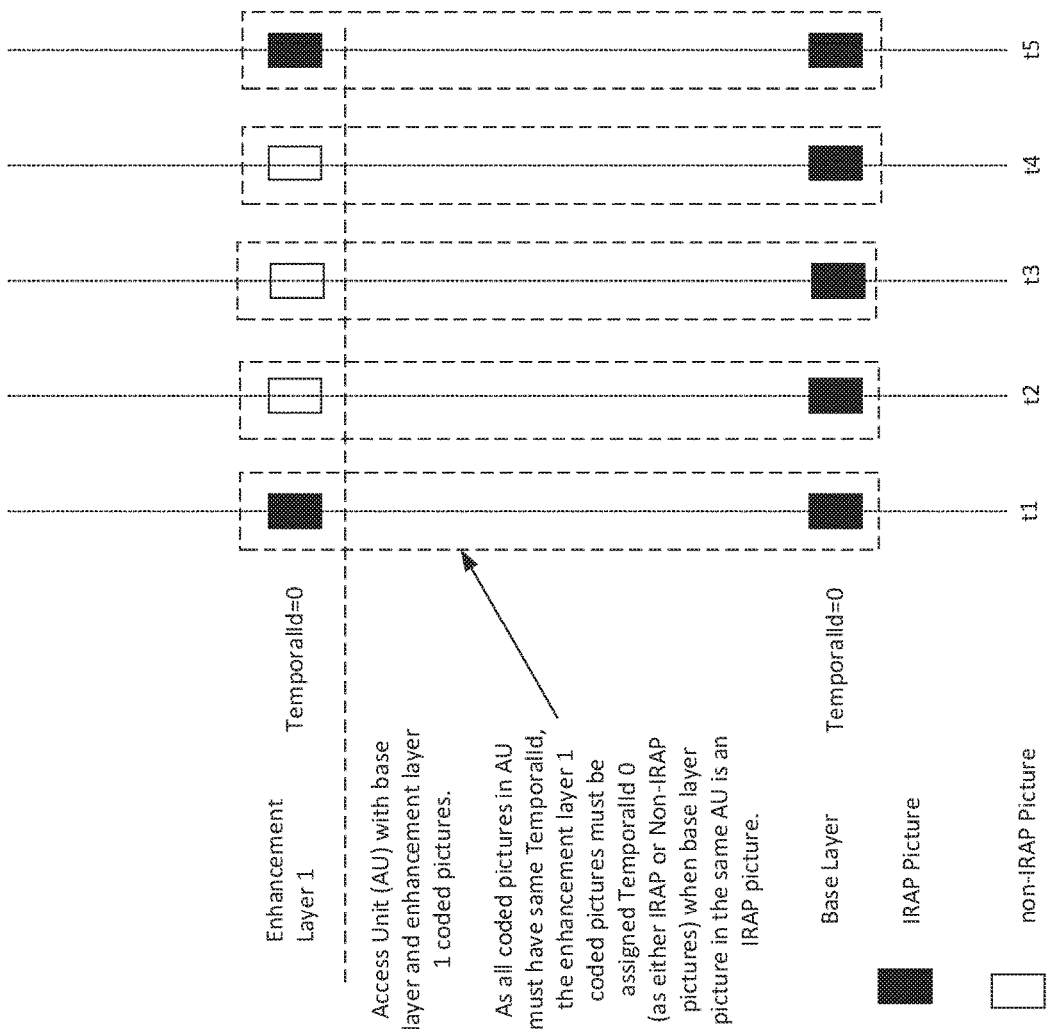
FIG. 48 illustrates temporal sub-layers with IRAP pictures and non-IRAP pictures.

If a particular layer (e.g. base layer) is coded with an all intra configuration where each coded picture is an IRAP picture then all the collocated pictures in those access units for all the other layers must be coded with TemporalId equal to 0 (either as IRAP pictures or as non-IRAP pictures with TemporalId equal to 0) which means that the temporal sub-layering could not be used for those pictures. This limitation is shown in FIG. 48. Thus with current SHVC and MV-HEVC specification the coding configuration can only be similar to as shown in FIG. 48 where all the coded pictures of base layer are IRAP pictures. In this case all the coded pictures in the same AU for enhancement layer 1 must be coded with TemporalId equal to 0.

Figure 49:
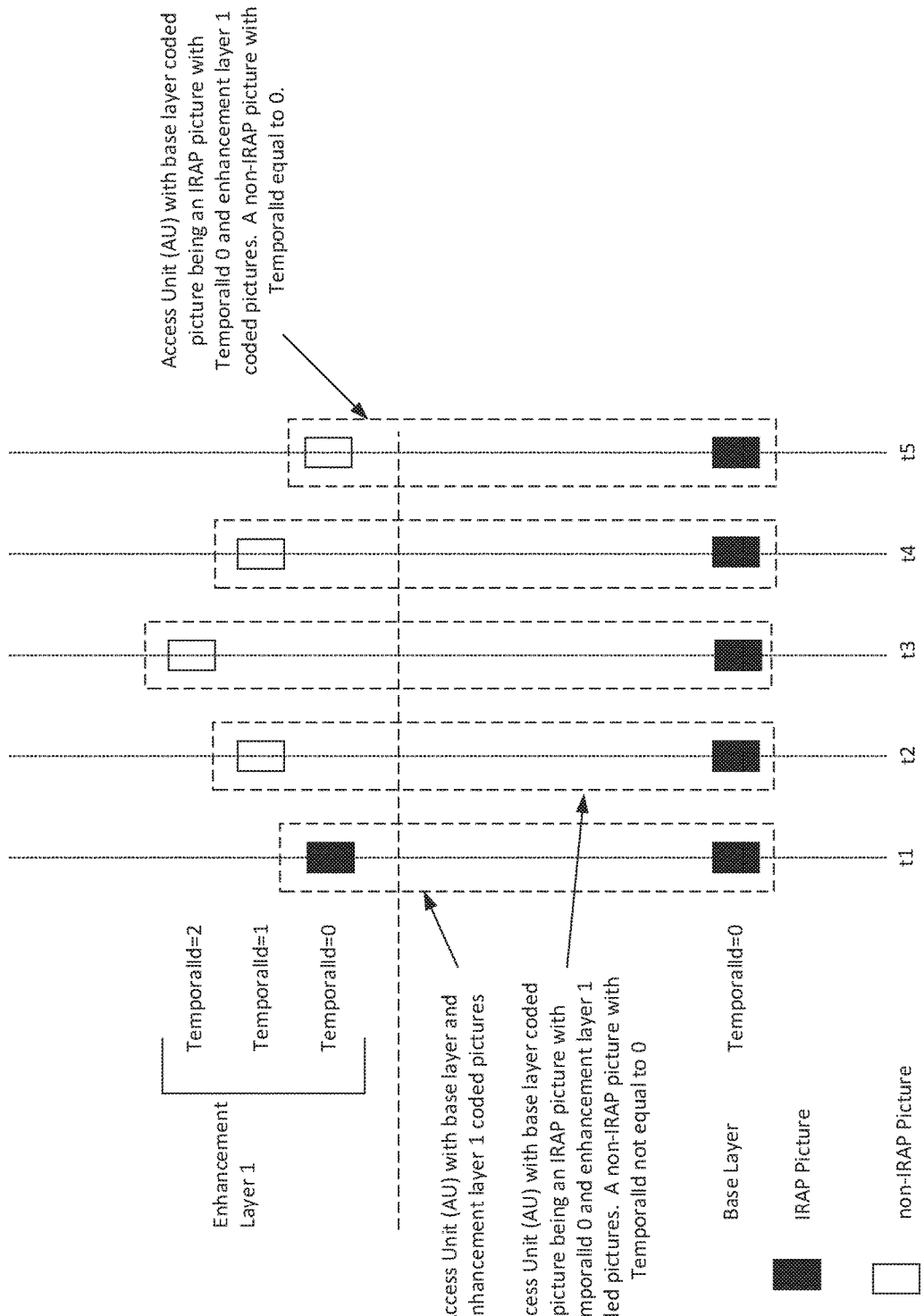
FIG. 49 illustrates another temporal sub-layers within IRAP pictures and non-IRAP pictures.

Changes in the TemporalID alignment to support more flexible coding structure are described below. The described changes allow the a more flexible coding structure to be supported in SHVC and MV-HEVC. Thus with the changes described below the coding structure as shown in FIG. 49 is supported. In FIG. 49 coding structure the base layer consists of coded pictures which are all IRAP pictures and thus have a TemporalId equal to 0. But the enhancement layer 1 pictures in the same AU can be coded with TemporalId different than TemporalId 0. Thus the Enhancement layer 1 picture can have a TemporalId 1 in the same AU where base layer picture is an IRAP picture and has a TemporalId equal to 0.

The changes to achieve this flexibility in SHVC and MV-HEVC are described next.

Non-intra random access point (Non-IRAP) access unit is defined as an access unit in which the coded picture is not an IRAP picture.

Non-intra random access point (Non-IRAP) picture is defined as a coded picture for which each VCL NAL unit has nal_unit_type with a VCL NAL unity type value other than any value in the range of BLA_W_LP to RSV_I-RAP_VCL23, inclusive.

It can be noted that a non-IRAP picture is a picture which is not a BLA picture, a CRA picture or an IDR picture.

The nuh_temporal_id_plus1 minus 1 specifies a temporal identifier for the NAL unit. The value of nuh_temporal_id_plus1 shall not be equal to 0.

The variable TemporalId may be specified as TemporalId=nuh_temporal_id_plus1−1.

If nal_unit_type is in the range of BLA_W_LP to RSV_I-RAP_VCL23, inclusive, i.e. the coded slice segment belongs to an IRAP picture, TemporalId shall be equal to 0. Otherwise, when nal_unit_type is equal to TSA_R, TSA_N, STSA_R, or STSA_N, TemporalId shall not be equal to 0.

The value of TemporalId shall be the same for all VCL NAL units of all non-IRAP coded pictures in an access unit. If in an access unit all VCL NAL units have a nal_unit_type in the range of BLA_W_LP to RSV_IRAP_VCL23, inclusive, i.e. the coded slice segments belongs to an IRAP picture, the value of Temporal ID of the access unit is 0. Otherwise the value of TemporalId of an access unit is the value of the TemporalId of the VCL NAL units of non-IRAP coded pictures in the access unit.

The value of TemporalId for non-VCL NAL units is constrained as follows:

If nal_unit_type is equal to VPS_NUT or SPS_NUT, TemporalId shall be equal to 0 and the TemporalId of the access unit containing the NAL unit shall be equal to 0.

Otherwise if nal_unit_type is equal to EOS_NUT or EOB_NUT, TemporalId shall be equal to 0.

Otherwise, if nal_unit_type is equal to AUD_NUT or FD_NUT, TemporalId shall be equal to the Temp\oralId of the access unit containing the NAL unit.

Otherwise, TemporalId shall be greater than or equal to the TemporalId of the access unit containing the NAL unit.

It can be noted that When the NAL unit is a non-VCL NAL unit, the value of TemporalId is equal to the minimum value of the TemporalId values of all access units to which the non-VCL NAL unit applies. When nal_unit_type is equal to PPS_NUT, TemporalId may be greater than or equal to the TemporalId of the containing access unit, as all PPSs may be included in the beginning of a bitstream, wherein the first coded picture has TemporalId equal to 0. When nal_unit_type is equal to PREFIX_SEI_NUT or SUFFIX_SEI_NUT, TemporalId may be greater than or equal to the TemporalId of the containing access unit, as an SEI NAL unit may contain information, e.g. in a buffering period SEI message or a picture timing SEI message, that applies to a bitstream subset that includes access units for which the TemporalId values are greater than the TemporalId of the access unit containing the SEI NAL unit.

In a variant embodiment the value of TemporalId shall be the same for all VCL NAL units with nal_unit_type equal to any value except values in the range of BLA_W_LP to RSV_IRAP_VCL23, inclusive in an access unit. If in an access unit all VCL NAL units have a nal_unit_type in the range of BLA_W_LP to RSV_IRAP_VCL23, inclusive, i.e. the coded slice segment belongs to an IRAP picture, the value of Temporal ID of the access unit is 0. Otherwise the value of TemporalId of an access unit is the value of the TemporalId of the VCL NAL units of non-IRAP coded pictures in the access unit.

In another variant embodiment the value of TemporalId shall be the same for all VCL NAL units with nal_unit_type equal to any value except values in the range of BLA_W_LP to RSV_IRAP_VCL23, inclusive in an access unit. The value of TemporalId of an access unit is the value of the highest TemporalId of the VCL NAL units in the access unit.

In a further variant embodiment the value of TemporalId shall be the same for all VCL NAL units of all non-IRAP coded pictures in an access unit. The value of TemporalId of an access unit is the value of the highest TemporalId of the VCL NAL units in the access unit.

As mentioned previously in HEVC (JCTVC-L1003), SHVC (JCTVC-P1008) and MV-HEVC (JCT3V-G1004) it is required that the value of TemporalId shall be the same for all VCL NAL units of an access unit.

Also in HEVC, SHVC, and MV-HEVC if nal_unit_type is in the range of BLA_W_LP to RSV_IRAP_VCL23, inclusive, i.e. the coded slice segment belongs to an IRAP picture, TemporalId shall be equal to 0.

It is also required that when nal_unit_type is equal to TSA_R, TSA_N, STSA_R, or STSA_N, TemporalId shall not be equal to 0.

Also in HEVC, SHVC, and MV-HEVC there are also further restrictions as follows:

When one picture picA of a layer layerA has nal_unit_type equal to TSA_N or TSA_R, each picture in the same access unit as picA in a direct or indirect reference layer of layerA shall have nal_unit_type equal to TSA_N or TSA_R.

When one picture picA of a layer layerA has nal_unit_type equal to STSA_N or STSA_R, each picture in the same access unit as picA in a direct or indirect reference layer of layerA shall have nal_unit_type equal to STSA_N or STSA_R.

Figure 50:
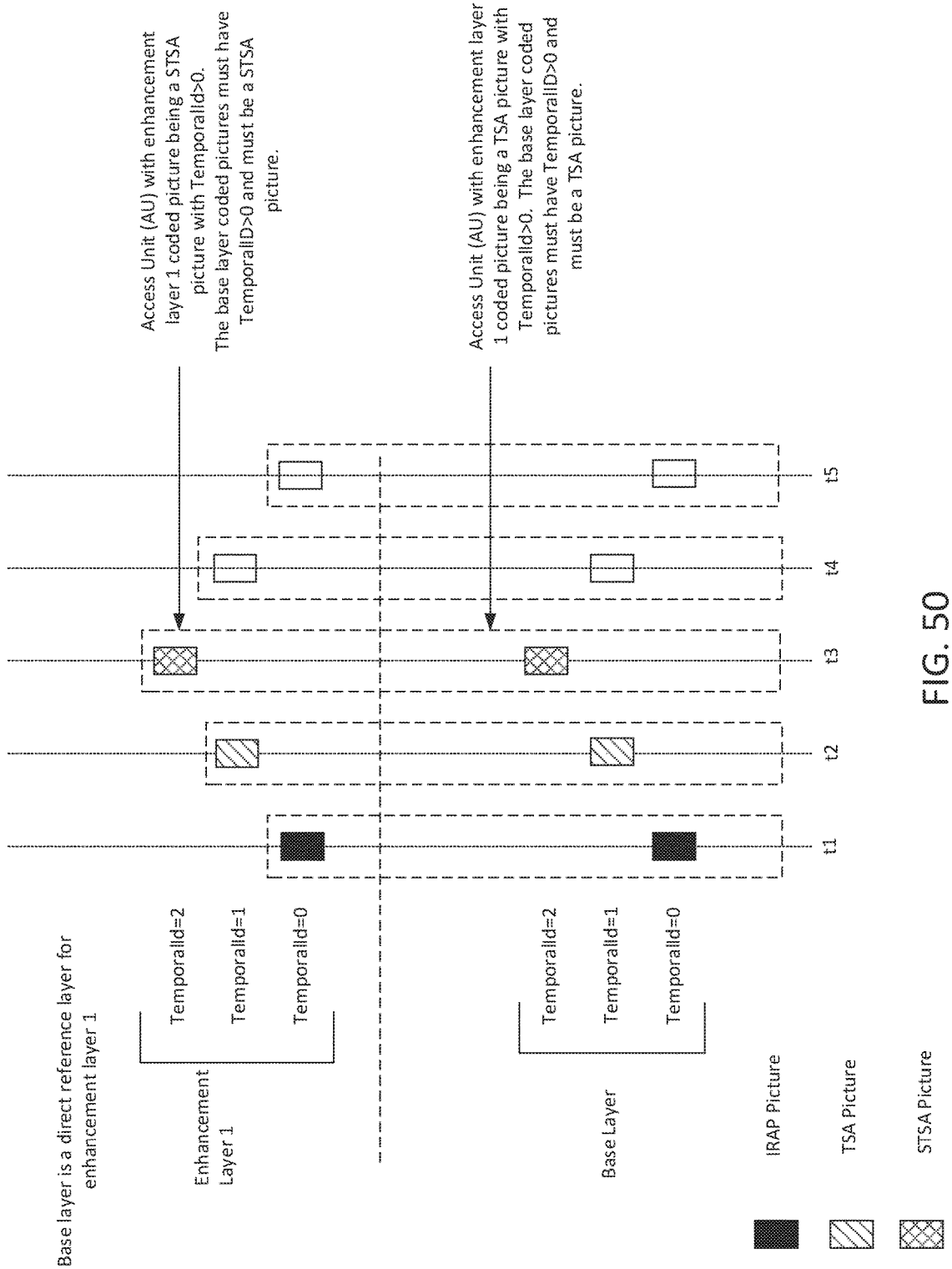
FIG. 50 illustrates temporal sub-layers within IRAP pictures, TSA pictures, STSA pictures.

Thus with all the current restrictions in HEVC, SHVC, and MV-HEVC a layer could not code a TSA or STSA picture when any other picture in the same access unit is an IRAP picture. Also a TSA or STSA picture must be coded in this case in direct and indirect reference layers of a layer. This current limitation is shown in FIG. 50 which results in a less flexibility in coding structure. In FIG. 50 enhancement layer 1 is using base layer as its direct reference layer. When a TSA picture is coded in enhancement layer1, a TSA picture must be coded in the same access unit in the base layer. Similarly when a STSA picture is coded in enhancement layer1, a STSA picture must be coded in the same access unit in the base layer. This limits flexibility.

Figure 51:
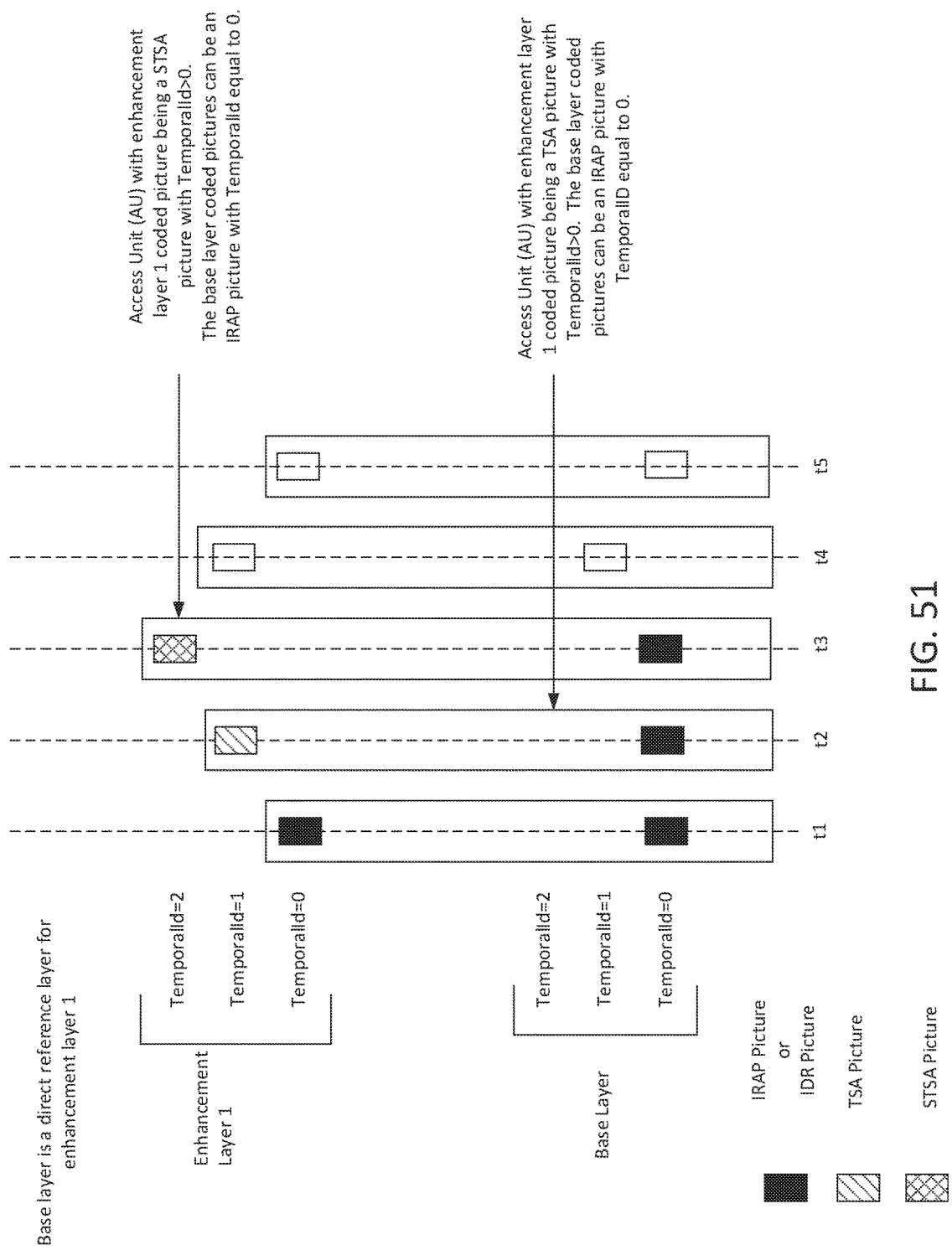
FIG. 51 illustrates another temporal sub-layers within IRAP pictures, TSA pictures, STSA pictures.

In a more flexible scenario if an IDR picture could be coded in one of the direct or indirect reference layers and TSA or STSA picture could be coded in other layer(s) then temporal layer upswitching at that access unit would still be supported. FIG. 51 shows such a flexible coding structure. In coding structure in FIG. 51 when a TSA picture is coded in enhancement layer 1, a TSA picture could be coded in the same access unit in the base layer similar to FIG. 50. This scenario is not shown in FIG. 51 but is supported. Additionally as shown in FIG. 33 at output time t2 when a TSA picture is coded in enhancement layer1, an IDR picture (or in a variant embodiment an IRAP picture) could be coded in the same access unit in the base layer. Similarly as shown in FIG. 51 at output time t3 when a STSA picture is coded in enhancement layer1, an IDR picture (or in a variant embodiment an IRAP picture) could be coded in the same access unit in the base layer. Additionally in coding structure in FIG. 51 when a STSA picture is coded in enhancement layer 1, a STSA picture could be coded in the same access unit in the base layer similar to FIG. 50. This scenario is not shown in FIG. 51 but is supported. The overall flexibility shown in FIG. 51 is currently disallowed by SHVC and MV-HEVC.

Changes to the alignment of TSA and STSA pictures to support more flexible coding structure are described next. These changes allow example coding structure shown in FIG. 51 and other similar flexible coding structure when using TSA and STSA pictures.

nal_unit_type specifies the type of RBSP data structure contained in the NAL unit as specified in Table 7 (1).

When one picture picA of a layer layerA has nal_unit_type equal to TSA_N or TSA_R, each picture in the same access unit as picA in a direct or indirect reference layer of layerA shall have nal_unit_type equal to TSA_N or TSA_R or IDR_W_RADL or IDR_N_LP.

When one picture picA of a layer layerA has nal_unit_type equal to STSA_N or STSA_R, each picture in the same access unit as picA in a direct or indirect reference layer of layerA shall have nal_unit_type equal to STSA_N or STSA_R or IDR_W_RADL or IDR_N_LP.

In a variant embodiment: nal_unit_type specifies the type of RBSP data structure contained in the NAL unit as specified in Table 7 (1).

When one picture picA of a layer layerA has nal_unit_type equal to TSA_N or TSA_R, each picture in the same access unit as picA in a direct or indirect reference layer of layerA shall have nal_unit_type equal to TSA_N or TSA_R or IDR_N_LP.

When one picture picA of a layer layerA has nal_unit_type equal to STSA_N or STSA_R, each picture in the same access unit as picA in a direct or indirect reference layer of layerA shall have nal_unit_type equal to STSA_N or STSA_R or IDR_N_LP.

In a variant embodiment: nal_unit_type specifies the type of RBSP data structure contained in the NAL unit as specified in Table 7 (1).

When one picture picA of a layer layerA has nal_unit_type equal to TSA_N or TSA_R, each picture in the same access unit as picA in a direct or indirect reference layer of layerA shall have nal_unit_type equal to TSA_N or TSA_R or IDR_W_RADL or IDR_N_LP or BLA_W_LP or BLA_W_RADL or BLA_N_LP.

When one picture picA of a layer layerA has nal_unit_type equal to STSA_N or STSA_R, each picture in the same access unit as picA in a direct or indirect reference layer of layerA shall have nal_unit_type equal to STSA_N or STSA_R or IDR_W_RADL or IDR_N_LP or BLA_W_LP or BLA_W_RADL or BLA_N_LP.

In a variant embodiment: nal_unit_type specifies the type of RBSP data structure contained in the NAL unit as specified in Table 7 (1).

When one picture picA of a layer layerA has nal_unit_type equal to TSA_N or TSA_R, each picture in the same access unit as picA in a direct or indirect reference layer of layerA shall have nal_unit_type equal to TSA_N or TSA_R or IDR_W_RADL or IDR_N_LP or BLA_W_LP or BLA_W_RADL or BLA_N_LP or CRA_NUT.

When one picture picA of a layer layerA has nal_unit_type equal to STSA_N or STSA_R, each picture in the same access unit as picA in a direct or indirect reference layer of layerA shall have nal_unit_type equal to STSA_N or STSA_R or IDR_W_RADL or IDR_N_LP or BLA_W_LP or BLA_W_RADL or BLA_N_LP or CRA_NUT.

In a variant embodiment: nal_unit_type specifies the type of RBSP data structure contained in the NAL unit as specified in Table 7 (1).

When one picture picA of a layer layerA has nal_unit_type equal to TSA_N or TSA_R, each picture in the same access unit as picA in a direct or indirect reference layer of layerA shall have nal_unit_type equal to TSA_N or TSA_R or nal_unit_type is in the range of BLA_W_LP to RSV_IRAP_VCL23, inclusive.

When one picture picA of a layer layerA has nal_unit_type equal to STSA_N or STSA_R, each picture in the same access unit as picA in a direct or indirect reference layer of layerA shall have nal_unit_type equal to STSA_N or STSA_R or nal_unit_type is in the range of BLA_W_LP to RSV_IRAP_VCL23, inclusive.

nuh_layer_id specifies the identifier of the layer.

When nal_unit_type is equal to AUD_NUT, the value of nuh_layer_id shall be equal to the minimum of the nuh_layer_id values of all VCL NAL units in the access unit.

When nal_unit_type is equal to VPS_NUT, the value of nuh_layer_id shall be equal to 0. Decoder shall ignore NAL units with nal_unit_type equal to VPS_NUT and nuh_layer_id greater than 0.

nuh_temporal_id_plus1 minus 1 specifies a temporal identifier for the NAL unit. The value of nuh_temporal_id_plus1 shall not be equal to 0.

The variable TemporalId is specified as follows:

$$TemporalId = nuh\_temporal\_id\_plus1 - 1 \qquad (7-1)$$

If nal_unit_type is in the range of BLA_W_LP to RSV_IRAP_VCL23, inclusive, i.e. the coded slice segment belongs to an IRAP picture, TemporalId shall be equal to 0. Otherwise, when nal_unit_type is equal to TSA_R, TSA_N, STSA_R, or STSA_N, TemporalId shall not be equal to 0.

The value of TemporalId shall be the same for all VCL NAL units of all non-IRAP coded pictures in an access unit. If in an access unit all VCL NAL units have a nal_unit_type in the range of BLA_W_LP to RSV_IRAP_VCL23, inclusive, i.e. the coded slice segment belongs to an IRAP picture, the value of Temporal ID of the access unit is 0. Otherwise the value of TemporalId of an access unit is the value of the TemporalId of the VCL NAL units of non-IRAP coded pictures in the access unit.

The value of TemporalId for non-VCL NAL units is constrained as follows:

If nal_unit_type is equal to VPS_NUT or SPS_NUT, TemporalId shall be equal to 0 and the TemporalId of the access unit containing the NAL unit shall be equal to 0.

Otherwise if nal_unit_type is equal to EOS_NUT or EOB_NUT, TemporalId shall be equal to 0.

Otherwise, if nal_unit_type is equal to AUD_NUT or FD_NUT, TemporalId shall be equal to the TemporalId of the access unit containing the NAL unit.

Otherwise, TemporalId shall be greater than or equal to the TemporalId of the access unit containing the NAL unit.

When the NAL unit is a non-VCL NAL unit, the value of TemporalId is equal to the minimum value of the TemporalId values of all access units to which the non-VCL NAL unit applies. When nal_unit_type is equal to PPS_NUT, TemporalId may be greater than or equal to the TemporalId of the containing access unit, as all PPSs may be included in the beginning of a bitstream, wherein the first coded picture has TemporalId equal to 0. When nal_unit_type is equal to PREFIX_SEI_NUT or SUFFIX_SEI_NUT, TemporalId may be greater than or equal to the TemporalId of the containing access unit, as an SEI NAL unit may contain information, e.g. in a buffering period SEI message or a picture timing SEI message, that applies to a bitstream subset that includes access units for which the TemporalId values are greater than the TemporalId of the access unit containing the SEI NAL unit.

In SHVC and MV-HEVC a cross_layer_irap_aligned_flag flag may be signaled in video parameter set. In particular this flag may be signaled in video parameter set extension as shown below in Table (3).

The cross_layer_irap_aligned_flag equal to 1 specifies that TRAP pictures in the coded video sequence (CVS) are cross-layer aligned, i.e. when a picture pictureA of a layer layerA in an access unit is an IRAP picture, each picture pictureB in the same access unit that belongs to a direct reference layer of layerA or that belongs to a layer for which layerA is a direct reference layer of that layer is an IRAP picture and the VCL NAL units of pictureB have the same value of nal_unit_type as that of pictureA.

cross_layer_irap_aligned_flag equal to 0 specifies that the above restriction may or may not apply.

Also in SHVC and MV-HEVC a poc_Reset_flag may be signaled in the slice segment header.

poc_reset_flag equal to 1 specifies that the derived picture order count for the current picture is equal to 0. poc_reset_flag equal to 0 specifies that the derived picture order count for the current picture may or may not be equal to 0. It is a requirement of bitstream conformance that when cross_layer_irap_aligned_flag is equal to 1, the value of poc_reset_flag shall be equal to 0. When not present, the value of poc_reset_flag is inferred to be equal to 0.

The restrictions related to when cross_layer_irap_aligned_flag is equal to 1 require same NAL unit type value to be used across layers. This may be too restrictive. A modification to the restrictions when cross_layer_irap_aligned_flag is equal to 1 are described next.

In this case cross_layer_irap_aligned_flag equal to 1 specifies that IRAP pictures in the coded video sequence (CVS) are cross-layer aligned, i.e. when a picture pictureA of a layer layerA in an access unit is an IRAP picture, each picture pictureB in the same access unit that belongs to a direct reference layer of layerA or that belongs to a layer for which layerA is a direct reference layer of that layer is an IRAP picture and the VCL NAL units of pictureB have the same picture type as that of pictureA. cross_layer_irap_aligned_flag equal to 0 specifies that the above restriction may or may not apply.

Thus in the above description cross_layer_irap_aligned_flag equal to 1 specifies that IRAP pictures in the coded video sequence (CVS) are cross-layer aligned, i.e. when a picture pictureA of a layer layerA in an access unit is a BLA picture, each picture pictureB in the same access unit that belongs to a direct reference layer of layerA or that belongs to a layer for which layerA is a direct reference layer of that layer is a BLA picture.

When a picture pictureA of a layer layerA in an access unit is a IDR picture, each picture pictureB in the same access unit that belongs to a direct reference layer of layerA or that belongs to a layer for which layerA is a direct reference layer of that layer is a IDR picture.

When a picture pictureA of a layer layerA in an access unit is a CRA picture, each picture pictureB in the same access unit that belongs to a direct reference layer of layerA or that belongs to a layer for which layerA is a direct reference layer of that layer is a CRA picture.

The cross_layer_irap_aligned_flag equal to 0 specifies that the above restriction may or may not apply.

Thus as an example in this relaxed restriction pictureA could have a nal_unit_type BLA_W_LP and pictureB in the same access unit could have nal_unit_type BLA_N_LP or BLA_W_RADL. Also as an example in this relaxed restriction pictureA could have a nal_unit_type IDR_N_LP and pictureB in the same access unit could have nal_unit_type IDR_W_RADL. This allow more flexibility.

poc_reset_flag equal to 1 specifies that the derived picture order count for the current picture is equal to 0. poc_reset_flag equal to 0 specifies that the derived picture order count for the current picture may or may not be equal to 0. It is a requirement of bitstream conformance that when cross_layer_irap_aligned_flag is equal to 1, the value of poc_reset_flag shall be equal to 0. When not present, the value of poc_reset_flag is inferred to be equal to 0.

In most cases, the base layer is encoded in a manner such that it results in a HEVC compliant bitstream that is suitable to being decoded by a HEVC decoder. Similarly, the enhancement layers including SHVC and/or MV-HEVC are likewise encoded in a manner such that it results in a SHVC and/or MV-HEVC compliant bitstream suitable to be decoded by a SHVC and/or a MV-HEVC decoder. The enhancement layer(s) typically use information from the base layers for the decoding process. Also, if the enhancement layer(s) are removed the base layer still remains suitable for being decoded by the HEVC decoder.

In some cases, the base layer may be encoded in a manner that results in a non-HEVC compliant bitstream that is not suitable to being decoded by a HEVC decoder. For example, the base layer may be encoded by non-HEVC complaint encoders, such as a MPEG-1 encoder, a MPEG-2 encoder, a AVC encoder, a VP8 encoder, a VC1 encoder etc. resulting in a corresponding bitstream. Unfortunately, the non-HEVC compliant bitstream results in complexities of using the SHVC or MV-HEVC compliant enhancement layers because information expected to be provided from the base layer is not present.

The decoder may use an external decoder for the non-HEVC compliant base layer that decodes the base layer and provides a series of base layer pictures, and some additional information which helps associate the base layer decoded pictures with an access unit and provides information about its representation format. For example, for the current access unit, either no information is provided (meaning no base layer picture is used for inter-layer prediction for the current access unit, regardless whether there was a base layer picture in this access unit in the base layer bitstream) or the following information of the base layer picture is provided by external means: (1) the decoded sample values of the base layer decoded picture; (2) the representation format of the base layer decoded picture, including the width and height in luma samples, the colour format, the separate colour plane flag, the luma bit depth, and the chroma bit depth; (3) whether the base layer picture is an IRAP picture or not, and if yes, the IRAP NAL unit type, which may specify an IDR picture, a CRA picture, or a BLA picture; and (4) optionally, whether the picture is a frame or a field, and when a field, the field parity (a top field or a bottom field). When not provided, the decoded picture is inferred to be a frame picture The picture order count of the base layer decoded picture is set equal to the picture order count of any enhancement layer picture, if present, in the same access unit. Note that in this case the actual picture order count of a base layer picture decoded by the base layer decoder in such a scalable or multiview codec might be different than the picture order count value of the same picture when it is decoded by an non-HEVC decoder. When no enhancement layer picture is present for the access unit, the base layer decoded picture is not used and can be discarded. Also, inter-layer motion prediction from the base layer picture is disallowed, a picture order count may be associated with the externally decoded picture, and the picture. In this manner, the externally decoded picture can not be used by an enhancement layer for motion prediction, but may be used for sample prediction.

The base layer is externally specified may be signalled using a flag in the bitstream. For example a vps_base_layer_external_flag may be defined in video parameter set (VPS) such as shown below.

|  | Descriptor |
|---|---|
| video_parameter_set_rbsp( ) { |  |
|   vps_video_parameter_set_id | u(4) |
|   vps_reserved_three_2bits | u(2) |
|   vps_max_layers_minus1 | u(6) |
|   vps_max_sub_layers_minus1 | u(3) |
|   vps_temporal_id_nesting_flag | u(1) |
|   vps_reserved_0xffff_16bits | u(16) |
|   profile_tier_level( vps_max_sub_layers_minus1 ) |  |
|   vps_sub_layer_ordering_info_present_flag | u(1) |
|   for( i = ( vps_sub_layer_ordering_info_present_flag ? 0 : vps_max_sub_layers_minus1 ); |  |
|     i <= vps_max_sub_layers_minus1; i++ ) { |  |
|     vps_max_dec_pic_buffering_minus1[ i ] | ue(v) |
|     vps_max_num_reorder_pics[ i ] | ue(v) |
|     vps_max_latency_increase_plus1[ i ] | ue(v) |
|   } |  |
|   vps_max_layer_id | u(6) |
|   vps_num_layer_sets_minus1 | ue(v) |
|   for( i = 1; i <= vps_num_layer sets_minus1; i++ ) |  |
|     for( j = 0; j <= vps_max_layer_id; j++ ) |  |
|       layer_id_included_flag[ i ][ j ] | u(1) |
|   vps_timing_info_present_flag | u(1) |
|   if( vps_timing_info_present_flag ) { |  |
|     vps_num_units_in_tick | u(32) |
|     vps_time_scale | u(32) |
|     vps_poc_proportional_to_timing_flag | u(1) |
|     if( vps_poc_proportional_to_timing_flag ) |  |
|       vps_num_ticks_poc_diff_one_minus1 | ue(v) |
|     vps_num_hrd_parameters | ue(v) |
|     for( i = 0; i < vps_num_hrd_parameters; i++ ) { |  |
|       hrd_layer_set_idx[ i ] | ue(v) |
|       if(i > 0) |  |
|         cprms_present_flag[ i ] | u(1) |
|       hrd_parameters( cprms_present_flag[ i ], vps_max_sub_layers_minus1 ) |  |
|     } |  |
|   } |  |
|   vps_extension_flag | u(1) |
|   if( vps_extension_flag ) |  |
|     while( more_rbsp_data( ) ) |  |
|       vps_extension_data_flag | u(1) |
|   rbsp_trailing_bits( ) |  |
| } |  |

'vps_base_layer_external_flag' equal to 1 may specify that the base layer is provided by an external means not specified in the SHVC/MV-HEVC Specification. vps_base_layer_external_flag equal to 0 may specify that the base layer is provided in the bitstream.

When vps_base_layer_external_flag is equal to 1, the following may apply:
- The value of vps_sub_layer_ordering_info_present_flag shall be equal to 0.
- The values of vps_max_dec_pic_buffering_minus1[i], vps_max_num_reorder_pics[i], and vps_max_latency_increase_plus1[i] shall all be equal to 0 for all possible values of i.
- Decoders shall ignore the values of vps_sub_layer_ordering_info_present_flag, vps_max_dec_pic_buffering_minus1[i], vps_max_num_reorder_pics[i], and vps_max_latency_increase_plus 1[i].

The value of hrd_layer_set_idx[i] shall be greater than 0.

'vps_reserved_one_bit' shall be equal to 1 in bitstreams conforming to this version of this Specification. The value 0 for vps_reserved_one_bit is reserved for future use by ITU-T|ISO/IEC. Decoders shall ignore the value of vps_reserved_one_bit.

Parameters min_spatial_segment_offset_plus1[i][j], ctu_based_offset_enabled_flag[i][j], and min_horizontal_ctu_offset_plus1[i][j] are signaled in VPS extension in JCTVC-P1008 and JCT3V-G1004. When the base layer is externally specified the semantics of min_spatial_segment_offset_plus1[i][j], min_horizontal_ctu_offset_plus1[i][j] and related derivations utilize refPicWidthInCtbsY[i][j] and refPicHeightInCtbsY[i][j] information regarding j-th direct reference layer of i-th layer which will not be available when that j-th direct reference layer is non-HEVC base layer externally specified. Without this information being available from an externally specified base layer, it is desirable to modify the VPS extension parameters signaling so that this information is not signaled. Accordingly, as illustrated in FIG. 52 the VPS extension parameters min_spatial_segment_offset_plus1[i][j], ctu_based_offset_enabled_flag[i][j], min_horizontal_ctu_offset_plus1[i][j] are preferably not signaled when base layer is externally specified and is one of the direct reference layers for layer i (i.e. layer_id_in_nuh[LayerIdxInVps[RefLayerId[layer_id_in_nuh[i][j]]]]==0).

Another technique of achieve this limitation is to include a bitstream conformance requirement that for i in the range of 1 to MaxLayerMinus1 inclusive, when vps_base_layer_external_flag is equal to 1 and layer_id_in_nuh[LayerIdxInVps[RefLayerId[layer_id_in_nuh[i][j]]]] is equal to 0 for j in the range of 0 to NumDirectRefLayers[layer_id_in_nuh[i]], inclusive min_spatial_segment_offset_plus1[i][j] is equal to value 0.

In this case additionally ctu_based_offset_enabled_flag[i][j] is required to be equal to zero and min_horizontal_ctu_offset_plus1[i][j] is required to be equal to zero.

min_spatial_segment_offset_plus1[i][j] indicates the spatial region, in each picture of the j-th direct reference layer of the i-th layer, that is not used for inter-layer prediction for decoding of any picture of the i-th layer, by itself or together with min_horizontal_ctu_offset_plus1[i][j], as specified below. The value of min_spatial_segment_offset_plus1[i][j] shall be in the range of 0 to refPicWidthInCtbsY[i][j]*refPicHeightInCtbsY[i][j], inclusive. When not present, the value of min_spatial_segment_offset_plus1[i][j] is inferred to be equal to 0.

'ctu_based_offset_enabled_flag' [i][j] equal to 1 specifies that the spatial region, in units of CTUs, in each picture of the j-th direct reference layer of the i-th layer, that is not used for inter-layer prediction for decoding of any picture of the i-th layer is indicated by min_spatial_segment_offset_plus1[i][j] and min_horizontal_ctu_offset_plus1[i][j] together. ctu_based_offset_enabled_flag[i][j] equal to 0 specifies that the spatial region, in units of slice segments, tiles, or CTU rows, in each picture of the j-th direct reference layer of the i-th layer, that is not used for inter-layer prediction for decoding of any picture of the i-th layer is indicated by min_spatial_segment_offset_plus1[i] only. When not present, the value of ctu_based_offset_enabled_flag[i] is inferred to be equal to 0.

'min_horizontal_ctu_offset_plus 1' [i][j], when ctu_based_offset_enabled_flag[i][j] is equal to 1, indicates the spatial region, in each picture of the j-th direct reference layer of the i-th layer, that is not used for inter-layer prediction for decoding of any picture of the i-th layer, together with min_spatial_segment_offset_plus1[i][j], as specified below. The value of min_horizontal_ctu_offset_plus1[i][j] shall be in the range of 0 to refPicWidthInCtbsY[i][j], inclusive.

When ctu_based_offset_enabled_flag[i][j] is equal to 1, the variable minHorizontalCtbOffset[i][j] is derived as follows: minHorizontalCtbOffset[i][j]=(min_horizontal_ctu_offset_plus1[i][j]>0)? (min_horizontal_ctu_offset_plus1[i][j]−1):(refPicWidthInCtbsY[i][j] 1)

The variables curPicWidthInSamples$_L$[i], curPicHeightInSamples$_L$[i], curCtb Log 2SizeY[i], curPicWidthInCtbsY[i], and curPicHeightInCtbsY[i] are set equal to PicWidthInSamples$_L$, PicHeightInSamples$_L$, Ctb Log 2SizeY, PicWidthInCtbsY, and PicHeightInCtbsY, respectively, of the i-th layer.

The variables refPicWidthInSamples$_L$[i][j], refPicHeightInSamples$_L$[i][j], refCtb Log 2SizeY[i][j], refPicWidthInCtbsY[i][j], and refPicHeightInCtbsY[i][j] are set equal to PicWidthInSamples$_L$, PicHeightInSamplesL, Ctb Log 2SizeY, PicWidthInCtbsY, and PicHeightInCtbsY, respectively, of the j-th direct reference layer of the i-th layer.

The variables curScaledRefLayerLeftOffset[i][j], curScaledRefLayerTopOffset[i][j], curScaledRefLayerRightOffset[i][j] and curScaledRefLayerBottomOffset[i][j] are set equal to scaled_ref_layer_left_offset[j]<<1, scaled_ref_layer_top_offset[j]<<1, scaled_ref_layer_right_offset [j]<<1, scaled_ref_layer_bottom_offset [j]<<1, respectively, of the j-th direct reference layer of the i-th layer.

The variable colCtbAddr[i][j] that denotes the raster scan address of the collocated CTU, in a picture in the j-th direct reference layer of the i-th layer, of the CTU with raster scan address equal to ctbAddr in a picture of the i-th layer is derived as follows:

The variables (xP, yP) specifying the location of the top-left luma sample of the CTU with raster scan address equal to ctbAddr relative to top-left luma luma sample in a picture of the i-th layer are derived as follows:

```
xP = ( ctbAddr % curPicWidthInCtbsY[ i ] ) << curCtbLog2SizeY
yP = ( ctbAddr / curPicWidthInCtbsY[ i ] ) << curCtbLog2SizeY
The variables scaleFactorX[ i ][ j ] and scaleFactorY[ i ][ j ]
are derived as follows:
curScaledRefLayerPicWidthInSamples_L[ i ][ j ] =
curPicWidthInSamples_L[ i ] –
curScaledRefLayerLeftOffset[ i ][ j ] –
curScaledRefLayerRightOffset[ i ][ j ]
curScaledRefLayerPicHeightInSamples_L[ i ][ j ] =
curPicHeightInSamples_L[ i ] –
curScaledRefLayerTopOffset[ i ][ j ] –
curScaledRefLayerBottomOffset[ i ][ j ]
scaleFactorX[ i ][ j ] = ( ( refPicWidthInSamples_L [ i ][ j ] << 16 ) +
( curScaledRefLayerPicWidthInSamples_L
[ i ][ j ]>> 1 ) )/curScaledRefLayerPicWidthInSamples_L [ i ][ j ]
scaleFactorY[ i ][ j ] = ( ( refPicHeightInSamples_L [ i ][ j ] << 16 ) +
( curScaledRefLayerPicHeightInSamples_L >> 1 ) ) /
curScaledRefLayerPicHeightInSamples_L [ i ][ j ]
```

The variables (xCol[I][j], yCol xCol[I][j]) specifying the collocated luma sample location in a picture in the j-th direct reference layer of the luma sample location (xP, yP) in the i-th layer are derived as follows:

```
xCol [ i ][ j ] = Clip3( 0, ( refPicWidthInSamples_L[ i ][ j ]– 1 ),
( ( xP – curScaledRefLayerLeftOffset[ i ][ j ]) * scaleFactorX[ i ][ j ] +
( 1 << 15 ) ) >> 16))
```

-continued

```
yCol [ i ][ j ] = Clip3( 0 , ( refPicHeightInSamples_L[ i ][ j ]- 1 ),
( ( yP - curScaledRefLayerTopOffset[ i ][ j ]) * scaleFactorY[ i ][ j ] +
( 1 << 15 ) ) >> 16))
```

The variable colCtbAddr[i][j] is derived as follows:

```
xColCtb[ i ][ j ] = xCol[ i ][ j ] >> refCtbLog2SizeY[ i ][ j ]
yColCtb[ i ][ j ] = yCol[ i ][ j ] >> refCtbLog2SizeY[ i ][ j ]
colCtbAddr[ i ][ j ] = xColCtb[ i ][ j ] + ( yColCtb[ i ][ j ] *
   refPicWidthInCtbsY[ i ][ j ] )
```

When min_spatial_segment_offset_plus1[i][j] is greater than 0, it is a requirement of bitstream conformance that the following shall apply:

If ctu_based_offset_enabled_flag[i][j] is equal to 0, exactly one of the following applies:

In each PPS referred to by a picture in the j-th direct reference layer of the i-th layer, tiles_enabled_flag is equal to 0 and entropy_coding_sync_enabledflag is equal to 0, and the following applies:

Let slice segment A be any slice segment of a picture of the i-th layer and ctbAddr be the raster scan address of the last CTU in slice segment A. Let slice segment B be the slice segment that belongs to the same access unit as slice segment A, belongs to the j-th direct reference layer of the i-th layer, and contains the CTU with raster scan address colCtbAddr[i][j]. Let slice segment C be the slice segment that is in the same picture as slice segment B and follows slice segment B in decoding order, and between slice segment B and that slice segment there are min_spatial_segment_offset_plus1[i]−1 slice segments in decoding order. When slice segment C is present, the syntax elements of slice segment A are constrained such that no sample or syntax elements values in slice segment C or any slice segment of the same picture following C in decoding order are used for inter-layer prediction in the decoding process of any samples within slice segment A.

In each PPS referred to by a picture in the j-th direct reference layer of the i-th layer, tiles_enabled_flag is equal to 1 and entropy_coding_sync_enabled_flag is equal to 0, and the following applies:

Let tile A be any tile in any picture picA of the i-th layer and ctbAddr be the raster scan address of the last CTU in tile A. Let tile B be the tile that is in the picture picB belonging to the same access unit as picA and belonging to the j-th direct reference layer of the i-th layer and that contains the CTU with raster scan address colCtbAddr[i][j]. Let tile C be the tile that is also in picB and follows tile B in decoding order, and between tile B and that tile there are min_spatial_segment_offset_plus1[i]−1 tiles in decoding order. When slice segment C is present, the syntax elements of tile A are constrained such that no sample or syntax elements values in tile C or any tile of the same picture following C in decoding order are used for inter-layer prediction in the decoding process of any samples within tile A.

In each PPS referred to by a picture in the j-th direct reference layer of the i-th layer, tiles_enabled_flag is equal to 0 and entropy_coding_sync_enabled_flag is equal to 1, and the following applies:

Let CTU row A be any CTU row in any picture picA of the i-th layer and ctbAddr be the raster scan address of the last CTU in CTU row A. Let CTU row B be the CTU row that is in the picture picB belonging to the same access unit as picA and belonging to the j-th direct reference layer of the i-th layer and that contains the CTU with raster scan address colCtbAddr[i][j]. Let CTU row C be the CTU row that is also in picB and follows CTU row B in decoding order, and between CTU row B and that CTU row there are min_spatial_segmen-t_offset_plus1[i]−1 CTU rows in decoding order. When CTU row C is present, the syntax elements of CTU row A are constrained such that no sample or syntax elements values in CTU row C or row of the same picture following C are used for inter-layer prediction in the decoding process of any samples within CTU row A.

Otherwise (ctu_based_offset_enabled_flag[i][j] is equal to 1), the following applies:

The variable refCtbAddr[i][j] is derived as follows:

```
xOffset[ i ][ j ] =
( ( xColCtb[ i ][ j ] + minHorizontalCtbOffset[ i ][ j ] ) >
  ( refPicWidthInCtbsY[ i ][ j ] - 1 ) ) ?
    ( refPicWidthInCtbsY[ i ][ j ] - 1 -xColCtb[ i ][ j ] ) :
( minHorizontalCtbOffset[ i ][ j ] )
    yOffset[ i ][ j ] = ( min_spatial_segment_offset_plus1[ i ][ j ] -
1 ) * refPicWidthInCtbsY[ i ][ j ]
    refCtbAddr[ i ][ j ] = colCtbAddr[ i ][ j ] + xOffset[ i ][ j ] +
yOffset[ i ][ j ]
```

Let CTU A be any CTU in any picture picA of the i-th layer, and ctbAddr be the raster scan address ctbAddr of CTU A. Let CTU B be a CTU that is in the picture belonging to the same access unit as picA and belonging to the j-th direct reference layer of the i-th layer and that has raster scan address greater than refCtbAddr[i][j]. When CTU B is present, the syntax elements of CTU A are constrained such that no sample or syntax elements values in CTU B are used for inter-layer prediction in the decoding process of any samples within CTU A.

When the base layer is externally specified the information regarding tiling structure, if any for it, is unknown. Thus alignment of the tiles between a i-th layer and j-th direct reference layer of i-th layer when that j-th direct reference layer is externally specified base layer is not known and is not signaled. Without this information being available with an externally specified base layer, it is desirable to modify the VPS extension parameters signaling so that this information is not signaled. Accordingly, as illustrated in FIG. 53 the VPS extension parameter tile_boundaries_aligned_flag [i] [j], is preferably not signaled when base layer is externally specified and is one of the direct reference layers for layer i (i.e. layer_id_in_nuh[LayerIdxInVps[RefLayerId [layer_id_in_nuh[i][j]]]]=0).

Another technique of achieve this limitation is to include a bitstream conformance requirement that for i in the range of 1 to MaxLayerMinus1 inclusive, when vps_base_layer_external_flag equal to 1 and layer_id_in_nuh[LayerIdxInVps[RefLayerId[layer_id_in_nuh[i][j]]]] is equal to 0 for j in the range of 0 to NumDirectRefLayers[layer_id_in_nuh[i]], inclusive tile_boundaries_aligned_flag[i][j] is equal to value 0.

'tile_boundaries_aligned_flag' [i][j] equal to 1 indicates that, when any two samples of one picture of the i-th layer specified by the VPS belong to one tile, the two collocated samples, when both present in the picture of the j-th direct reference layer of the i-th layer, belong to one tile, and when any two samples of one picture of the i-th layer belong to different tiles, the two collocated samples, when both present in the picture of the j-th direct reference layer of the i-th layer belong to different tiles. tile_boundaries_aligned_flag equal to 0 indicates that such a restriction may or may not apply. When not present, the value of tile_boundaries_aligned_flag[i][j] is inferred to be equal to 0.

Additionally in FIG. 53, the tile_boundaires_aligned_flag [i][j] is signaled for the first enhancement layer.

For layer sets, the externally specified base layer does not include a bitrate or picture rate information, and accordingly, there such information is preferably not signaled as part of the layer sets. The first layer set has only the base layer in it, and accordingly, if the base layer is externally specified then it is not desirable to signal that layer set (and sub-layer set). Referring to FIG. 54, for layer sets it is desirable to start the indexing at i=1 for externally signaled base layers, and i=0 for HEVC signaled base layer.

In the case of externally specified base layer, a variable BlIrapPicFlag (base layer irap picture flag) is provided by external means and if BlIrapPicFlag is equal to 1 (i.e. decoded picture is IRAP picture) value of nal_unit_Type is provided by external means. Thus the value of nal_unit_type for the base layer is only provided if it is a IRAP picture. For other picture types the nal_unit_Type of externally provided base layer picture is not provided. Thus TSA_N or TSA_R nal_unit_type is not signaled for an externally specified base layer. Thus the cross-layer alignment when such a externally specified base layer is direct or indirect reference layer of another layer may be relaxed.

This relaxation with respect to TSA_N or TSA_R may be achieved by when one picture picA of a layer layerA has nal_unit_type equal to TSA_N or TSA_R, each picture in the same access unit as picA in a direct or indirect reference layer of layerA with the exception of layer with nuh_layer_id equal to 0 when vps_base_layer_external_flag is equal to 1 shall have nal_unit_type equal to TSA_N or TSA_R. Accordingly, externally specified pictures can have a NAL unit type of IRAP defined if an IRAP picture but can't specify if a TSA_N or TSA_R because the externally specified pictures may not have the concept of a TSA picture, so relaxing the restriction accommodates the use of TSA_N and/or TSA_R in the enhancement layers.

In another embodiment the relaxation with respect to TSA_N or TSA_R may be achieved by when one picture picA of a layer layerA has nal_unit_type equal to TSA_N or TSA_R, each coded picture in the same access unit as picA in a direct or indirect reference layer of layerA shall have nal_unit_type equal to TSA_N or TSA_R. By specifying coded picture in this restriction the externally specified base layer for which only decoded picture is provided by external means is excluded from this restriction when externally specified base layer is a direct reference layer.

In the case of externally specified base layer a variable BlIrapPicFlag is provided by external means and if BlIrapPicFlag.is equal to 1 (i.e. decoded picture is IRAP picture) value of nal_unit_type is provided by external means. Thus the value of nal_unit_type for the base layer is only provided if it is a IRAP picture. For other picture types the nal_unit_Type of externally provided base layer picture is not provided. Thus STSA_N or STSA_R nal_unit_type is not signaled for an externally specified base layer. Thus the cross-layer alignment when such a externally specified base layer is direct or indirect reference layer of another layer may be relaxed.

This relaxation with respect to STSA_N or STSA_R may be achieved by when one picture picA of a layer layerA has nal_unit_type equal to STSA_N or STSA_R, each picture in the same access unit as picA in a direct or indirect reference layer of layerA with the exception of layer with nuh_layer_id equal to 0 when vps_base_layer_external_flag is equal to 1 shall have nal_unit_type equal to STSA_N or STSA_R. Accordingly, externally specified pictures can have a NAL unit type of IRAP defined if an IRAP picture but can't specify if a STSA_N or STSA_R because the externally specified pictures may not have the concept of a STSA picture, so relaxing the restriction accommodates the use of STSA_N and/or STSA_R in the enhancement layers.

In another embodiment the relaxation with respect to STSA_N or STSA_R may be achieved by when one picture picA of a layer layerA has nal_unit_type equal to STSA_N or STSA_R, each coded picture in the same access unit as picA in a direct or indirect reference layer of layerA shall have nal_unit_type equal to STSA_N or STSA_R. By specifying coded picture in this restriction the externally specified base layer for which only decoded picture is provided by external means is excluded from this restriction when externally specified base layer is a direct reference layer.

For any particular access unit (see FIG. 17 and FIG. 29), HEVC compliance has a requirement that the TemporalId is the same for the base layer and the enhancement layers. With the pictures for the externally specified base layers not having a TemporalId, it is desirable to assign TemporalId for the picture of the externally specified base layer.

This requirement with respect to TemporalId may be expressed as the value of TemporalId shall be the same for all VCL NAL units of an access unit. When vps_base_layer_external_flag is equal to 1 the value of TemporalId of a picture with nuh_layer_id equal to 0 is inferred. Otherwise the value of TemporalId of a coded picture or an access unit is the value of the TemporalId of the VCL NAL units of the coded picture or the access unit. The value of TemporalId of a sub-layer representation is the greatest value of TemporalId of all VCL NAL units in the sub-layer representation. The decoding process may implement the following, if the access unit has at least one picture with nuh_layer_id greater than 0, TemporalId of the decoded picture for the externally specified base layer with nuh_layer_id equal to 0 is set equal to the TemporalId of any picture with nuh_layer_id greater than 0 in the access unit.

Another technique to achieve a similar TemporalId expression is the value of TemporalId shall be the same for all VCL NAL units of an access unit when vps_base_layer_external_flag is equal to 0. The value of TemporalId shall be the same for all VCL NAL units with nuh_layer_id>0 of an access unit when vps_base_layer_external_flag is equal to 1. When vps_base_layer_external_flag is equal to 1 the value of TemporalId of a picture with nuh_layer_id equal to 0 is inferred. When vps_base_layer_external_flag is equal to 0 the value of TemporalId of a coded picture or an access unit is the value of the TemporalId of the VCL NAL units of the coded picture or the access unit. When vps_base_layer_external_flag is equal to 1 the value of TemporalId of a coded picture with nuh_layer_id>0 or an access unit is the value of the TemporalId of the VCL NAL units of the coded picture with nuh_layer_id>0. The value of TemporalId of a sub-layer representation is the greatest value of TemporalId of all VCL NAL units in the sub-layer representation. The decoding process may implement the following, If BlIrapPicFlag is equal to 1 the TemporalId of the decoded picture with nuh_layer_id equal to 0 is set equal to 0. Otherwise (if BlIrapPicFlag is equal to 0) if the access unit has at least one picture with nuh_layer_id greater than 0, TemporalId of the decoded picture with nuh_layer_id equal to 0 is set equal to the TemporalId of any picture with nuh_layer_id greater than 0 in the access unit.

The semantics for the TemporalId for the NAL unit header semantics may be as follows.

nuh_temporal_id_plus1 minus 1 specifies a temporal identifier for the NAL unit. The value of nuh_temporal_id_plus1 shall not be equal to 0. The variable TemporalId is specified as follows:

TemporalId=nuh_temporal_id_plus1−1

If nal_unit_type is in the range of BLA_W_LP to RSV_I-RAP_VCL23, inclusive, i.e. the coded slice segment belongs to an IRAP picture, TemporalId shall be equal to 0. Otherwise, when nal_unit_type is equal to TSA_R, TSA_N, STSA_R, or STSA_N, TemporalId shall not be equal to 0.

In one variation, the value of TemporalId shall be the same for all VCL NAL units of an access unit. When vps_base_layer_external_flag is equal to 1 the value of TemporalId of a picture with nuh_layer_id equal to 0 is inferred as described in section F 8.1—General decoding process. Otherwise the value of TemporalId of a coded picture or an access unit is the value of the TemporalId of the VCL NAL units of the coded picture or the access unit. The value of TemporalId of a sub-layer representation is the greatest value of TemporalId of all VCL NAL units in the sub-layer representation.

In another variation, the value of TemporalId shall be the same for all VCL NAL units of an access unit when vps_base_layer_external_flag is equal to 0. The value of TemporalId shall be the same for all VCL NAL units with nuh_layer_id>0 of an access unit when vps_base_layer_external_flag is equal to 1. When vps_base_layer_external_flag is equal to 1 the value of TemporalId of a picture with nuh_layer_id equal to 0 is inferred as described in section F 8.1—General decoding process. When vps_base_layer_external_flag is equal to 0 the value of TemporalId of a coded picture or an access unit is the value of the TemporalId of the VCL NAL units of the coded picture or the access unit. When vps_base_layer_external_flag is equal to 1 the value of TemporalId of a coded picture with nuh_layer_id>0 or an access unit is the value of the TemporalId of the VCL NAL units of the coded picture with nuh_layer_id>0. The value of TemporalId of a sub-layer representation is the greatest value of TemporalId of all VCL NAL units in the sub-layer representation.

The value of TemporalId for non-VCL NAL units is constrained as follows:

If nal_unit_type is equal to VPS_NUT or SPS_NUT, TemporalId shall be equal to 0 and the TemporalId of the access unit containing the NAL unit shall be equal to 0.

Otherwise if nal_unit_type is equal. to EOS_NUT or EOB_NUT, TemporalId shall be equal to 0.

Otherwise, if nal_unit_type is equal to AUD_NUT or FD_NUT, TemporalId shall be equal to the TemporalId of the access unit containing the NAL unit.

Otherwise, TemporalId shall be greater than or equal to the TemporalId of the access unit containing the NAL unit.

It is noted that when the NAL unit is a non-VCL NAL unit, the value of TemporalId is equal to the minimum value of the TemporalId values of all access units to which the non-VCL NAL unit applies. When nal_unit_type is equal to PPS_NUT, TemporalId may be greater than or equal to the TemporalId of the containing access unit, as all PPSs may be included in the beginning of a bitstream, wherein the first coded picture has TemporalId equal to 0. When nal_unit_type is equal to PREFIX_SEI_NUT or SUFFIX_SEI_NUT, TemporalId may be greater than or equal to the TemporalId of the containing access unit, as an SEI NAL unit may contain information, e.g. in a buffering period SEI message or a picture timing SEI message, that applies to a bitstream subset that includes access units for which the TemporalId values are greater than the TemporalId of the access unit containing the SEI NAL unit.

The general decoding process (Section F.8.1) may be as follows, which includes accommodations for the TemporalId and the externally referenced base layer:

When vps_base_layer_external_flag is equal to 1, the following applies:

There is no coded picture with nuh_layer_id equal to 0 in the bitstream.

The size of the sub-DPB for the layer with nuh_layer_id equal to 0 is set equal to 1.

The values of pic_width_in_luma_samples, pic_height_in_luma_samples, chroma_format_idc, separate_colour_plane_flag, bit_depth_luma_minus8, and bit_depth_chroma_minus8 for decoded pictures with nuh_layer_id equal to 0 are set equal to the values of pic_width_vps_in_luma_samples, pic_height_vps_in_luma_samples, chroma_format_vps_idc, separate_colour_plane_vps_flag, bit_depth_vps_luma_minus8, and bit_depth_vps_chroma_minus8, respectively, of the vps_rep_format_idx[0]-th rep_format( ) syntax structure in the active VPS.

In addition to a list of decoded pictures, this process also outputs a flag BaseLayerOutputFlag, and, when BaseLayerOutputFlag is equal to 0 and AltOptLayerFlag[TargetOptLayerSetIdx] is equal to 1, a flag BaseLayerPicOutputFlag for each access unit. The BaseLayerOutputFlag and, when present, BaseLayerPicOutputFlag for each access unit, are to be sent by an external means to the base layer decoder for controlling the output of base layer decoded pictures. The following applies:

BaseLayerOutputFlag is derived as follows: BaseLayerOutputFlag=(TargetOptLayerIdList[0]==0). BaseLayerOutputFlag equal to 1 specifies that the base layer is a target output layer. BaseLayerOutputFlag equal to 0 specifies that the base layer is a not target output layer.

When BaseLayerOutputFlag is equal to 0 and AltOptLayerFlag[TargetOptLayerSetIdx] is equal to 1, for each access unit, BaseLayerPicOutputFlag is derived as follows: if(the base layer is a direct or indirect reference layer of the target output layer, the access unit does not contain a picture at the target output layer and does not contain a picture at any other direct or indirect reference layer of the target output layer)

BaseLayerPicOutputFlag=1 else

BaseLayerPicOutputFlag=0

BaseLayerPicOutputFlag equal to 1 for an access unit specifies that the base layer picture of the access unit is output. BaseLayerPicOutputFlag equal to 0 for an access unit specifies that the base layer picture of the access unit is not output.

For each access unit, a decoded picture with nuh_layer_id equal to 0 may be provided by external means. When not provided, no picture with nuh_layer_id equal to 0 is used for inter-layer prediction for the current access unit. When provided, the following applies:

The following information of the picture with nuh_layer_id equal to 0 for the access unit is provided by external means:

The decoded sample values (1 sample array SL if chroma_format_idc is equal to 0 or 3 sample arrays SL, SCb, and SCr otherwise)

The value of the variable BlIrapPicFlag, and when BlIrapPicFlag is equal to 1, the value of nal_unit_type of the decoded picture BlIrapPicFlag equal to 1 specifies that the decoded picture is an IRAP picture. BlIrapPicFlag equal to 0 specifies that the decoded picture is a non-IRAP picture.

The provided value of nal_unit_type of the decoded picture shall be equal to IDR_W_RADL, CRA_NUT, or BLA_W_LP. nal_unit_type equal to IDR_W_RADL specifies that the decoded picture is an IDR picture. nal_unit_type equal to CRA_NUT specifies that the decoded picture is a CRA picture. nal_unit_type equal to BLA_W_LP specifies that the decoded picture is a BLA picture.

The following applies for the decoded picture with nuh_layer_id equal to 0 for the access unit:

The decoded picture with nuh_layer_id equal to 0 is stored in the sub-DPB for the layer with nuh_layer_id equal to 0 and is marked as "used for long-term reference".

If the access unit has at least one picture with nuh_layer_id greater than 0, the PicOrderCntVal of the decoded picture with nuh_layer_id equal to 0 is set equal to the PicOrderCntVal of any picture with nuh_layer_id greater than 0 in the access unit. Otherwise, the decoded picture with nuh_layer_id equal to 0 is discarded and the sub-DPB for the layer with nuh_layer_id equal to 0 is set to be empty.

In one embodiment, if the access unit has at least one picture with nuh_layer_id greater than 0, TemporalId of the decoded picture with nuh_layer_id equal to 0 is set equal to the TemporalId of any picture with nuh_layer_id greater than 0 in the access unit.

In another embodiment, if BlIrapPicFlag is equal to 1 the TemporalId of the decoded picture with nuh_layer_id equal to 0 is set equal to 0. Otherwise (if BlIrapPicFlag is equal to 0) if the access unit has at least one picture with nuh_layer_id greater than 0, TemporalId of the decoded picture with nuh_layer_id equal to 0 is set equal to the TemporalId of any picture with nuh_layer_id greater than 0 in the access unit.

When the access unit has at least one picture with nuh_layer_id greater than 0, after all pictures in the access unit are decoded, the sub-DPB for the layer with nuh_layer_id equal to 0 is set to be empty.

Thus in the above decoding process in one of the embodiments the TemporalId of all coded pictures belonging to one access unit may not be same. Thus the TemporalId of all VCL NAL units of coded pictures belonging to one access unit may not be same. In particular in case the base layer is externally specified the TemporalId of all coded pictures belonging to one access unit may not be same. Thus in case the base layer is externally specified the TemporalId of all VCL NAL units of coded pictures belonging to one access unit may not be same. Thus the constraint that all the VCL NAL units or all coded pictures belonging to the same access unit must have same TemporalId value is relaxed.

Another approach to handle the temporal identifier (TemporalId) for the externally specified base layer pictures is now defined. Instead of defining a derivation or inference of TemporalId value for externally specified base layer pictures, modifications are made in semantics of various syntax elements. Also additional bitstream conformance constraints are defined when the base layer is externally specified.

An exemplary vps_extension syntax is shown below.

|  | Descriptor |
|---|---|
| vps_extension( ) { |  |
|   avc_base_layer_flag | u(1) |
|   splitting_flag | u(1) |
|   for( i = 0, NumScalabilityTypes = 0; i < 16; i++ ) { |  |
|     scalability_mask_flag[ i ] | u(1) |
|     NumScalabilityTypes += scalability_mask_flag[ i ] |  |
|   } |  |
|   for( j = 0; j < ( NumScalabilityTypes − splitting_flag ); j++ ) |  |
|     dimension_id_len_minus1[ j ] | u(3) |
|   vps_nuh_layer_id_present_flag | u(1) |
|   for( i = 1; i <= MaxLayersMinus1;i++ ){ |  |
|     if( vps_nuh_layer_id_present_flag) |  |
|       layer_id_in_nuh[ i ] | u(6) |
|     if( !splitting_flag ) |  |
|       for( j = 0; j < NumScalabilityTypes; j++ ) |  |
|         dimension_id[ i ][ j ] | u(v) |
|   } |  |
|   view_id_len | u(4) |
|   if( view_id_len > 0) |  |
|     for( i = 0; i < NumViews; i++ ) |  |
|       view_id_val[ i ] | u(v) |
|   for( i = 1; i <= MaxLayersMinus1; i++ ) |  |
|     for( j = 0; j < i; j++ ) |  |
|       direct_dependency_flag[ i ][ j ] | u(1) |

| | Descriptor |
|---|---|
| vps_sub_layers_max_minus1_present_flag | u(1) |
|   if( vps_sub_layers_max_minus1_present_flag ) | |
|     for( i = 0; i <= MaxLayersMinus1; [ i ] | |
|       sub_layers_vps_max_minus1 [ i ] | u(3) |
| max_tid_ref_present_flag | u(1) |
| if( max_tid_ref_present_flag ) | |
|   for( i = 0; i < MaxLayersMinus1; i++ ) | |
|     for( j = i + 1; j <= MaxLayersMinus1; j++) | |
|       if( direct_dependency_flag[ j ][ i ] ) | |
|         max_tid_il_ref_pics_plus1[ i ][ j ] | u(3) |
| all_ref_layers_active_flag | u(1) |
| vps_num_profile_tier_level_minus1 | ue(v) |
| for( ptlIdx = 1; ptlIdx <= vps_num_profile_tier_level_minus1; ptlIdx ++ ) { | |
|   vps_profile_present_flag[ ptlIdx ] | u(1) |
|   profile_tier_level( vps_profile_present_flag[ ptlIdx ], vps_max_sub_layers_minus1 ) | |
| } | |
| num_add_output_layer_sets | ue(v) |
| NumOutputLayerSets = num_add_output_layer_sets + vps_num_layer_sets_minus1 + 1 | |
| if( NumOutputLayerSets > 1 ) | |
|   default_target_output_layer_idc | u(2) |
| for( i = 1; i < NumOutputLayerSets; i++ ) { | |
|   if( i > vps_num_layer_sets_minus1 ) | |
|     output_layer_set_idx_minus1[ i ] | u(v) |
|   if( 1 > vps_num layer_sets_minus1 \|\| default_target_output_layer_idc == 2 ) | |
|     for( j = 0; j < NumLayersInIdList[ LayerSetIdxForOutputLayerSet[ i ] ]; j++) | |
|       output_layer_flag[ i ][ j ] | u(1) |
|   profile_level_tier_idx[ i ] | u(v) |
|   if( NumOutputLayersInOutputLayerSet[ i ] == 1 | |
|     &&NumDirectRefLayers[ OlsHighestOutputLayerId [ i ] ] > 0) | |
|     alt_output_layer_flag[ i ] | u(1) |
| } | |
| rep_format_idx_present_flag | u(1) |
| if( rep_format_idx_present_flag ) | |
|   vps_num_rep_formats_minus1 | ue(v) |
| for( i = 0; i <= vps_num_rep_formats_minus1; i++ ) | |
|   rep_format( ) | |
| if( rep_format_idx_present_flag ) | |
|   for( i = 1; i <= MaxLayersMinus1; i++ ) | |
|     if( vps_num_rep_formats_minus1 > 0) | |
|       vps_rep_format_idx[ i ] | u(v) |
| max_one_active_ref_layer_flag | u(1) |
| vps_poc_lsb_aligned_flag | u(1) |
| for( i = 1; i <= MaxLayersMinus1; i++ ) | |
|   if( NumDirectRefLayers[ layer_id_in_nuh[ i ] ] == 0) | |
|     poc_lsb_not_present_flag[ i ] | u(1) |
| cross_layer_phase_alignment_flag | u(1) |
| dpb_size( ) | |
| direct_dep_type_len_minus2 | ue(v) |
| default_direct_dependency_flag | u(1) |
| if( default_direct_dependency_flag) | |
|   default_direct_dependency_type | u(v) |
| else { | |
|   for( i = 1; i <= MaxLayersMinus1; i++ ) | |
|     for( j = 0; j < i; j++ ) | |
|       if( direct_dependency_flag[ i ][ j ] ) | |
|         direct_dependency_type[ i ][ j ] | u(v) |
| } | |
| vps_non_vui_extension_length | ue(v) |
| for(i = 1; i <= vps_non_vui_extension_length; i++ ) | |
|   vps_non_vui_extension_data_byte | u(8) |
| vps_vui_present_flag | |
| if( vps_vui_present_flag ) { | |
|   while( !byte_aligned( ) ) | |
|     vps_vui_alignment_bit_equal_to_one | u(1) |
|   vps_vui() | |
|   } | |
| } | |

Following modifications are defined to handle the temporal identifier for externally specified base layer.

Semantics of max_tid_il_ref_pics_plus1[i][j] are modified when layer_id_in_nuh[i] is equal to 0 and vps_external_base_layer_flag is equal to 1.

Semantics of all_ref_layers_active_flag is modified.

Semantics of num_inter_layer_ref_pics_minus1 is modified with respect to the derivation of refLayerPicIdc when a direct reference layer is externally specified base layer.

A condition is added regarding bitstream conformance for each value of i in the range of 0 to NumActiveRefLayerPics−1, inclusive.

A modification is applied to marking process for sub-layer non-reference pictures not needed for inter-layer prediction.

In JCTVC-P1008 and JCT3V-G1004, both of which are incorporated by reference herein in their entirety, max_tid_il_ref_pics_plus1[i][j] values are signaled in the video parameter set (VPS) extension. max_tid_il_ref_pics_plus1[i][j] equal to 0 specifies that within the CVS non-TRAP pictures with nuh_layer_id equal to layer_id_in_nuh[i] are not used as reference for inter-layer prediction for pictures with nuh_layer_id equal to layer_id_in_nuh[j]. max_tid_il_ref_pics_plus1[i][j] greater than 0 specifies that within the CVS pictures with nuh_layer_id equal to layer_id_in_nuh[i] and TemporalId greater than max_tid_il_ref_pics_plus1[i][j]−1 are not used as reference for inter-layer prediction for pictures with nuh_layer_id equal to layer_id_in_nuh[j].

HEVC, SHVC, and MV-HEVC incorporate a multi-loop decoding technique. For example, a bitstream may include layers 0, 1, and 2. If it is desirable to decode layer 2, then the decoder needs to decode layer 1 and layer 0 if the layer 0 and layer 1 are used as a reference layers for layer 2. This is a computationally burdensome task to decode layers 0 and 1 if only layer 2 is desirable to be decoded and displayed or played back. In some case the layer 2 may be termed a target layer. One technique to reduce the complexity of a multi-loop decoder, is to signal value for max_tid_il_ref_pics_plus1[i][j] which describes inter-layer prediction restriction. However the max_tid_il_ref_pics_plus1[i][j] semantics need to be modified when an externally specified base layer is involved.

Semantics of max_tid_il_ref_pics_plus1[i][j] are modified when layer_id_in_nuh[i] is equal to 0 and vps_external_base_layer_flag is equal to 1.

When base layer is externally specified (i.e. vps_base_layer_external_flag is equal to 1) the semantics of max_tid_il_ref_pics_plus 1[i][j] are modified to handle the aspect that TemporalId value of the externally specified base layer pictures (with layer_id_in_nuh[i] is equal to 0) is unknown. Thus in this case the use of these externally specified base layer pictures as inter-layer reference pictures for another layer (e.g. for layer with layer_id_in_nuh[j]) is based on the values signaled in the slice segment header of that layer.

'max_tid_ref_present_flag' equal to 1 may specify that the syntax element max_tid_il_ref_pics_plus1[i][j] is present. max_tid_ref_present_flag equal to 0 may specify that the syntax element max_tid_il_ref_pics_plus1[i][j] is not present.

'max_tid_il_ref_pics_plus 1' [i][j] equal to 0 may specify that within the CVS non-IRAP pictures with nuh_layer_id equal to layer_id_in_nuh[i] are not used as reference for inter-layer prediction for pictures with nuh_layer_id equal to layer_id_in_nuh[j]. max_tid_il_ref_pics_plus 1[i][j] greater than 0 specifies that:

When layer_id_in_nuh[i] is equal to 0 and vps_external_base_layer_flag is equal to 1, within the CVS pictures with nuh_layer_id equal to layer_id_in_nuh[i] may or may not be used as reference pictures for inter-layer prediction as specified by the values of inter_layer_pred_enabled_flag, num_inter_layer_ref_pics_minus1_and inter_layer_pred_idc[k] values in the slice segment header of pictures with nuh_layer_id equal to layer_id_in_nuh[j].

Otherwise within the CVS pictures with nuh_layer_id equal to layer_id_in_nuh[i] and TemporalId greater than max_tid_il_ref_pics_plus1[i][j]−1 are not used as reference for inter-layer prediction for pictures with nuh_layer_id equal to layer_id_in_nuh[j].

When not present, max_tid_il_ref_pics_plus1[i][j] may be inferred to be equal to 7.

In another embodiment 'max_tid_il_ref_pics_plus1' [i][j] equal to 0 may specify that:

when layer_id_in_nuh[i] is equal to 0 and vps_external_base_layer_flag is equal to 1, non-IRAP pictures with nuh_layer_id equal to layer_id_in_nuh[i] may or may not be used as reference for inter-layer prediction for pictures with nuh_layer_id equal to layer_id_in_nuh[j].

Otherwise within the CVS non-IRAP pictures with nuh_layer_id equal to layer_id_in_nuh[i] are not used as reference for inter-layer prediction for pictures with nuh_layer_id equal to layer_id_in_nuh[j].

max_tid_il_ref_pics_plus1[i][j] greater than 0 specifies that:

When layer_id_in_nuh[i] is equal to 0 and vps_external_base_layer_flag is equal to 1, within the CVS pictures with nuh_layer_id equal to layer_id_in_nuh[i] may or may not be used as reference pictures for inter-layer prediction as specified by the values of inter_layer_pred_enabled_flag, num_inter_layer_ref_pics_minus1_and inter_layer_pred_idc[k] values in the slice segment header of pictures with nuh_layer_id equal to layer_id_in_nuh[j].

Otherwise within the CVS pictures with nuh_layer_id equal to layer_id_in_nuh[i] and TemporalId greater than max_tid_il_ref_pics_plus1[i][j]−1 are not used as reference for inter-layer prediction for pictures with nuh_layer_id equal to layer_id_in_nuh[j].

When not present, max_tid_il_ref_pics_plus1[i][j] may be inferred to be equal to 7.

Semantics of all_ref_layers_active_flag is modified.

The modification includes the use of external base layer as special case. Thus the value of vps_base_layer_external_flag is utilized to determine if all the direct reference layers of a layer are used to obtain reference pictures for inter-layer prediction for a current picture.

all_ref_layers_active_flag equal to 1 may specify that for each picture referring to the VPS, the reference layer pictures that belong to all direct reference layers of the layer containing the picture and that might be used for inter-layer prediction as specified by the values of vps_base_layer_external_flag, sub_layers_vps_max_minus1[i] and max_tid_il_ref_pics_plus1[i][j] are present in the same access unit as the picture and are included in the inter-layer reference picture set of the picture. all_ref_layers_active_flag equal to 0 specifies that the above restriction may or may not apply.

Information regarding reference pictures used for inter-layer prediction for a current picture maybe signaled in slice segment header of the current picture. An exemplary syntax for this signaling in slice segment header is shown in table below.

```
slice_segment_header( ) {
    ...
    if( sps_temporal_mvp_enabled_flag )
        slice_temporal_mvp_enabled_flag                                           u(1)
    }
    if( nuh_layer_id > 0 && !all_ref_layers_active_flag &&
            NumDirectRefLayers[ nuh_layer_id ] > 0) {
        inter_layer_pred_enabled_flag                                             u(1)
        if( inter_layer_pred_enabled_flag && NumDirectRefLayers[ nuh_layer_id ] >
1) {
            if( !max_one_active_ref_layer_flag )
                num_inter_layer_ref_pics_minus1                                   u(v)
            if( NumActiveRefLayerPics != NumDirectRefLayers[ nuh_layer_id ] )
                for( i = 0; i < NumActiveRefLayerPics; i++ )
                    inter_layer_pred_layer_idc[ i ]                               u(v)
        }
    }
    ...
}
```

Semantics of num_inter_layer_ref_pics_minus1 is modified with respect to the derivation of refLayerPicIdc when a direct reference layer is externally specified base layer.

Since a TemporalId is not associated with externally specified base layer the checks related to comparing the TemporalId value of externally specified base layer picture with sub_layers_vps_max_minus1[refLayerIdx] and max_tid_il_ref_pics_plus1[refLayerIdx][LayerIdxInVps[nuh_layer_id]] is omitted and the picture is added to refLayerPicIdc, numActiveRefLayerPics derivation and subsequently NumActiveRefLayerPics derivation when all_ref_layers_active_flag is 1.

'inter_layer_pred_enabled_flag' equal to 1 may specify that inter-layer prediction may be used in decoding of the current picture. inter_layer_pred_enabled_flag equal to 0 may specify that inter-layer prediction is not used in decoding of the current picture.

'num_inter_layer_ref_pics_minus 1' plus 1 may specify the number of pictures that may be used in decoding of the current picture for inter-layer prediction. The length of the num_inter_layer_ref_pics_minus1 syntax element is Ceil (Log 2(NumDirectRefLayers[nuh_layer_id])) bits. The value of num_inter_layer_ref_pics_minus1 may be in the range of 0 to NumDirectRefLayers[nuh_layer_id]−1, inclusive.

The variables numRefLayerPics and refLayerPicFlag[i] and refLayerPicIdc[j] may be derived as follows:

```
for( i = 0, j = 0; i < NumDirectRefLayers[ nuh_layer_id ]; i++ ) {
    refLayerIdx = LayerIdxInVps[ RefLayerId[ nuh_layer_id ][ i ] ]
    if( refLayerIdx == 0 && vps_base_layer_external_flag )
        refLayerPicIdc[ j++ ] = i
    else if( sub_layers_vps_max_minus1[ refLayerIdx ] >=
TemporalId &&
max_tid_il_ref_pics_plus1[ refLayerIdx ][ LayerIdxInVps[
nuh_layer_id ] ] >
TemporalId )
        refLayerPicIdc[ j++ ] = i
}
numRefLayerPics = j
The variable NumActiveRefLayerPics may be derived as follows:
if( nuh_layer_id = = 0 | | NumDirectRefLayers[ nuh_layer_id ] = =
0 )
    NumActiveRefLayerPics = 0
else if( all_ref_layers_active_flag )
    NumActiveRefLayerPics = numRefLayerPics
else if( !inter_layer_pred_enabled_flag )
    NumActiveRefLayerPics = 0
else if( max_one_active_ref_layer_flag | |
NumDirectRefLayers[ nuh_layer_id ] = = 1 )
    NumActiveRefLayerPics = 1
```

-continued

```
else
    NumActiveRefLayerPics = num_inter_layer_ref_pics_minus1 + 1
All slices of a coded picture shall have the same value of
NumActiveRefLayerPics.
```

A condition is added regarding bitstream conformance for each value of i in the range of 0 to NumActiveRefLayerPics−1, inclusive.

The condition regarding relation between TemporalId and max_tid_il_ref_pics_plus1 is relaxed for externally specified base layer which does not have a TemporalId value associated with it.

'inter_layer_pred_layer_idc' [i] may specify the variable, RefPicLayerId[i], representing the nuh_layer_id of the i-th picture that may be used by the current picture for inter-layer prediction. The length of the syntax element inter_layer_pred_layer_idc[i] is Ceil(Log 2(NumDirectRefLayers [nuh_layer_id])) bits. The value of inter_layer_pred_layer_idc[i] shall be in the range of 0 to NumDirectRefLayers [nuh_layer_id]−1, inclusive. When not present, the value of inter_layer_pred_layer_idc[i] is inferred to be equal to refLayerPicIdc[i].

When i is greater than 0, inter_layer_pred_layer_idc[i] shall be greater than inter_layer_pred_layer_idc[i−1].

The variables RefPicLayerId[i] for all values of i in the range of 0 to NumActiveRefLayerPics−1, inclusive, may be derived as follows:

for(i=0,j=0;i<NumActiveRefLayerPics;i++)RefPicLayerId[i]=RefLayerId[nuh_layer_id][inter_layer_pred_layer_idc[i]]

It is a requirement of bitstream conformance that for each value of i in the range of 0 to NumActiveRefLayerPics−1, inclusive, either of the following conditions shall be true:

vps_base_layer_external_flag is equal to 1 and RefPicLayerId[i] is equal to 0.

The value of max_tid_il_ref_pics_plus1[LayerIdxInVps [RefPicLayerId[i]]][LayerIdxInVps[n uh_layer_id]] is greater than TemporalId.

The values of max_tid_il_ref_pics_plus1[LayerIdxInVps [RefPicLayerId[i]]][LayerIdxInVps[n uh_layer_id]] and TemporalId are both equal to 0 and the picture in the current access unit with nuh_layer_id equal to RefPicLayerId[i] is an IRAP picture.

Thus it is allowed to include in of the NumActiveRefLayerPics and RefPicLayerid[i] which indicate the pictures that may be used as reference pictures for inter-layer predicition for the current picture a externally specified base layer picture if the externally specified base layer picture is a direct reference layer for the layer to which the current picture belongs.

A modification is applied to marking process for sub-layer non-reference pictures not needed for inter-layer prediction.

When performing the marking process for sub-layer non-reference pictures not needed for inter-layer prediction the pictures of externally specified base layer are omitted.

The Decoding process for ending the decoding of a coded picture with nuh_layer_id greater than 0 may be as follows:
PicOutputFlag is set as follows:
  If LayerInitializedFlag[nuh_layer_id] is equal to 0, PicOutputFlag is set equal to 0.
  Otherwise, if the current picture is a RASL picture and NoRaslOutputFlag of the associated IRAP picture is equal to 1, PicOutputFlag is set equal to 0.
  Otherwise, PicOutputFlag is set equal to pic_output_flag.
The following applies:
  If discardable_flag is equal to 1, the decoded picture is marked as "unused for reference".
  Otherwise, the decoded picture is marked as "used for short-term reference".
When TemporalId is equal to HighestTid, the marking process for sub-layer non-reference pictures not needed for inter-layer prediction specified in subclause "Marking process for sub-layer non-reference pictures not needed for inter-layer prediction" below may be invoked with latestDecLayerId equal to nuh_layer_id as input.
When FirstPicInLayerDecodedFlag[nuh_layer_id] is equal to 0, FirstPicInLayerDecodedFlag[nuh_layer_id] is set equal to 1.
Marking process for sub-layer non-reference pictures not needed for inter-layer prediction may be as follows:
Input to this process is:
  a nuh_layer_id value latestDecLayerId
Output of this process is:
  potentially updated marking as "unused for reference" for some decoded pictures
This process marks pictures that are not needed for inter or inter-layer prediction as "unused for reference". When TemporalId is less than HighestTid, the current picture may be used for reference in inter prediction and this process is not invoked.
The variables numTargetDecLayers, and latestDecIdx are derived as follows:
  numTargetDecLayers is set equal to the number of entries in TargetDecLayerIdList.
  latestDecIdx is set equal to the value of i for which TargetDecLayerIdList[i] is equal to latestDecLayerId.
For i in the range of 0 to latestDecIdx, inclusive, the following applies for marking of pictures as "unused for reference":
  Let currPic be the picture in the current access unit with nuh_layer_id equal to TargetDecLayerIdList[i].
  When currPic is marked as "used for reference", is a sub-layer non-reference picture and vps_base_layer_external_flag is equal to 0 or vps_base_layer_external_flag is equal to 1 and TargetDecLayerIdList[i] is not equal to 0, the following applies:
    The variable currTid is set equal to the value of TemporalId of currPic.
    The variable remainingInterLayerReferencesFlag is derived as specified in the following:

```
remainingInterLayerReferencesFlag = 0
iLidx = LayerIdxInVps[ TargetDecLayerIdList[ i ] ]
    for( j = latestDecIdx + 1 ; j < numTargetDecLayers; j++ ) {
        jLidx = LayerIdxInVps[ TargetDecLayerIdList[ j ] ]
        if( currTid <= ( max_tid_il_ref_pics_plus1[ iLidx ][ jLidx ] − 1 ) )
            for( k = 0; k < NumDirectRefLayers[ TargetDecLayerIdList[ j ] ];
k++ )
                if( TargetDecLayerIdList[ i ] = =
RefLayerId[ TargetDecLayerIdList[ j ] ][ k ] )
                    remainingInterLayerReferencesFlag = 1
    }
```

When remainingInterLayerReferenceFlag is equal to 0, currPic is marked as "unused for reference".

In another embodiment following change may be made to the "Marking process for sub-layer non-reference pictures not needed for inter-layer prediction".
Input to this process is:
  a nuh_layer_id value latestDecLayerId
Output of this process is:
  potentially updated marking as "unused for reference" for some decoded pictures
  This process marks pictures that are not needed for inter or inter-layer prediction as "unused for reference". When TemporalId is less than HighestTid, the current picture may be used for reference in inter prediction and this process is not invoked.
The variables numTargetDecLayers, and latestDecIdx are derived as follows:
  numTargetDecLayers is set equal to the number of entries in TargetDecLayerIdList.
  latestDecIdx is set equal to the value of i for which TargetDecLayerIdList[i] is equal to latestDecLayerId.
For i in the range of 0 to latestDecIdx, inclusive, the following applies for marking of pictures as "unused for reference":
  Let currPic be the picture in the current access unit with nuh_layer_id equal to TargetDecLayerIdList[i].
  When currPic is marked as "used for reference", is a sub-layer non-reference picture the following applies:
    The variable currTid is set equal to the value of TemporalId of currPic.
    The variable remainingInterLayerReferencesFlag is derived as specified in the following:

```
remainingInterLayerReferencesFlag = 0
if (vps_base_layer_external_flag == 1 && (TargetDecLayerIdList[ i ] == 0)) {
    remainingInterLayerReferencesFlag = 1
} else {
    iLidx = LayerIdxInVps[ TargetDecLayerIdList[ i ] ]
    for( j = latestDecIdx + 1 ; j < numTargetDecLayers; j++ ) {
        jLidx = LayerIdxInVps[ TargetDecLayerIdList[ j ] ]
        if( currTid <= ( max_tid_il_ref_pics_plus1[ iLidx ][ jLidx ] − 1 ) )
            for( k = 0; k < NumDirectRefLayers[ TargetDecLayerIdList[ j ] ];
k++ )
                if( TargetDecLayerIdList[ i ] = =
RefLayerId[ TargetDecLayerIdList[ j ] ][ k ] )
                    remainingInterLayerReferencesFlag = 1
    }
}
```

When remainingInterLayerReferenceFlag is equal to 0, currPic is marked as "unused for reference".

In another embodiment following change may be made to the "Marking process for sub-layer non-reference pictures not needed for inter-layer prediction".
Input to this process is:
  a nuh_layer_id value latestDecLayerId
Output of this process is:
  potentially updated marking as "unused for reference" for some decoded pictures
  This process marks pictures that are not needed for inter or inter-layer prediction as "unused for reference". When TemporalId is less than: HighestTid, the current picture may be used for reference in inter prediction and this process is not invoked.
The variables numTargetDecLayers, and latestDecIdx are derived as follows:
  numTargetDecLayers is set equal to the number of entries in TargetDecLayerIdList.
  latestDecIdx is set equal to the value of i for which TargetDecLayerIdList[i] is equal to latestDecLayerId.
For i in the range of vps_base_layer_external_flag? 1:0 to latestDecIdx, inclusive, the following applies for marking of pictures as "unused for reference":
  Let currPic be the picture in the current access unit with nuh_layer_id equal to TargetDecLayerIdList[i].
  When currPic is marked as "used for reference", is a sub-layer non-reference picture the following applies:
    The variable currTid is set equal to the value of TemporalId of currPic.
    The variable remainingInterLayerReferencesFlag is derived as specified in the following:

```
remainingInterLayerReferencesFlag = 0
iLidx = LayerIdxInVps[ TargetDecLayerIdList[ i ] ]
  for( j = latestDecIdx + 1 ; j < numTargetDecLayers; j++ ) {
    jLidx = LayerIdxInVps[ TargetDecLayerIdList[ j ] ]
    if( currTid <= ( max_tid_il_ref_pics_plus1[ iLidx ][
    jLidx ] − 1 ) )
      for( k = 0; k < NumDirectRefLayers[
      TargetDecLayerIdList[ j ] ];
  k++ )
        if( TargetDecLayerIdList[ i ] = =
RefLayerId[ TargetDecLayerIdList[ j ] ][ k ] )
          remainingInterLayerReferencesFlag = 1
  }
```

When remainingInterLayerReferenceFlag is equal to 0, currPic is marked as "unused for reference".
In another embodiment following change may be made to the "Marking process for sub-layer non-reference pictures not needed for inter-layer prediction".
Input to this process is:
  a nuh_layer_id value latestDecLayerId
Output of this process is:
  potentially updated marking as "unused for reference" for some decoded pictures
  This process marks pictures that are not needed for inter or inter-layer prediction as "unused for reference". When TemporalId is less than HighestTid, the current picture may be used for reference in inter prediction and this process is not invoked.
The variables numTargetDecLayers, and latestDecIdx are derived as follows:
  numTargetDecLayers is set equal to the number of entries in TargetDecLayerIdList.
  latestDecIdx is set equal to the value of i for which TargetDecLayerIdList[i] is equal to latestDecLayerId.
For i in the range of 0 to latestDecIdx, inclusive, the following applies for marking of pictures as "unused for reference":
  Let currPic be the picture in the current access unit with nuh_layer_id equal to TargetDecLayerIdList[i].
  When currPic is marked as "used for reference", is a sub-layer non-reference picture the following applies:
    The variable currTid is set equal to the value of TemporalId of currPic.
    The variable remainingInterLayerReferencesFlag is derived as specified in the following:

```
remainingInterLayerReferencesFlag = 0
iLidx = LayerIdxInVps[ TargetDecLayerIdList[ i ] ]
  for( j = latestDecIdx + 1 ; j < numTargetDecLayers; j++ ) {
    jLidx = LayerIdxInVps[ TargetDecLayerIdList[ j ] ]
    if( (currTid <= ( max_tid_il_ref_pics_plus1[ iLidx ][
    jLidx ] − 1 ) ) ||
(vps_base_layer_external_flag==1 && (TargetDecLayerIdList[ i ] ==
0) ) )
      for( k = 0; k < NumDirectRefLayers[ TargetDecLayerIdList[
      j ] ];
  k++ )
        if( TargetDecLayerIdList[ i ] = =
RefLayerId[ TargetDecLayerIdList[ j ] ][ k ] )
          remainingInterLayerReferencesFlag = 1
  }
```

When remainingInterLayerReferenceFlag is equal to 0, currPic is marked as "unused for reference".
Additionally following change modifications are applied to the sub-bitstream property SEI message with respect to the sub-bitstream extraction process when base layer is externally specified Sub-bitstream property SEI message semantics.
An exemplary sub-bitstream property SEI message syntax is shown below.

| | Descriptor |
|---|---|
| sub_bitstream_property( payloadSize ) { | |
|   active_vps_id | u(4) |
|   num_additional_sub_streams_minus1 | ue(v) |
|   for( i = 0; i <= num_additional_sub_streams_minus1; i++) { | |
|     sub_bitstream_mode[ i ] | u(2) |
|     output_layer_set_idx_to_vps[ i ] | ue(v) |
|     highest_sublayer_id[ i ] | u(3) |
|     avg_bit_rate[ i ] | u(16) |
|     max_bit_rate[ i ] | u(16) |
|   } | |
| } | |

The proposed modifications exclude removal of NAL units corresponding to an externally specified base layer during sub0 bitstream extraction process.
The sub-bitstream property SEI message, when present, provides the bit rate information for a sub-bitstream created by discarding those pictures in the layers that do not belong to the output layers of the output layer sets specified by the active VPS and that do not affect the decoding of the output layers.
When present, the sub-bitstream property SEI message shall be associated with an initial IRAP access unit, and the information provided by the SEI messages applies to the bitstream corresponding to the CVS containing the associated initial IRAP access unit.

'active_vps_id' may identify the active VPS. The value of active_vps_id shall be equal to the value of vps_video_parameter_set_id of the active VPS referred to by the VCL NAL units of the associated access unit.

'num_additional_sub_streams_minus1' plus 1 may specify the number of the sub-bitstreams for which the bit rate information may be provided by this SEI message. The value of num_additional_sub_streams_minus1 shall be in the range of 0 to $2^{10}-1$, inclusive.

'sub_bitstream_mode[i]' may specify how the i-th sub-bitstream is generated. The value of sub_bitstream_mode[i] shall be equal to 0 or 1, inclusive. The values 2 and 3 are reserved for future use by ITU-T and ISO/IEC. When sub_bitstream_mode[i] is the greater than 1, decoders shall ignore the syntax elements output_layer_set_idx_to_vps[i], highest_sublayer_id[i], avg_bit_rate[i], and max_bit_rate[i].

When sub_bitstream_mode[i] is equal to 0, the i-th sub-bitstream is generated may be specified by the following steps:

The sub-bitstream extraction process as specified in clause 10 is invoked with the bitstream corresponding to the CVS containing the sub-bitstream property SEI message, highest_sublayer_id[i], and LayerSetLayerIdList[LayerSetIdxForOutputLayerSet[output_layer_set_idx_to_vps[i]]] as inputs.

Remove all NAL units for which the nuh_layer_id is not included in TargetOptLayerIdList and either of the following conditions is true:

The value of nal_unit_type is not in the range of BLA_W_LP to RSV_IRAP_VCL23, inclusive, and max_tid_il_ref_pics_plus1[LayerIdxInVps[nuh_layer_id]][LayerIdxInVps[layerId]] is equal to 0 for layerId values included in TargetOptLayerIdList.

vps_base_layer_external_flag is equal to 0 or vps_base_layer_external_flag is equal to 1 and nuh_layer_id is not equal to 0 and TemporalId is greater than the maximum value of max_tid_il_ref_pics_plus1[LayerIdxInVps[nuh_layer_id]][LayerIdxInVps[layerId]]−1 for all layerId values included in TargetOptLayerIdList.

When sub_bitstream_mode[i] is equal to 1, the i-th sub-bitstream is generated as specified by the above steps followed by:

Remove all NAL units with nuh_layer_id not among the values included in TargetOptLayerIdList and with discardable_flag equal to 1.

'output_layer_set_idx_to_vps[i]' may specify the index of the output layer set corresponding to the i-th sub-bitstream.

'highest_sublayer_id' [i] may specify the highest TemporalId of access units in the i-th sub-bitstream when vps_base_layer_external_flag is not equal to 1.

'avg_bit_rate' [i] may indicate the average bit rate of the i-th sub-bitstream, in bits per second. The value is given by BitRateBPS(avg_bit_rate[i]) with the function BitRateBPS( ) being specified as follows:

$$\mathrm{BitRateBPS}(x)=(x\&(2^{14}-1))*10^{(2+(x>>14))}$$

The average bit rate is derived according to the access unit removal time specified in clause F.13 of JCTVC-P1008. In the following, bTotal is the number of bits in all NAL units of the i-th sub-bitstream, $t_1$ is the removal time (in seconds) of the first access unit to which the VPS applies, and $t_2$ is the removal time (in seconds) of the last access unit (in decoding order) to which the VPS applies. With x specifying the value of avg_bit_rate[i], the following applies:

If $t_1$ is not equal to $t_2$, the following condition shall be true:

$$(x\&(2^{14}-1))==\mathrm{Round}(b\mathrm{Total}((t_2-t_1)*10^{(2+(x>>14))}))$$

Otherwise ($t_1$ is equal to $t_2$), the following condition shall be true:

$$(x\&(2^{14}-1))==0$$

max_bit_rate[i] may indicate an upper bound for the bit rate of the i-th sub-bitstream in any one-second time window of access unit removal time as specified in clause F.13 of JCTVC-P1008. The upper bound for the bit rate in bits per second is given by BitRateBPS(max_bit_rate[i]). The bit rate values are derived according to the access unit removal time specified in clause F.13. In the following, $t_1$ is any point in time (in seconds), $t_2$ is set equal to $$t_1+1\div 100,$$

and bTotal is the number of bits in all NAL units of access units with a removal time greater than or equal to $t_1$ and less than $t_2$. With x specifying the value of max_bit_rate[i], the following condition shall be obeyed for all values of $t_1$:

$$(x\&(2^{14}-1))>=b\mathrm{Total}((t_2-t_1)*10^{(2+(x>>14))})$$

Semantic information related to the hypothetical reference decoder may likewise be included in a syntax, such as hrd_layer_set_idx[i]. With both internally and externally referenced base layers, it is desirable to be able to determine whether the data in the syntax structure for the base layer, hrd_layer_set_idx[i]=0, is data related to a particular base layer or is otherwise filler data having no particular relevance that is ignored by the hypothetical reference decoder during the decoding process. Therefore, For the case where base layer is not externally specified (i.e. is internally specified) a range of values for hrd_layer_set_idx[i] is specified such that the index can point to only one of the layers sets in VPS. For the case of externally specified base layer hrd_layer_set_idx is further restricted from taking a value of 0. By restricting the hrd_layer_set_idx[i] index this way, only HRD parameters that point to one of the potentially available layer sets are permitted, and whether the base layer is included depends on whether it is an externally specified base layer.

The hrd_layer_set_idx[i] specifies the index, into the list of layer sets specified by the VPS, of the layer set to which the i th hrd_parameters( ) syntax structure in the VPS applies. In conforming bitstreams, the value of hrd_layer_set_idx[i] shall be in the range of (vps_base_layer_external_flag? 1:0) to vps_num_layer_sets_minus1, inclusive.

Additional constraints may be included to avoid signaling duplicate hrd_parameters( ) for a layer set. One additional constraint is a requirement of bitstream conformance that the value of hrd_layer_set_idx[i] shall not be equal to the value of hrd_layer_set_idx[j] for any value of j not equal to i. Another constraint may be on vps_num_layer_sets_minus1 syntax element. vps_num_layer_sets_minus1 plus 1 specifies the number of layer sets that are specified by the VPS. The value of vps_num_layer_sets_minus1 shall be in the range of 0 to 1023, inclusive. Another constraint may be on vps_num_hrd_parameters syntax element. vps_num_hrd_parameters specifies the number of hrd_parameters( ) syntax structures present in the VPS RBSP. The value of vps_num_hrd_parameters shall be less than or equal to vps_num_layer_sets_minus1+1, inclusive.

The hrd_parameters( ) syntax structure provides HRD parameters used in the HRD operations for a layer set. When the hrd_parameters( ) syntax structure is included in a VPS, the applicable layer set to which the hrd_parameters( ) syntax structure applies is specified by the corresponding hrd_layer_set_idx[i] syntax element in the VPS. When the hrd_parameters( ) syntax structure is included in an SPS, the layer set to which the hrd_parameters( ) syntax structure applies is the layer set for which the associated layer identifier list contains all nuh_layer_id values present in the CVS.

Each HEVC, SHVC, MV-HEVC bitstream includes a profile information regarding what the bitstream conforms to, such as a Main profile that supports 8 bits, a Main10 profile that supports 10 bits, and a Main Still Picture profile. Each of the profiles includes one of a plurality of tiers that define restrictions and/or characteristics of the bitstream, and each tier includes one of a plurality of levels that provide further restrictions and/or characteristics of the bitstream. Thus for HEVC, SHVC, MV-HEVC bitstreams a profile_tier_level( ) information is signaled which describes the information regarding profile, tier, level that the bitstream conforms to. An exemplary signaling scheme may be as shown in the table below.

|  | Descriptor |
|---|---|
| vps_extension( ) { | |
| ... | |
|  | u(1) |
| vps_num_profile_tier_level_minus1 | ue(v) |
| for( ptlIdx = 1; ptlIdx <= vps_num_profile_tier_level_minus 1; ptlIdx ++ ) { | |
| vps_profile_present_flag[ ptlIdx ] | u(1) |
| profile_tier_level( vps_profile_present_flag[ ptlIdx ], vps_max_sub_layers_minus1 ) | |
| } | |
| num_add_output_layer_sets | ue(v) |
| NumOutputLayerSets = num_add_output_layer_sets + vps_num_layer_sets_minus1 + 1 | |
| if( NumOutputLayerSets > 1) | |
| default_target_output_layer_idc | u(2) |
| for( i = 1; i <NumOutputLayerSets; i++ ) { | |
| if( i > vps_num_layer_sets_minus1 ) | |
| output_layer_set_idx_minus1[ i ] | u(v) |
| if( i > vps_num_layer_sets_minus1 | | default_target_output_layer_idc = = 2) | |
| for( j = 0; j < NumLayersInIdList[ LayerSetIdxForOutputLayerSet[ i ] ]; j++) | |
| output_layer_flag[ i ][ j ] | u(1) |
| profile_level_tier_idx[ i ] | u(v) |
| if( NumOutputLayersInOutputLayerSet[ i ] = = 1 && NumDirectRefLayers[ OlsHighestOutputLayerId[ i ] ] >0 ) | |
| alt_output_layer_flag[ i ] | u(1) |
| } | |
| ... | |
| } | |

The profile_tier_level( ) syntax structure provides profile, tier and level information used for a layer set. When the profile_tier_level( ) syntax structure is included in a vps_extension( ) syntax structure, the applicable layer set to which the profile_tier_level( ) syntax structure applies is specified by the corresponding lsIdx variable in the vps_extension( ) syntax structure. When the profile_tier_level( ) syntax structure is included in a VPS, but not in a vps_extension( ) syntax structure, the applicable layer set to which the profile_tier_level( ) syntax structure applies is the layer set specified by the index 0. When the profile_tier_level( ) syntax structure is included in an SPS, the layer set to which the profile_tier_level( ) syntax structure applies is the layer set specified by the index 0.

'vps_num_profile_tier_level minus1' plus 1 specifies the number of profile_tier_level( ) syntax structures in the VPS. The value of vps_num_profile_tier_level minus1 shall be in the range of 0 to 63, inclusive.

The indexing of the profile_tier_level structure should be based upon whether the base layer is externally specified. When base layer is externally specified all bits in the first profile_tier_level( ) syntax structure are required to be equal to 0. Thus for i in the range of 1 to NumOutputLayerSets−1, inclusive the profile_level_tier_idx[i] should not point to this all zero profile_tier_level( ) structure when base layer is externally specified.

To accommodate the modification to the profile_level_tier_idx[i] it may specify the index, into the list of profile_tier_level( ) syntax structures in the VPS, of the profile_tier_level( ) syntax structure that applies to i-th output layer set. The length of the profile_level_tier_idx[i] syntax element is Ceil(Log 2(vps_num_profile_tier_level minus1+1)) bits. The value of profile_level_tier_idx[0] is inferred to be equal to 0. The value of profile_level_tier_idx [i] for i in the range of 1 to NumOutputLayerSet−1, inclusive shall be in the range of (vps_base_layer_external_flag? 1:0) to vps_num_profile_tier_level minus1, inclusive.

It is likewise desirable to signal by external means the value of a variable BlRepFormatIdx (e.g., base laser representation format index) which specifies an index into the list of rep_format( ) syntax structures in the VPS of the rep_format( ) structure that applies to the decoded picture with nuh_layer_id equal to 0 specified by external means. This is desirable because otherwise when any of the representation format information for the externally specified layer with nuh_layer_id equal to 0 changes (e.g. change in externally specified base layer picture height or width), a new VPS will need to be activated since currently the 0'th representation format structure is always selected to indicate representation format of the base layer. The additional VPS would result in a substantial increase in the bits of the bitstream, and also undue computational complexity.

The semantics of the decoding process may be as follows, which includes accommodations for the BlRepFormatIdx and the externally referenced base layer:

When vps_base_layer_external_flag is equal to 1, the following applies:

There is no coded picture with nuh_layer_id equal to 0 in the bitstream.

The size of the sub-DPB for the layer with nuh_layer_id equal to 0 is set equal to 1.

In addition to a list of decoded pictures, this process also outputs a flag BaseLayerOutputFlag, and, when BaseLayerOutputFlag is equal to 0 and AltOptLayerFlag[TargetOptLayerSetIdx] is equal to 1, a flag BaseLayerPicOutputFlag for each access unit.

The BaseLayerOutputFlag and, when present, BaseLayerPicOutputFlag for each access unit, are to be sent by an external means to the base layer decoder for controlling the output of base layer decoded pictures.

The following applies:
BaseLayerOutputFlag is derived as follows:

BaseLayerOutputFlag=(TargetOptLayerIdList[0]==0)

BaseLayerOutputFlag equal to 1 specifies that the base layer is a target output layer.
BaseLayerOutputFlag equal to 0 specifies that the base layer is a not target output layer.
When BaseLayerOutputFlag is equal to 0 and AltOptLayerFlag[TargetOptLayerSetIdx] is equal to 1, for each access unit, BaseLayerPicOutputFlag is derived as follows:
　if(the base layer is a direct or indirect reference layer of the target output layer, the access unit does not contain a picture at the target output layer and does not contain a picture at any other direct or indirect reference layer of the target output layer)

BaseLayerPicOutputFlag=1 else

BaseLayerPicOutputFlag=0

BaseLayerPicOutputFlag equal to 1 for an access unit specifies that the base layer picture of the access unit is output. BaseLayerPicOutputFlag equal to 0 for an access unit specifies that the base layer picture of the access unit is not output.
For each access unit, a decoded picture with nuh_layer_id equal to 0 may be provided by external means. When not provided, no picture with nuh_layer_id equal to 0 is used for inter-layer prediction for the current access unit. When provided, the following applies:
　The following information of the picture with nuh_layer_id equal to 0 for the access unit is provided by external means:
　　The decoded sample values (1 sample array SL if chroma_format_idc is equal to 0 or 3 sample arrays SL, SCb, and SCr otherwise)
　　The value of the variable BlRepFormatIdx which specifies an index into the list of rep_format( ) syntax structures in the VPS of the rep_format( ) structure that applies to the decoded picture with nuh_layer_id equal to 0.
　　　The values of pic_width_in_luma_samples, pic_height_in_luma_samples, chroma_format_idc, separate_colour_plane_flag, bit_depth_luma_minus8, and bit_depth_chroma_minus8 for decoded pictures with nuh_layer_id equal to 0 are set equal to the values of pic_width_vps_in_luma_samples, pic_height_vps_in_luma_samples, chroma_format_vps_idc, separate_colour_plane_vps_flag, bit_depth_vps_luma_minus8, and bit_depth_vps_chroma_minus8, respectively, of the BlRepFormatIdx'th rep_format( ) syntax structure in the active VPS.

The value of the variable BlIrapPicFlag, and when BlIrapPicFlag is equal to 1, the value of nal_unit_type of the decoded picture
　　　BlIrapPicFlag equal to 1 specifies that the decoded picture is an IRAP picture. BlIrapPicFlag equal to 0 specifies that the decoded picture is a non-IRAP picture.
　　　The provided value of nal_unit_type of the decoded picture shall be equal to IDR_W_RADL, CRA_NUT, or BLA_W_LP.
　　　nal_unit_type equal to IDR_W_RADL specifies that the decoded picture is an IDR picture.
　　　nal_unit_type equal to CRA_NUT specifies that the decoded picture is a CRA picture.
　　　nal_unit_type equal to BLA_W_LP specifies that the decoded picture is a BLA picture.
　The following applies for the decoded picture with nuh_layer_id equal to 0 for the access unit:
　　The decoded picture with nuh_layer_id equal to 0 is stored in the sub-DPB for the layer with nuh_layer_id equal to 0 and is marked as "used for long-term reference".
　　If the access unit has at least one picture with nuh_layer_id greater than 0, the PicOrderCntVal of the decoded picture with nuh_layer_id equal to 0 is set equal to the PicOrderCntVal of any picture with nuh_layer_id greater than 0 in the access unit. Otherwise, the decoded picture with nuh_layer_id equal to 0 is discarded and the sub-DPB for the layer with nuh_layer_id equal to 0 is set to be empty.
　When the access unit has at least one picture with nuh_layer_id greater than 0, after all pictures in the access unit are decoded, the sub-DPB for the layer with nuh_layer_id equal to 0 is set to be empty.
In another embodiment the following may apply:
　The value of the variable BlRepFormatIdx which specifies an index into the list of rep_format( ) syntax structures in the VPS of the rep_format( ) structure that applies to the decoded picture with nuh_layer_id equal to 0.
　　The values of pic_width_in_luma_samples, pic_height_in_luma_samples, chroma_format_idc, separate_colour_plane_flag, bit_depth_luma_minus8, and bit_depth_chroma_minus8 for decoded pictures with nuh_layer_id equal to 0 are set equal to the values of pic_width_vps_in_luma_samples, pic_height_vps_in_luma_samples, chroma_format_vps_idc, separate_colour_plane_vps_flag, bit_depth_vps_luma_minus8, and bit_depth_vps_chroma_minus8, respectively, of the vps_rep_format[BlRepFormatIdx] th rep_format( ) syntax structure in the active VPS.

In another embodiment instead of a single variable BlRepFormatIdx index, a flag BlRepFmtFlag and a variable BlRepFmtIdx may be specified for each decoded picture with nuh_layer_id equal to 0 that is specified by external means. In this case the following may apply during general decoding process.
For each access unit, a decoded picture with nuh_layer_id equal to 0 may be provided by external means. When not provided, no picture with nuh_layer_id equal to 0 is used for inter-layer prediction for the current access unit. When provided, the following applies:
　The following information of the picture with nuh_layer_id equal to 0 for the access unit is provided by external means:

The decoded sample values (1 sample array SL if chroma_format_idc is equal to 0 or 3 sample arrays SL, SCb, and SCr otherwise)

The value of the variable BlRepFmtFlag, and when BlRepFmtFlag is equal to 1, the value of the variable BlRepFmtIdx which specifies an index into the list of rep_format( ) syntax structures in the VPS of the rep_format( ) structure that applies to the decoded picture with nuh_layer_id equal to 0.

The values of pic_width_in_luma_samples, pic_height_in_luma_samples, chroma_format_idc, separate_colour_plane_flag, bit_depth_luma_minus8, and bit_depth_chroma_minus8 for decoded pictures with nuh_layer_id equal to 0 are set equal to the values of pic_width_vps_in_luma_samples, pic_height_vps_in_luma_samples, chroma_format_vps_idc, separate_colour_plane_vps_flag, bit_depth_vps_luma_minus8, and bit_depth_vps_chroma_minus8, respectively, of the vps_rep_format[0] th rep_format( ) syntax structure if BlRepFmtFlag is equal to 0 or BlRepFmtIdx th rep_format( ) syntax structure if BlRepFmtFlag is equal to 1 in the active VPS.

The value of the variable BlIrapPicFlag, and when BlIrapPicFlag is equal to 1, the value of nal_unit_type of the decoded picture BlIrapPicFlag equal to 1 specifies that the decoded picture is an IRAP picture. BlIrapPicFlag equal to 0 specifies that the decoded picture is a non-IRAP picture.

The provided value of nal_unit_type of the decoded picture shall be equal to IDR_W_RADL, CRA_NUT, or BLA_W_LP. nal_unit_type equal to IDR_W_RADL specifies that the decoded picture is an IDR picture. nal_unit_type equal to CRA_NUT specifies that the decoded picture is a CRA picture. nal_unit_type equal to BLA_W_LP specifies that the decoded picture is a BLA picture.

The following applies for the decoded picture with nuh_layer_id equal to 0 for the access unit:

The decoded picture with nuh_layer_id equal to 0 is stored in the sub-DPB for the layer with nuh_layer_id equal to 0 and is marked as "used for long-term reference".

If the access unit has at least one picture with nuh_layer_id greater than 0, the PicOrderCntVal of the decoded picture with nuh_layer_id equal to 0 is set equal to the PicOrderCntVal of any picture with nuh_layer_id greater than 0 in the access unit. Otherwise, the decoded picture with nuh_layer_id equal to 0 is discarded and the sub-DPB for the layer with nuh_layer_id equal to 0 is set to be empty.

When the access unit has at least one picture with nuh_layer_id greater than 0, after all pictures in the access unit are decoded, the sub-DPB for the layer with nuh_layer_id equal to 0 is set to be empty.

In another embodiment the following may apply:

The value of the variable BlRepFmtFlag, and when BlRepFmtFlag is equal to 1, the value of the variable BlRepFmtIdx which specifies an index into the list of rep_format( ) syntax structures in the VPS of the rep_format( ) structure that applies to the decoded picture with nuh_layer_id equal to 0.

The values of pic_width_in_luma_samples, pic_height_in_luma_samples, chroma_format_idc, separate_colour_plane_flag, bit_depth_luma_minus8, and bit_depth_chroma_minus8 for decoded pictures with nuh_layer_id equal to 0 are set equal to the values of pic_width_vps_in_luma_samples, pic_height_vps_in_luma_samples, chroma_format_vps_idc, separate_colour_plane_vps_flag, bit_depth_vps_luma_minus8, and bit_depth_vps_chroma_minus8, respectively, of the vps_rep_format[0] th rep_format( ) syntax structure if BlRepFmtFlag is equal to 0 or vps_rep_format[BlRepFmtIdx] th rep_format( ) syntax structure if BlRepFmtFlag is equal to 1 in the active VPS.

In another embodiment some of the above described embodiments may be combined. In particular the derivation of TemporalId values and derivation of representation format for the base layer picture externally specified may be combined. In one embodiment this may be done as follows.

The semantics of the decoding process may be as follows, which includes accommodations for the BlRepFormatIdx and the externally referenced base layer:

When vps_base_layer_external_flag is equal to 1, the following applies:

There is no coded picture with nuh_layer_id equal to 0 in the bitstream.

The size of the sub-DPB for the layer with nuh_layer_id equal to 0 is set equal to 1.

In addition to a list of decoded pictures, this process also outputs a flag BaseLayerOutputFlag, and, when BaseLayerOutputFlag is equal to 0 and AltOptLayerFlag[TargetOptLayerSetIdx] is equal to 1, a flag BaseLayerPicOutputFlag for each access unit.

The BaseLayerOutputFlag and, when present, BaseLayerPicOutputFlag for each access unit, are to be sent by an external means to the base layer decoder for controlling the output of base layer decoded pictures.

The following applies:

BaseLayerOutputFlag is derived as follows:

BaseLayerOutputFlag=(TargetOptLayerIdList[0]==0)

BaseLayerOutputFlag equal to 1 specifies that the base layer is a target output layer.

BaseLayerOutputFlag equal to 0 specifies that the base layer is a not target output layer.

When BaseLayerOutputFlag is equal to 0 and AltOptLayerFlag[TargetOptLayerSetIdx] is equal to 1, for each access unit, BaseLayerPicOutputFlag is derived as follows:

if(the base layer is a direct or indirect reference layer of the target output layer, the access unit does not contain a picture at the target output layer and does not contain a picture at any other direct or indirect reference layer of the target output layer)

BaseLayerPicOutputFlag=1 else

BaseLayerPicOutputFlag=0

BaseLayerPicOutputFlag equal to 1 for an access unit specifies that the base layer picture of the access unit is output. BaseLayerPicOutputFlag equal to 0 for an access unit specifies that the base layer picture of the access unit is not output.

For each access unit, a decoded picture with nuh_layer_id equal to 0 may be provided by external means. When not provided, no picture with nuh_layer_id equal to 0 is used for inter-layer prediction for the current access unit. When provided, the following applies:
The following information of the picture with nuh_layer_id equal to 0 for the access unit is provided by external means:
  The decoded sample values (1 sample array SL if chroma_format_idc is equal to 0 or 3 sample arrays SL, SCb, and SCr otherwise)
  The value of the variable BlRepFormatIdx which specifies an index into the list of rep_format( ) syntax structures in the VPS of the rep_format( ) structure that applies to the decoded picture with nuh_layer_id equal to 0.
    The values of pic_width_in_luma_samples, pic_height_in luma_samples, chroma_format_idc, separate_colour_plane_flag, bit_depth_luma_minus8, and bit_depth_chroma_minus8 for decoded pictures with nuh_layer_id equal to 0 are set equal to the values of pic_width_vps_in_luma_samples, pic_height_vps_in_luma_samples, chroma_format_vps_idc, separate_colour_plane_vps_flag, bit_depth_vps_luma_minus8, and bit_depth_vps_chroma_minus8, respectively, of the BlRepFormatIdx'th rep_format( ) syntax structure in the active VPS.
  The value of the variable BlIrapPicFlag, and when BlIrapPicFlag is equal to 1, the value of nal_unit_type of the decoded picture
    BlIrapPicFlag equal to 1 specifies that the decoded picture is an IRAP picture. BlIrapPicFlag equal to 0 specifies that the decoded picture is a non-IRAP picture.
    The provided value of nal_unit_type of the decoded picture shall be equal to IDR_W_RADL, CRA_NUT, or BLA_W_LP. nal_unit_type equal to IDR_W_RADL specifies that the decoded picture is an IDR picture. nal_unit_type equal to CRA_NUT specifies that the decoded picture is a CRA picture. nal_unit_type equal to BLA_W_LP specifies that the decoded picture is a BLA picture.
The following applies for the decoded picture with nuh_layer_id equal to 0 for the access unit:
  The decoded picture with nuh_layer_id equal to 0 is stored in the sub-DPB for the layer with nuh_layer_id equal to 0 and is marked as "used for long-term reference".
  If the access unit has at least one picture with nuh_layer_id greater than 0, the PicOrderCntVal of the decoded picture with nuh_layer_id equal to 0 is set equal to the PicOrderCntVal of any picture with nuh_layer_id greater than 0 in the access unit. Otherwise, the decoded picture with nuh_layer_id equal to 0 is discarded and the sub-DPB for the layer with nuh_layer_id equal to 0 is set to be empty.
  In one embodiment, if the access unit has at least one picture with nuh_layer_id greater than 0, TemporalId of the decoded picture with nuh_layer_id equal to 0 is set equal to the TemporalId of any picture with nuh_layer_id greater than 0 in the access unit.

In another embodiment, if BlIrapPicFlag is equal to 1 the TemporalId of the decoded picture with nuh_layer_id equal to 0 is set equal to 0. Otherwise (if BlIrapPicFlag is equal to 0) if the access unit has at least one picture with nuh_layer_id greater than 0, TemporalId of the decoded picture with nuh_layer_id equal to 0 is set equal to the TemporalId of any picture with nuh_layer_id greater than 0 in the access unit.

When the access unit has at least one picture with nuh_layer_id greater than 0, after all pictures in the access unit are decoded, the sub-DPB for the layer with nuh_layer_id equal to 0 is set to be empty.

In additional embodiments the term "externally specified" may be replaced by "specified by external means" or any other equivalent term which refers to the aspect that information is provided by some outside/external means.

In additional embodiments the semantics meaning of flag vps_base_layer_external_flag may instead be inverted and it may be called vps_base_layer_internal_flag. In this case in all or some of the proposed syntax, semantics above the following replacement maybe performed:
  All occurrences of vps_base_layer_external_flag will be replaced by !vps_base_layer_internal_flag.
  All occurrences checking the value of vps_base_layer_external_flag flag equal to 1 will be replaced by checking the value of vps_base_layer_internal_flag flag equal to 0.
  All occurrences checking the value of vps_base_layer_external_flag flag equal to 0 will be replaced by checking the value of vps_base_layer_internal_flag flag equal to 1.
  All occurrences of (vps_base layer_external_flag? 1:0) maybe replaced by (!vps_base_layer_internal_flag? 1:0) or by (vps_base_layer_internal_flag? 0:1)
  All occurrences of if((vps_base_layer_external_flag==0)||

```
( ( vps_base_layer_external_flag == 1 ) &&
( layer_id_in_nuh[ LayerIdxInVps[ RefLayerId[ layer_id_in_nuh[ i ][
j ] ] ] ]!=
0 ) ) ) maybe replaced by
    Or by if( ( !vps_base_layer_internal_flag == 0 ) ||
( ( !vps_base_layer_internal_flag == 1 ) &&
( layer_id_in_nuh[ LayerIdxInVps[ RefLayerId[ layer_id_in_nuh[ i ][
j ] ] ] ]!=
0 ) ) )
    if( ( vps_base_layer_internal_flag == 1 ) ||
( ( vps_base_layer_internal_flag == 0 ) &&
( layer_id_in_nuh[ LayerIdxInVps[ RefLayerId[ layer_id_in_nuh[ i ][
j ] ] ] ]!=
0 ) ) )
```

It is to be understood that any of the features, whether indicated as shall or necessary, may be omitted as desired. In addition, the features may be combined in different combinations, as desired.

The term "computer-readable medium" refers to any available medium that can be accessed by a computer or a processor. The term "computer-readable medium," as used herein, may denote a computer- and/or processor-readable medium that is nontransitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray (registered trademark) disc where disks usually reproduce data magnetically, while discs reproduce data optically with lasers.

It should be noted that one or more of the methods described herein may be implemented in and/or performed using hardware. For example, one or more of the methods or approaches described herein may be implemented in and/or realized using a chipset, an ASIC, a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

The invention claimed is:

1. A method for decoding a video bitstream comprising the steps of: (a) receiving a base bitstream representative of a coded video sequence; (b) receiving at least one enhancement bitstreams representative of said coded video sequence; (c) receiving a video parameter set containing syntax elements that apply to said base bitstream and said at least one enhancement bitstreams where said syntax elements selectively signaling bitrate and picture rate information for said base bitstream based upon whether said base bitstream is externally decoded or internally specified.

2. The method of claim 1 wherein said syntax elements define a plurality of layer sets, a first one of said layer sets including only said base layer, and a second one of said layer sets including at least one of said enhancement bitstreams.

3. The method of claim 2 wherein said layer sets are indexed with an index.

4. The method of claim 3 wherein a said index of 0 indicates said first one of said layer sets.

5. The method of claim 3 wherein a said index of greater than or equal to 1 indicates said second one of said layer sets.

6. The method of claim 5 wherein selectively signaling bitrate and picture rate information of said layer sets starts with said index of 1 when said base bitstream is externally signaled.

7. The method of claim 4 wherein selectively signaling bitrate and picture rate information of said layer sets starts with said index of 0 when said base bitstream is internally signaled.

8. The method of claim 1 where the bitrate information includes at least one of a bitrate information present flag, and average bit rate information, a maximum bitrate information.

9. The method of claim 1 where the picture rate information includes at least one of a picture rate information present flag, and average picture rate information.

* * * * *